(12) United States Patent
Fujii et al.

(10) Patent No.: US 7,854,377 B2
(45) Date of Patent: Dec. 21, 2010

(54) DATA COLLECTION SYSTEM

(75) Inventors: Toru Fujii, Kyoto (JP); Manabu Tsuda, Kyoto (JP)

(73) Assignee: Omron Corporation, Kyoto (JP)

( * ) Notice: Subject to any disclaimer, the term of this patent is extended or adjusted under 35 U.S.C. 154(b) by 1094 days.

(21) Appl. No.: 11/584,603

(22) Filed: Oct. 23, 2006

(65) Prior Publication Data

US 2007/0090178 A1 Apr. 26, 2007

(30) Foreign Application Priority Data

| Oct. 21, 2005 | (JP) | ............................. 2005-306811 |
| Oct. 21, 2005 | (JP) | ............................. 2005-306812 |
| May 31, 2006 | (JP) | ............................. 2006-152359 |

(51) Int. Cl.
*G06F 17/00* (2006.01)

(52) U.S. Cl. ........................ 235/375; 235/376; 235/383; 235/385; 705/7; 705/8; 705/9; 700/95; 700/96

(58) Field of Classification Search ................. 235/375, 235/376, 383, 385; 705/7, 8, 9; 700/95, 700/96
See application file for complete search history.

(56) References Cited

U.S. PATENT DOCUMENTS

| 5,461,570 | A | * | 10/1995 | Wang et al. ................. 700/110 |
| 5,984,178 | A | * | 11/1999 | Gill et al. .................... 235/379 |
| 6,646,564 | B1 | * | 11/2003 | Azieres et al. .............. 340/679 |
| 6,966,015 | B2 | * | 11/2005 | Steinberg et al. .............. 714/47 |
| 2002/0016829 | A1 | * | 2/2002 | Defosse ....................... 709/217 |
| 2003/0028269 | A1 | * | 2/2003 | Spriggs et al. ................. 700/83 |
| 2004/0189719 | A1 | * | 9/2004 | Peng et al. .................. 345/854 |
| 2006/0136085 | A1 | * | 6/2006 | Steinhilper et al. .......... 700/111 |
| 2006/0136177 | A1 | * | 6/2006 | Patanian ..................... 702/187 |

FOREIGN PATENT DOCUMENTS

| JP | 6-301617 | 10/1994 |
| JP | 09-108998 A | 4/1997 |
| JP | 10-006190 | 1/1998 |
| JP | 11-087455 A | 3/1999 |
| JP | 11-184518 | 7/1999 |
| JP | 2002-269664 | 9/2002 |
| JP | 2003-50624 | 2/2003 |
| JP | 2003-091306 | 3/2003 |
| JP | 2003-195940 | 11/2003 |
| JP | 3616200 | 11/2004 |
| WO | WO-00/28700 | 5/2000 |

* cited by examiner

*Primary Examiner*—Michael G Lee
*Assistant Examiner*—Ali Sharifzada
(74) *Attorney, Agent, or Firm*—Foley & Lardner LLP

(57) ABSTRACT

A data collection system includes: a contact information acquisition unit, for obtaining contact information; a state recognition unit, for obtaining, based on contact information acquired by the contact information acquisition unit, state information concerning the state of a equipment; a state coding unit, for transforming into coded contact associated information the state information obtained by the state recognition unit; and an output unit, for transmitting to an output apparatus contact information obtained by the contact information acquisition unit and for transmitting to a network apparatus contact associated information obtained by the state coding unit. With this arrangement, information concerning the operation of a equipment can be easily obtained, without requiring the reconstruction of a equipment or a great change in a sequence program, such as a programmable controller, mounted in the equipment.

16 Claims, 34 Drawing Sheets

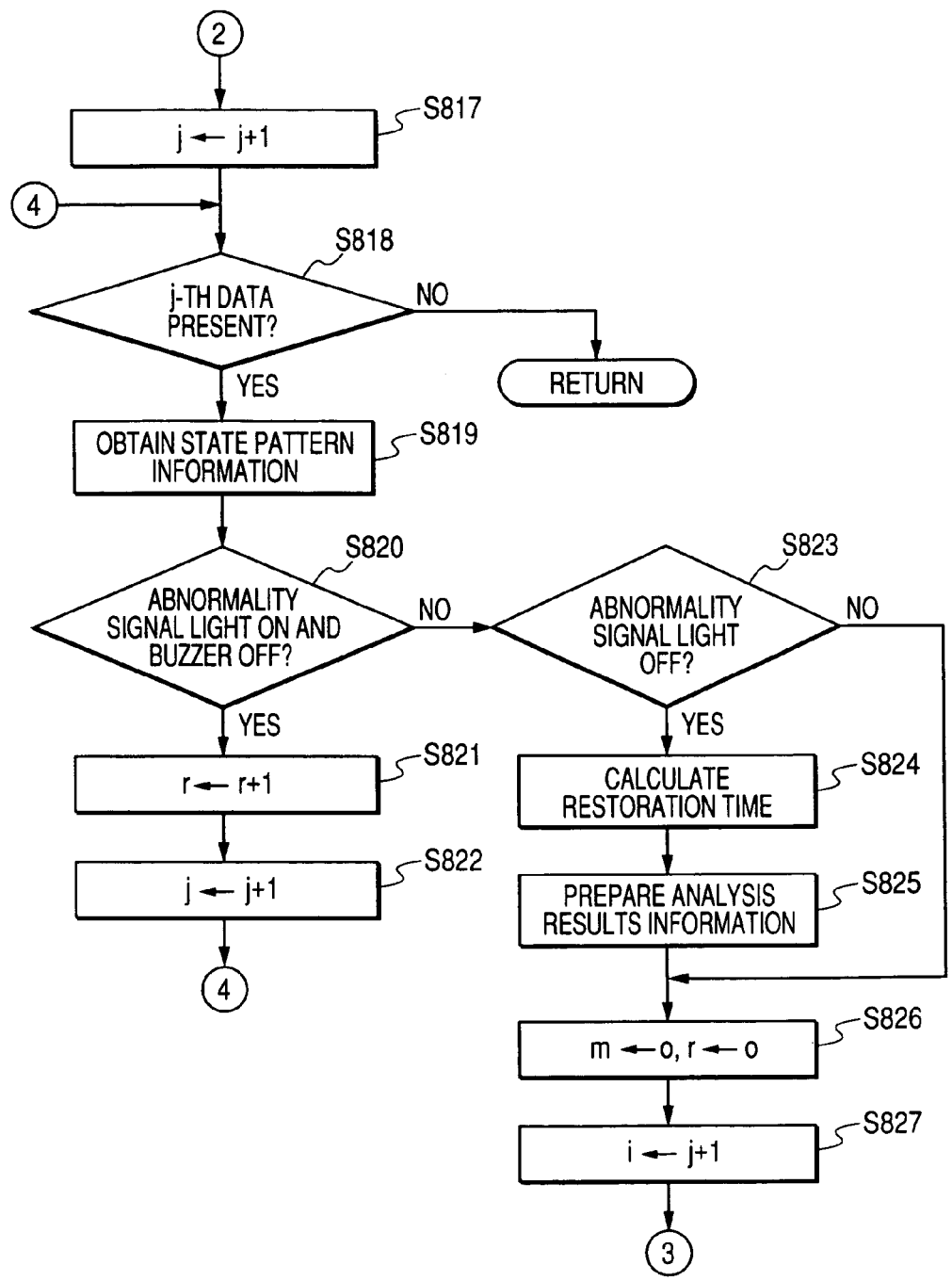
(FIG. 8 CONTINUED)

FIG. 9

| CONTACT ASSOCIATED INFORMATION | | | | STATE INFORMATION | | | | | | STATE DEFINITION INFORMATION |
|---|---|---|---|---|---|---|---|---|---|---|
| STATE 1 | STATE 2 | STATE 3 | STATE 4 | PRODUCTION COUNT | BUZZER | RED | YELLOW | GREEN | | |
| 0 | 0 | 0 | 0 | | × | × | × | × | | POWER OFF |
| 0 | 0 | 0 | 1 | | × | × | × | ○ | | NORMAL OPERATION |
| 0 | 0 | 1 | 0 | | × | × | ○ | ○ | | NORMAL OPERATION + NO WORK FOR PREPROCESS |
| 0 | 0 | 1 | 1 | | × | × | ○ or △ | △ | | WORK FULL FOR POST PROCESS |
| 0 | 1 | 0 | 0 | | × | × | △ | ○ or △ | | NO PARTS (ATTENDING) |
| 0 | 1 | 0 | 1 | | × | ○ | × | × | | HALT |
| 0 | 1 | 1 | 0 | | × | △ | × | × | | ABNORMAL HALT (ATTENDING) |
| 0 | 1 | 1 | 1 | | | | | | | |
| 1 | 0 | 0 | 0 | | | | | | | |
| 1 | 0 | 0 | 1 | | | | | | | |
| 1 | 0 | 1 | 0 | | | | | | | |
| 1 | 0 | 1 | 1 | | | | | | | |
| 1 | 1 | 0 | 0 | | ○ | × | △ | ○ or △ | | NO PARTS (UNATTENDED) |
| 1 | 1 | 0 | 1 | | | | | | | |
| 1 | 1 | 1 | 0 | | ○ | △ | × | × | | ABNORMAL HALT (UNATTENDED) |
| 1 | 1 | 1 | 1 | ○ | | | | | | 100 WORK PASSED |

FIG. 10

| DATE | TIME | STATE 1 | STATE 2 | STATE 3 | STATE 4 |
|---|---|---|---|---|---|
| 2005/6/21 | 12:52:22 | 0 | 0 | 0 | 1 |
| 2005/6/21 | 12:52:23 | 1 | 1 | 1 | 1 |
| 2005/6/21 | 12:52:24 | 0 | 0 | 0 | 1 |

(BEFORE CORRECTION)

|  | STATE 1 | STATE 2 | STATE 3 | STATE 4 |
|---|---|---|---|---|
| 2005/6/21  12:52:46 | 0 | 1 | 1 | 0 |
| 2005/6/21  12:52:51 | 0 | 1 | 0 | 1 |
| 2005/6/21  12:53:01 | 0 | 1 | 0 | 0 |

(AFTER CORRECTION)

|  | STATE 1 | STATE 2 | STATE 3 | STATE 4 |
|---|---|---|---|---|
| 2005/6/21  12:52:45 | 0 | 1 | 1 | 0 |
| 2005/6/21  12:52:50 | 0 | 1 | 0 | 1 |
| 2005/6/21  12:53:00 | 0 | 1 | 0 | 0 |

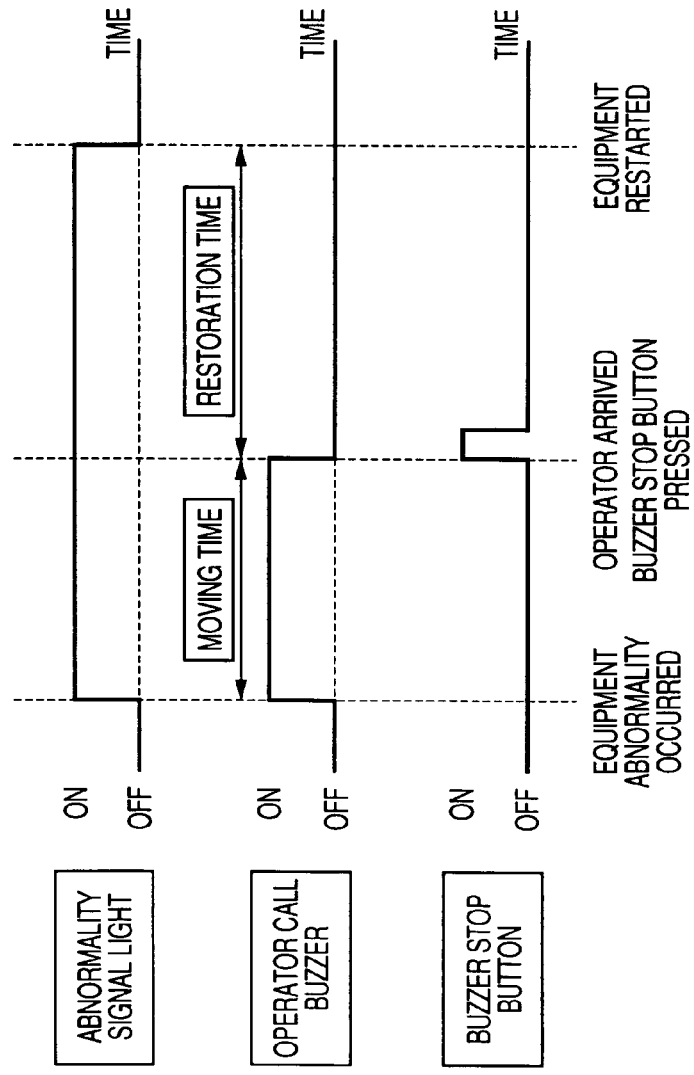

FIG. 15
| TIME INFORMATION (ABNORMALITY START TIME) | HALT PERIOD | |
|---|---|---|
| | MOVING TIME (s) | RESTORATION TIME (s) |
| 2005/6/21  12:52:46 | 15 | 724 |
| 2005/6/21  18:02:42 | 42 | 3252 |
| 2005/6/22   9:12:08 | 39 | 25 |
| 2005/6/22  13:11:05 | 82 | 1521 |
| ⋮ | ⋮ | ⋮ |
FIG. 16A
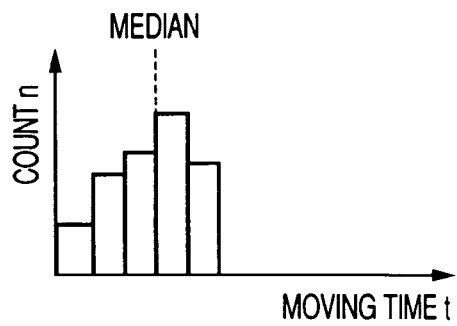
FIG. 16B
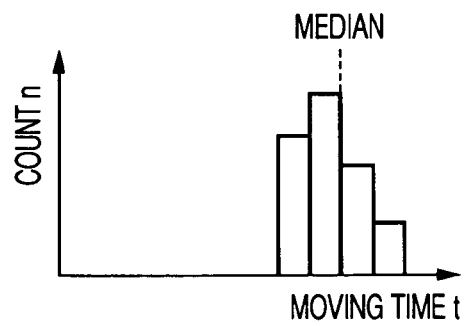
FIG. 16C
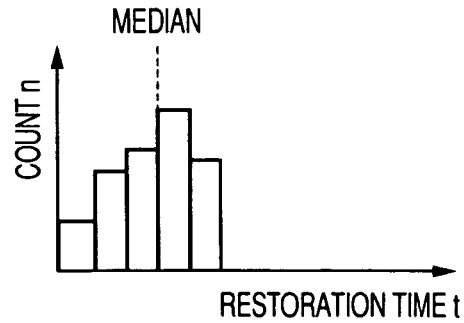
FIG. 16D
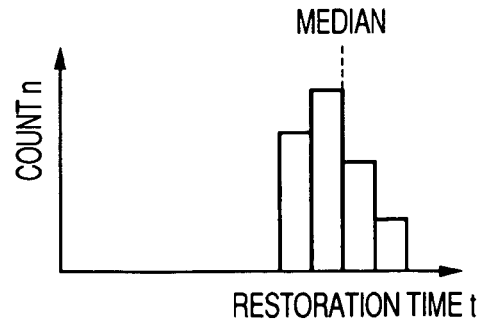

FIG. 18

| CONTACT ASSOCIATED INFORMATION | | | | STATE INFORMATION | | | STATE DEFINITION INFORMATION |
|---|---|---|---|---|---|---|---|
| STATE 1 | STATE 2 | STATE 3 | STATE 4 | RED | YELLOW | GREEN | |
| − | 0 | 0 | 0 | × | × | × | POWER OFF |
| − | 0 | 0 | 1 | × | × | ○ | NORMAL OPERATION |
| − | 0 | 1 | 0 | × | × | △ | WORK FULL FOR POST PROCESS |
| − | 0 | 1 | 1 | × | △ | ○ or △ | NO PARTS (+ WORK FULL FOR POST PROCESS) |
| − | 1 | 0 | 0 | × | ○ | ○ | NO WORK FOR PREPROCESS |
| − | 1 | 0 | 1 | ○ | × | × | HALT |
| − | 1 | 1 | 0 | × | ○ | △ | NO WORK FOR PREPROCESS + WORK FULL FOR POST PROCESS |
| − | 1 | 1 | 1 | △ | × | × | ABNORMAL HALT |
| 1 | − | − | − | | | | 100 WORK PASSED |

FIG. 19

| CONTACT ASSOCIATED INFORMATION | | | | STATE INFORMATION | | | STATE DEFINITION INFORMATION |
|---|---|---|---|---|---|---|---|
| STATE 1 | STATE 2 | STATE 3 | STATE 4 | RED | YELLOW | GREEN | |
| − | 0 | 0 | 0 | × | × | × | POWER OFF |
| − | 0 | 0 | 1 | × | × | ○ | NORMAL OPERATION |
| − | − | 1 | 0 | × | × | △ | WORK FULL FOR POST PROCESS |
| − | 0 | 1 | 1 | × | △ | ○ or △ | NO PARTS (+ WORK FULL FOR POST PROCESS) |
| − | 1 | − | 0 | × | ○ | ○ | NO WORK FOR PREPROCESS |
| − | 1 | 0 | 1 | ○ | × | × | HALT |
| − | 1 | 1 | 1 | △ | × | × | ABNORMAL HALT |
| 1 | − | − | − | | | | 100 WORK PASSED |

FIG. 25

| STATE INFORMATION ID | STATE INFORMATION | | | | | STATE TIME VARIABLE (s) | RATE (%) | STATE DEFINITION INFORMATION |
|---|---|---|---|---|---|---|---|---|
| | PRODUCTION COUNT | BUZZER | RED | YELLOW | GREEN | | | |
| 1 | | × | × | × | ○ | 4507 | 45 | NORMAL OPERATION |
| 2 | | × | × | ○ | ○ | 1711 | 17 | NO SUPPLY OF WORKS FROM PREPROCESS |
| 3 | | × | × | ○ | △ | 2299 | 23 | WORK FULL FOR POST PROCESS |
| 4 | | × | × | △ | ○ | 101 | 1 | NO PARTS |
| 5 | | × | △ | × | × | 1410 | 14 | LOCAL EQUIPMENT ABNORMALLY HALTED |
| ------- | ------- | ------- | ------- | ------- | ------- | ------- | ------- | ------- |

RATE OF TOTAL ON TIME FOR INDIVIDUAL OPERATING DATA

| CATEGORY | FREQUENCY | TOTAL TIME (s) |
|---|---|---|
| IN 1 MIN. | 2 | 47 |
| IN 2 MIN. | 3 | 220 |
| IN 3 MIN. | 5 | 821 |
| IN 4 MIN. | 10 | 2308 |
| IN 5 MIN. | 13 | 3763 |
| IN 6 MIN. | 11 | 3600 |
| IN 7 MIN. | 8 | 3324 |
| IN 8 MIN. | 7 | 3121 |
| IN 9 MIN. | 3 | 1511 |
| IN 10 MIN. | 2 | 1098 |
| LONGER THAN 10 MIN. | 1 | 650 |

FIG. 35

| ID | STATE IDENTIFIER |
|---|---|
| 1 | NORMAL OPERATION |
| 2 | ABNORMAL OPERATION |
| 3 | NO WORK FOR PREPROCESS |
| 4 | WORK FULL FOR POST PROCESS |

FIG. 36

| ID | STATE IDENTIFIER | OCCURRENCE TYPE | STATE IDENTIFICATION INFORMATION |
|---|---|---|---|
| 1 | NORMAL OPERATION | LONG-PERIOD FREQUENT OCCURRENCE | NORMALLY OPERATING |
| 2 | ABNORMALLY HALTED | LONG-PERIOD SPORADIC OCCURRENCE | TROUBLE HALT OCCURS OCCASIONALLY |
| 3 | NORMAL OPERATION | SHORT-PERIOD FREQUENT OCCURRENCE | TACT BALANCE IS DISTURBED |
| 4 | ABNORMALLY HALTED | SHORT-PERIOD SPORADIC OCCURRENCE | NORMALLY OPERATING |
| ⋮ | ⋮ | ⋮ | ⋮ |

FIG. 37

| ID | STATE IDENTIFIER | SUB-STATE IDENTIFIER | DURATION TIME |
|---|---|---|---|
| 1 | NORMAL OPERATION | ON | 60 MIN. |
| 2 | ABNORMALLY HALTED | OFF | 60 MIN. |
| 3 | NO WORK FOR PREPROCESS | OFF | 60 MIN. |
| 4 | WORK FULL FOR POST PROCESS | OFF | 60 MIN. |
| 5 | ABNORMALLY HALTED | ON | 1 MIN. |
| 6 | NORMAL OPERATION | OFF | 1 MIN. |
| 7 | NO WORK FOR PREPROCESS | OFF | 1 MIN. |
| 8 | WORK FULL FOR POST PROCESS | OFF | 1 MIN. |
| 9 | NORMAL OPERATION | ON | 89 MIN. |
| 10 | ABNORMALLY HALTED | OFF | 89 MIN. |
| 11 | NO WORK FOR PREPROCESS | OFF | 89 MIN. |
| 12 | WORK FULL FOR POST PROCESS | OFF | 89 MIN. |
| ⋮ | ⋮ | ⋮ | ⋮ |

FIG. 38

| ID | STATE IDENTIFIER | SUB-STATE IDENTIFIER | DURATION TIME |
|---|---|---|---|
| 1 | NORMAL OPERATION | ON | 60 MIN. |
| 2 | ABNORMALLY HALTED | OFF | 60 MIN. |
| 3 | NO WORK FOR PREPROCESS | OFF | 480 MIN. |
| 4 | WORK FULL FOR POST PROCESS | OFF | 480 MIN. |
| 5 | ABNORMALLY HALTED | ON | 1 MIN. |
| 6 | NORMAL OPERATION | OFF | 1 MIN. |
| 7 | NORMAL OPERATION | ON | 89 MIN. |
| 8 | ABNORMALLY HALTED | OFF | 89 MIN. |
| ⋮ | ⋮ | ⋮ | ⋮ |

FIG. 39

| ID | STATE IDENTIFIER | SUB-STATE IDENTIFIER | CATEGORY | FREQUENCY |
|---|---|---|---|---|
| 1 | NORMAL OPERATION | ON | IN 1 MIN. | 0 |
| | | | IN 2 MIN. | 0 |
| | | | IN 3 MIN. | 0 |
| | | | IN 4 MIN. | 0 |
| | | | IN 5 MIN. | 0 |
| | | | IN 6 MIN. | 0 |
| | | | IN 7 MIN. | 0 |
| | | | IN 8 MIN. | 0 |
| | | | IN 9 MIN. | 1 |
| | | | IN 10 MIN. | 5 |
| | | | LONGER THAN 10 MIN. | 48 |
| | | OFF | IN 1 MIN. | 18 |
| | | | ⋮ | ⋮ |
| | | | LONGER THAN 10 MIN. | 1 |
| 2 | ABNORMAL OPERATION | ON | IN 1 MIN. | 18 |
| | | | ⋮ | ⋮ |
| | | | LONGER THAN 10 MIN. | 1 |
| | | OFF | IN 1 MIN. | 0 |
| | | | ⋮ | ⋮ |
| | | | LONGER THAN 10 MIN. | 48 |
| ⋮ | ⋮ | ⋮ | ⋮ | ⋮ |

FIG. 43

| ID | STATE IDENTIFIER | OCCURRENCE TYPE | STATE IDENTIFICATION INFORMATION |
|---|---|---|---|
| 1 | NORMAL OPERATION<br><br>NO WORK FOR PREPROCESS | SHORT-PERIOD FREQUENT OCCURRENCE TYPE<br>SHORT-PERIOD FREQUENT OCCURRENCE TYPE | TACT BALANCE IS DISTURBED IN PREPROCESS |
| 2 | NORMAL OPERATION<br><br>WORKS FULL IN POST-PREPROCESS | SHORT-PERIOD FREQUENT OCCURRENCE TYPE<br>SHORT-PERIOD FREQUENT OCCURRENCE TYPE | TACT BALANCE IS DISTURBED IN POST-PROCESS |
| ⋮ | ⋮ | ⋮ | ⋮ |

FIG. 44

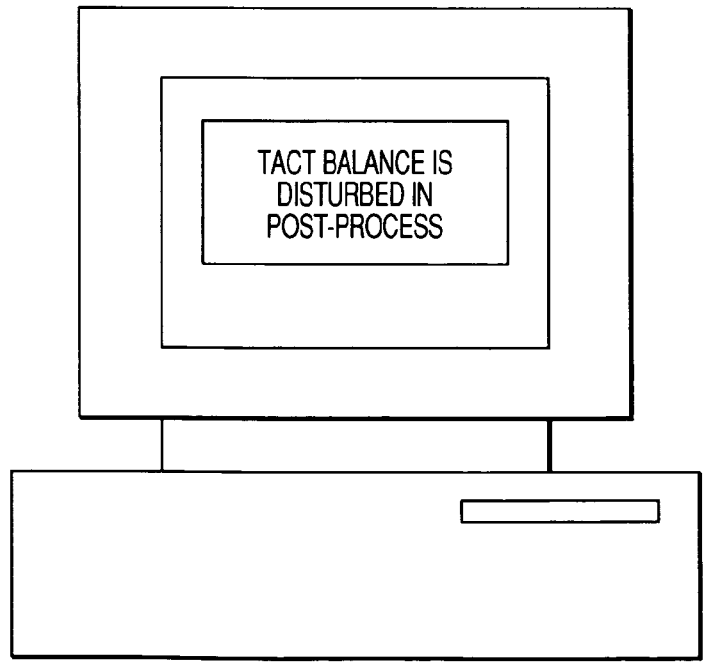

US 7,854,377 B2

DATA COLLECTION SYSTEM

This application claims priority from Japanese patent applications 2005-306811, filed on Oct. 21, 2005, 2005-306812, filed Oct. 21, 2005 and 2006-152359, filed May 31, 2006. The entire content of the aforementioned applications are incorporated herein by reference.

TECHNICAL FIELD

The present disclosure relates to a data collection system for collecting data concerning the operation of equipment, such as production machines that constitute a production line.

RELATED ART

A first related-art data collection system is one that simplifies the acquisition of the latest information concerning equipment abnormalities (see, for example, patent document 1).

A second related-art data collection system is one comprising: an interface for at least transforming the output of a lamp, a buzzer or a sensor, used to indicate an operating state for a production equipment, to obtain an ON/OFF signal indicating a start, a standby, a fault or a halted state; and a equipment operating state recording apparatus, which is connected to the interface, for at least recording the start, standby, fault or halted state, data indicating the cause of a fault or a halt, and the start and end times for the individual states of the equipment. According to the characteristic of this system, a plurality of keys provided for the equipment operating state recording apparatus are allocated for a display unit, and multiple choices for the cause of a fault at the production equipment or the halting thereof are allocated to these keys. In accordance with a signal pattern received from the interface, an entry made with a key representing a pertinent choice is enabled for the display unit of the equipment operating recording apparatus, and since an operator selectively used the key to enter data, cause data allocated to the key are recorded as data representing the cause of the fault at the production equipment or the halting thereof. After an operator has entered an end key to counter the cause of the fault or the halting, the entry of another cause input key is enabled, and the time at which the end key was entered is recorded as the start of the new cause or of the standby state (see patent document 2).

A third related-art data collection system is a production management system for managing a plurality of apparatuses connected to a network in a specific area. According to the characteristic of this system, a communication port is provided for controllers of units that belong to the apparatuses in order that they may be connected to a network independent of the network in the specific area. The controllers perform at least one of the data collection, data statistics, data processing and data storage tasks associated with the units, and transmit to a maintenance/management computer, connected to the independent network, various types of information produced by employing data that are thus obtained. Then, the maintenance/management computer records and displays the received information for the performance of at least one of the overall control, monitoring, management and maintenance operations for the units (see patent document 3).

A fourth related-art data collection system comprises: a first LAN and a second LAN, and a separation unit and a storage unit connected between the first LAN and the second LAN. According to the characteristic of this system, the separation unit separates the first and the second LANs so that the two do not adversely affect each other, and so that the control unit is accessible via both the first and the second LANs (see, for example, patent document 4).

A fifth related-art data collection system is a system, for a equipment, that can appropriately evaluate a measurement for reducing a period for a stop, due to a fault, in accordance with the cause of the stop (see, for example, patent document 5).

According to a sixth related-art data collection system, a dedicated monitoring PLC is located between a PC and a programmable controller for a plurality of facilities. PLCs for the individual facilities transform signals indicating operating states, cycle times and production quantities, and the cause of an abnormality that caused an equipment to be halted into code, and output this code as BCD (binarized decimal) signals to the dedicated monitoring PLC. The dedicated monitoring PLC sequentially monitors the equipment PLCs, and uses data thus collected to calculate an operating rate for each equipment. Then, the dedicated monitoring PLC adds this operating rate or the number of halt times to a halt history provided for each cause or for each equipment, and stores the data in a register and also transmits them to the PC. The PC fetches the thus received data to table calculation software, while constantly monitoring the operating state of the equipment, and prepares a daily report or a monthly report, or performs a data analysis (see patent document 6).

[Patent Document 1] Japanese Patent Unexamined Publication No. 2002-269664 (e.g., page 1, FIG. 1)

[Patent Document 2] Japanese Patent No. 3616200 (e.g., page 1, FIG. 1)

[Patent Document 3] Japanese Patent Unexamined Publication No. 6-301617 (e.g., page 1, FIG. 1)

[Patent Document 4] WO00/28700 (e.g., page 1, FIG. 1)

[Patent Document 5] Japanese Patent Unexamined Publication No. 11-184518 (e.g., page 1, FIG. 1)

[Patent Document 6] Japanese Patent Unexamined Publication No. 2003-50624 (e.g., page 1, FIG. 1)

However, it is not easy for these related-art first to sixth data collection systems to be installed in a related-art production equipment, such as a equipment. Specifically, when one of the related-art first to sixth data collection systems is used to collect information for the operation of a production equipment, the production equipment must be customized, or a sequence program, such as a programmable controller, mounted in the production equipment must be greatly modified.

Furthermore, for the transmission and reception of data, the related-art first to the sixth data collection systems can not represent, using a small number of bits, state information concerning various types of equipment states. Thus, for a system that includes very large production facilities, such as plants, the free flow of network traffic would be threatened to collect state information for equipments.

Furthermore, for the related-art first to the sixth data collection system, the operating state of the equipment cannot be satisfactorily analyzed. Specifically, since information upon the occurrence of an abnormality, such as operator moving time information and restoration time information, cannot be obtained, a counterplan required for a production job site cannot be performed. Furthermore, since the occurrence rates for the individual states, including the abnormal state, and the durations and frequencies of these states cannot be obtained, measures for the improvement of productivity and the improvement of quality at the production job site cannot be performed.

SUMMARY

Embodiments of the present invention provide a data collection system.

According to a first aspect of the present invention, a data collection system comprises:

a divergence apparatus, located between a equipment and an output apparatus, for outputting contact information concerning an operation performed by the equipment;

a network apparatus; and a data collection apparatus, wherein the divergence apparatus includes a contact information acquisition unit, for obtaining contact information from the equipment, and an output unit, for transmitting to the output apparatus contact information obtained by the contact information acquisition unit, and for transmitting, to the network apparatus, contact associated information, which is information concerning the contact information, wherein the network apparatus includes a first contact associated information receiver, for receiving contact associated information from the divergence apparatus, and a first contact associated information transmitter, for transmitting to the data collection apparatus the contact associated information received by the first contact associated information receiver, and wherein the data collection apparatus includes an operating data storage unit, used to store the contact associated information, a second contact associated information receiver, for receiving contact associated information from the network apparatus, and an operating data log accumulation unit, for storing in the operating data storage unit contact associated information received by the second contact associated information receiver.

With this arrangement, information concerning the operation of a equipment can be easily obtained, without having to customize a equipment or greatly change a sequence program, such as a programmable controller, mounted in the equipment.

According to a second aspect of the invention, the data collection system of the first aspect further comprises:

an analysis apparatus, including a contact associated information acquisition unit, for reading one or more sets of contact associated information from the operating data storage unit, an analysis unit, for processing the one or more sets of contact associated information read by the contact associated information acquisition unit and obtaining predetermined information, and an analysis results output unit, for outputting the predetermined information obtained by the analysis unit.

With this arrangement, a collected operating data log can be analyzed. Through this analysis, for example, solutions such as the need to increase the number of operators or the need to establish restoration procedures can be found.

Further, with this arrangement, information concerning the operation of a equipment can be easily obtained without having to customize a equipment or greatly change a sequence program, such as a programmable controller, mounted in the equipment.

According to a third aspect of the invention, in addition to the data collection system of the first or the second aspect, the divergence apparatus further includes:

a state recognition unit, for employing contact information acquired by the contact information acquisition unit to obtain state information, which is information concerning a state of the equipment; and a state coding unit, for transforming the state information obtained by the state recognition unit into coded contact associated information, and the output unit transmits to the output apparatus the contact information obtained by the contact information acquisition unit, and also transmits to the network apparatus the contact associated information obtained through a transform performed by the state coding unit.

With this arrangement, data can be coded before being output to a network, so that the network traffic can be reduced. Further, the data collection system is extremely effective, especially when introduced into a large production system, such as a plant.

According to a fourth aspect of the invention, in addition to the data collection system of the third aspect, the state coding unit further includes:

a coding map storage unit, for storing a coding map representing a correlation between state information, which indicates state patterns for n contacts (n is an integer of two or greater), and contact associated information, which is code in (n−1) bits or smaller; and a contact associated information acquisition unit, for obtaining, from the coding map, contact associated information that is correlated with state information obtained by the state recognition unit.

With this arrangement, multiple state types can be handled by using a small number of bits, and network traffic can be reduced. Furthermore, the data collection system is extremely effective, especially when introduced into a large production system, such as a plant.

According to a fifth aspect of the invention, in addition to the data collection system of the third aspect, the state coding unit includes:

a coding map storage unit, for storing a coding map according to which contact associated information, correlated with state information that indicates a set of two or more states, is regarded as the sum of contact associated information sets that are correlated with the two or more states; and a contact associated information acquisition unit, for obtaining from the coding map contact associated information correlated with state information obtained by the state recognition unit.

With this arrangement, the operating states generated simultaneously can be sorted, and as a result, a production management department can obtain the state of the equipment more quickly.

According to a sixth aspect of the invention, in addition to the data collection system of the fourth or fifth aspect, the contact outputs the state of a buzzer that is to be set either to the ON or to the OFF state, or the state of a signal light that is to be turned on or off, or to blink. The state information includes: asynchronous information that is generated asynchronously with a change in the state of the buzzer and a change in the state of the signal light. When state information obtained by the state recognition unit includes asynchronous information, the state coding unit transforms the state information into contact associated information, which is code having a predetermined value, regardless of whether information other than the asynchronous information is included in the state information obtained by the state recognition unit.

And according to a seventh aspect of the invention, in addition to the data collection system of the sixth aspect, the asynchronous information is production count information indicating a production count for the equipment.

With this arrangement, network traffic can be reduced.

According to an eighth aspect of the invention, in addition to the data collection system of the second aspect, the analysis unit employs two or more sets of contact associated information to obtain operator moving time information, which concerns moving time for a operator, and restoration time information, which concerns a restoration time. According to a ninth aspect of the invention, in addition to the data collection system of the eighth aspect, the analysis unit includes:

a operator moving time information acquisition unit, for obtaining, based on two or more sets of contact associated information, information concerning a period extending from the start of the ON state of a buzzer to the OFF state, and defining the information as operator moving time information; and a restoration time information acquisition unit, for employing, after the buzzer has been changed from on to off, two or more sets of contact associated information to obtain information concerning a period required before the equipment is normal operation, and defining the information as restoration time information.

With this arrangement, information concerning the operation of the equipment can be easily obtained, without changing the related-art procedures followed by operators at a job site. That is, in the related art, when a fault has occurred at a common equipment, an operator is notified by a buzzer. Then, the operator moves to the reequipment, and halts the buzzer sound by pressing, for example, a buzzer stop button. This is normally done to notify other operators that someone who can handle the fault has arrived at the pertinent apparatus. In other words, should the buzzer sound continue, two or more operators may move to the equipment to remove a fault. This is an inefficient situation. According to the arrangement of the invention, information concerning the operation of the equipment can be obtained without having to change the normal process described above.

According to a tenth aspect of the invention, in addition to the data collection system of the ninth aspect, the analysis results output unit includes:

a moving time histogram output unit, for preparing, based on operator moving time information obtained by the operator moving time information acquisition unit, a histogram that employs, as respective axes, operator moving time, which is represented by the operator moving time information, and a frequency at which movement during the pertinent moving time occurred and/or a total time for one or more movements during the moving time, and for outputting the histogram; and a restoration time histogram output unit for, based on restoration time information obtained by the restoration time information acquisition unit, preparing a histogram that employs, as respective axes, a restoration time, which is represented by the restoration time information, and a frequency of an occurrence of a restoration requiring the restoration time and/or a total time for one or more restorations each of which require the restoration time, and for outputting the histogram.

With this arrangement, a countermeasure at a production job site can be easily effected. Specifically, when the moving time is displayed using a histogram, it is possible to determine whether the frequency at which the equipment was halted is higher when the moving time was long or when the moving time was short. When the frequency at which the equipment was halted during a long moving time is high, it is apparent that the arrangement of operators is a problem. When the restoration time is displayed using a histogram, it is possible to determine whether the frequency at which the equipment was halted was higher when the restoration time was long, or when the restoration time was short. When the restoration time was long, it can be assumed that "trouble halts" occurred frequently, and that countermeasures for "trouble halts" are required. When the restoration time was short, it can be assumed that "short time halts" occurred frequently and that countermeasures for "short time halts" are required. By displaying the histogram in this manner, a counterplan for a equipment can be determined and supported. It should be noted that a "short time halt" is a short equipment stop event, such as a clogged conveying line, and that the equipment operation can be quickly restored by performing a comparatively easy process. A "trouble halt", however, is a comparatively long equipment stop event that occurs as a result of a fault for which practical countermeasures have not yet been commonly employed, e.g., either operators other than those having special skills can not handle the fault, or to determine the required corrective action a manual or manuals must be referred to.

According to an eleventh aspect of the invention, in addition to the data collection system of one of the eighth to the tenth aspects, the contact associated information includes time information, which is time related information, and the analysis apparatus includes:

a correction unit, for correcting, based on a period that the state recognition unit requires to acquire state information, correcting the operator moving time information and the restoration time information.

With this arrangement, accurate timing of a state change, such as the occurrence of a fault or a recovery operation, for the equipment can be obtained. As a result, the cause of a fault can be found easily.

According to a twelfth aspect of the invention, in addition to the data collection system of one of the second to the eleventh aspects, the data collection apparatus employs different network interfaces to connect to the divergence apparatus and to connect to the analysis apparatus.

With this arrangement, a data collection network can be built that is independent of a general network installed in an office, and without constituting a threat to the network traffic in the office, information concerning the operation can be collected. A system configuration for which network traffic is taken into account is especially important in a plant where, for a production system, an extremely large number of equipments have been provided.

According to a thirteenth aspect of the invention, in addition to the data collection system of the second aspect, the analysis unit employs two or more sets of contact associated information to obtain operator moving time information, which concerns the moving time for a operator, and restoration time information, which concerns a restoration time.

With this arrangement, a collected operating data log can be analyzed. Through this analysis, for example, solutions such as the need to increase the number of operators or the need to establish restoration procedures can be found.

According to a fourteenth aspect of the invention, in addition to the data collection system of the thirteenth aspect, the analysis unit includes:

a operator moving time information acquisition unit, for obtaining, based on two or more sets of contact associated information, information concerning a period extending from the start of the ON state of a buzzer to the OFF state, and defining the information as operator moving time information; and a restoration time information acquisition unit, for employing, after the buzzer has been switched from on to off, two or more sets of contact associated information to obtain information concerning a period required before the equipment is normal operation, and defining the information as restoration time information.

With this arrangement, information concerning the operation of the equipment can be easily obtained, without changing the related-art procedures followed by operators at a job site. That is, in the related art, when a fault has occurred at a common equipment, a operator is notified by a buzzer. Then, the operator moves to the reequipment and halts the sound of the buzzer by pressing, for example, a buzzer stop button. This is normally done to notify other operators that someone who can handle the fault has arrived at the pertinent apparatus. In other words, should the buzzer sound continue, two or more operators may move to the equipment to remove a fault. This is an inefficient situation. According to the arrangement of the invention, information concerning the operation of the equipment can be obtained without having to change the normal process described above.

According to a fifteenth aspect of the invention, in addition to the data collection system of the fourteenth aspect, the analysis results output unit includes:

a moving time histogram output unit, for preparing, based on operator moving time information obtained by the operator moving time information acquisition unit, a histogram that employs, as respective axes, operator moving time, which is represented by the operator moving time information, and a frequency at which movement during the pertinent moving time occurred and/or a total time for one or more movements during the moving time, and for outputting the histogram; and a restoration time histogram output unit for, based on restoration time information obtained by the restoration time information acquisition unit, preparing a histogram that employs, as respective axes, a restoration time, which is represented by the restoration time information, and a frequency for an occurrence of a restoration requiring the restoration time and/or a total time for one or more restorations, each of which require the restoration time, and for outputting the histogram.

With this arrangement, a countermeasure at a production job site can be easily effected. Specifically, when the moving time is displayed using a histogram, it is possible to determine whether the frequency at which the equipment was halted is higher when the moving time was long or when the moving time was short. When the frequency at which the equipment was halted during a long moving time is high, it is apparent that the arrangement of operators is a problem. When the restoration time is displayed using a histogram, it is possible to determine whether the frequency at which the equipment was halted was higher when the restoration time was long, or when the restoration time was short. When the restoration time was long, it can be assumed that "trouble halts" occurred frequently, and that countermeasures for "trouble halts" are required. When the restoration time was short, it can be assumed that "short time halts" occurred frequently and that countermeasures for "short time halts" are required. By displaying the histogram in this manner, a counterplan for a equipment can be determined and supported. It should be noted that a "short time halt" is a short equipment stop event, such as a clogged conveying line, and that the equipment operation can be quickly restored by performing a comparatively easy process. A "trouble halt", however, is a comparatively long equipment stop event that occurs as a result of a fault for which practical countermeasures have not yet been commonly employed, e.g., either operators other than those having special skills can not handle the fault, or to determine the required corrective action a manual or manuals must be referred to.

According to a sixteenth aspect of the invention, in addition to the data collection system of one of the thirteenth to the fifteenth aspects, the contact associated information includes time information, which is time related information, and the analysis apparatus includes:

a correction unit, for correcting, based on a period that the state recognition unit requires to acquire state information, correcting the operator moving time information and the restoration time information.

With this arrangement, accurate timing of a state change, such as the occurrence of a fault or a recovery operation, for the equipment can be obtained. As a result, the cause of a fault can be found easily.

According to a seventeenth aspect of the invention, in addition to the data collection system of the second aspect, the analysis unit further includes:

an operating data statistical processor, for calculating the total of durations of the individual states indicated by the state information for the equipment, wherein the analysis results output unit outputs a graph showing occurrence rates for the states based on the total, obtained by the operating data statistical processor, of durations for the states that are indicated by the state information.

With this arrangement, the occurrence rate of each state can be easily obtained for each equipment, and a measure for a production job site, such as an increase in productivity or an improvement in quality, can be easily performed.

According to an eighteenth aspect of the invention, in addition to the data collection system of the second aspect, the analysis unit includes:

an operating data statistical processor, for calculating durations or/and frequencies of individual states indicated by state information for the equipment. Further, based on the durations or/and frequencies obtained by the operating data statistical processor, the analysis results output unit outputs histograms for frequencies of the states.

With this arrangement, the durations or/and frequencies of the individual states can be easily obtained for each equipment, and a measure for a production job site, such as an increase in productivity or an improvement in quality, can be easily performed.

According to a nineteenth aspect of the invention, in addition to the data collection system of the second aspect, the analysis unit includes:

an operating data statistical processor, for calculating ON durations and frequencies for the individual states indicated by state information for the equipment, and for also calculating OFF durations and frequencies for the states. Furthermore, based on the ON durations and frequencies and the OFF durations, and frequencies for the individual states that have been obtained by the operating data statistical processor, the analysis output unit outputs ON histograms and OFF histograms that represent ON and OFF frequencies for the states.

With this arrangement, a trend in the occurrence of an operating state can be clearly categorized.

According to a twentieth aspect of the present invention, in addition to the data collection system of the nineteenth aspect, the operating data statistical processor employs the ON duration and the frequency of a state and/or the OFF duration and the frequency of a state to determine an occurrence type that is a type of an occurrence of a state, and the analysis results output unit outputs the occurrence type.

With this arrangement, the trend in the occurrence of an operating state can be more clearly categorized.

According to a twenty-first aspect of the invention, in addition to the data collection system of the nineteenth aspect, the analysis unit includes:

a state identification information storage unit, for storing state identification information that is used to identify a state and one or more occurrence types correlated with each other. Further, the operating data statistical processor employs the ON duration and a frequency of a state and/or the OFF duration and a frequency of a state to determine an occurrence type that is a type of an occurrence of a state, and employs the occurrence type to search the state identification information storage unit and find state identification information. Furthermore, the analysis results output unit outputs the state identification information.

With this arrangement, the trend in the occurrence of an operating state can be clearly categorized, and the state can be easily identified.

According to an twenty-second aspect of the present invention, in addition to the data collection system of the twentieth or twenty-first aspect, the occurrence type is either a "long and frequent occurrence type", a "short and frequent occurrence type", a "long and sporadic occurrence type" or a "short and sporadic occurrence type".

According to a twenty-third aspect of the present invention, in addition to the data collection system of the second aspect, the analysis unit includes:

an operating data statistical processor, for calculating OFF durations and frequencies of individual states indicated by state information for the equipment. Further, the analysis results output unit employs the OFF durations and frequencies of the states, obtained by the operating data statistical processor, to output OFF histograms that represent OFF frequencies of the states.

With this arrangement, the trend in the occurrence of the operating state can be clearly categorized.

According to the data collection system of this invention, operating data concerning existing production facilities can be collected without greatly affecting the production facilities.

BRIEF DESCRIPTION OF THE DRAWINGS

FIG. 9 is a diagram showing an example coding map for the first embodiment.

FIG. 10 is a diagram showing example output contact associated information for the first embodiment.

FIG. 13 is a diagram for explaining the process for calculating moving time and a restoration time for the first embodiment.

FIG. 14 is a diagram showing patterns of decoded operating data logs according to the first embodiment.

FIG. 15 is a diagram showing an analysis results management table of the first embodiment.

FIGS. 16A to 16D are diagrams showing example output histograms according to the first embodiment.

FIG. 18 is a diagram showing an example coding map according to the first embodiment.

FIG. 19 is a diagram showing another example coding map according to the first embodiment.

FIG. 25 is a diagram showing a state duration management table for the second embodiment.

FIG. 35 is a diagram showing a state type management table according to the fourth embodiment.

FIG. 36 is a diagram showing a state identification information management table for the fourth embodiment.

FIG. 37 is a diagram showing a state duration management table for the fourth embodiment.

FIG. 38 is a diagram showing a state duration management table for the fourth embodiment.

FIG. 39 is a diagram showing a state frequency management table for the fourth embodiment.

FIG. 43 is a diagram showing a state identification information management table for the fourth embodiment.

FIG. 44 is a diagram showing an example state identification information that is output for the fourth embodiment.

DETAILED DESCRIPTION

Figure 1:
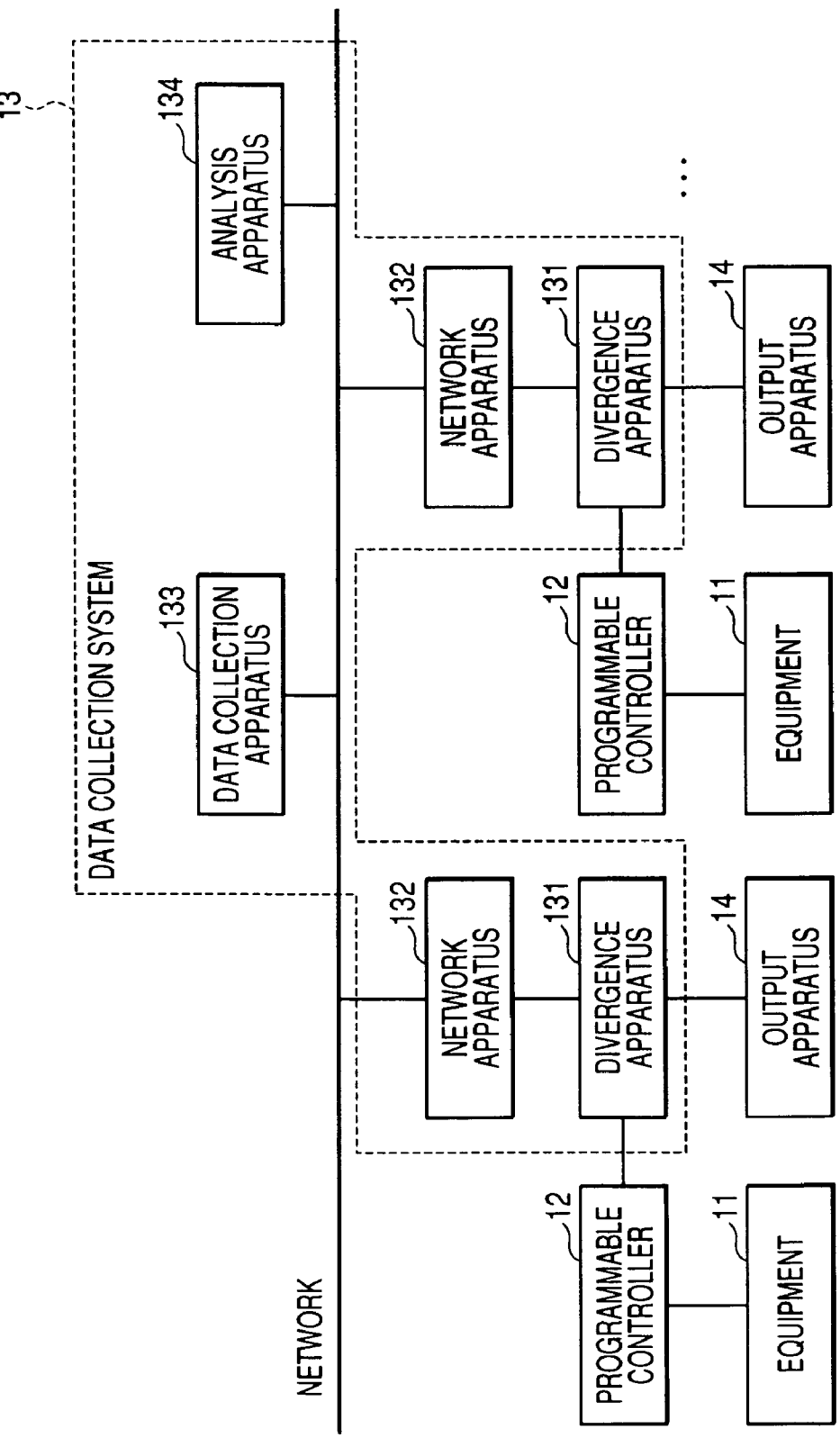
FIG. 1 is a diagram showing the basic configuration of a production system according to a first embodiment of the present invention.

A data collection system, and other systems according to the preferred embodiments of the present invention, will now be described while referring to the accompanying drawings. In the following embodiments, since components denoted by the same reference numerals have the same functions, explanations given for such components may not be repeated.

First Embodiment

FIG. 1 is a diagram showing the basic configuration of a production system according to a first embodiment of the invention. The production system includes: one or more equipments 11, one or more programmable controllers 12, one or more data collection systems 13, and one or more output apparatuses 14. Generally, the equipment 11, the programmable controller 12 and the output apparatus 14 are provided as a set. In this production system, individual sets consisting of a equipment 11, a programmable controller 12 and an output apparatus 14 include a data collection system 13. Further, the individual sets of equipments 11, programmable controllers 12 and output apparatuses 14 are production facilities that are already being operated.

The equipments 11 are those for producing electric apparatuses, machines or other products and parts, and the goods produced are not especially limited.

The programmable controllers 12 are special controllers (computers) that turn output devices on or off in accordance with command signals (e.g., ON/OFF signals) received from input devices, and perform sequence control. In this embodiment, the programmable controllers 12 receive contact information concerning the operation of the equipments 11, and transmit the information to the output apparatuses 14 to control the these apparatuses 14. Further, the programmable controllers 12 include controllers and computers, such as a programmable controller (PC), a sequence controller and a programmable logic controller (PLC), for performing monitoring sequences for the equipments 11. The contact information indicates, for example, the ON/OFF state of a buzzer, the light ON/OFF state or the blinking state for a red, yellow or green signal light, such as an LED or a fluorescent lamp, or the quantity of products produced by a equipment 11. The data structure of the contact information is not specifically designated.

The data collection systems 13 are systems that obtain contact information concerning the operation of the equipments 11. The contact information is acquired from one or more contacts, and information at individual contacts consisting of contact information is ON or OFF pulse information. The data collection systems 13 are respectively located between the equipments 11 and the output apparatuses 14 that output contact information for the operation of corresponding equipments 11. Here, "between" does not mean a spatial gap, but represents a situation wherein at least one apparatus (in this embodiment, a divergence apparatus 131 that will be described later) of a data collection apparatus 13 receives a signal from a equipment 11, and transmits it to an output apparatus 14. For this transmission, the received signal may be transferred either unchanged or after having been processed. Furthermore, the data collection systems 13 receive contact information from the programmable controllers 12. It should be noted that the data collection systems 13 may also receive contact information directly from the equipments 11, and in such a case, the programmable controllers 12 would not be required.

The output apparatuses 14 output contact information by using, for example, a signal light, such as an LED, or generating buzzer sounds. The form of the output apparatus 14 for outputting the contact information is not especially limited. The output in this case is a concept that includes transmission to another apparatus, such as an apparatus having display means, and storage on a recording medium.

Each data collection system 13 includes one or more divergence apparatuses 131, one or more network apparatuses 132, a data collection apparatus 133 and an analysis apparatus 134. In the data collection system 13, the divergence apparatus 131 and the network apparatus 132 are provided as a set, and the data collection system 13 generally includes: two or more sets of divergence apparatuses 131 and network apparatuses 132, one data collection apparatus 133 and one analysis apparatus 134.

The divergence apparatuses 131 obtain contact information concerning the operation of the equipment 11, transmit the contact information to the output apparatuses 14, and also to the network apparatuses 132. In this embodiment, based on the contact information, the divergence apparatuses 131 obtain state information concerning the states of the equipments 11, transform the state information into code, and transmit the coded contact associated information to the network apparatuses 132 Normally, the divergence apparatuses 131 transfer contact information to the output apparatuses 14, unchanged; however, may process the contact information to change the data structure, and transmit the resultant information to the output apparatuses 14. Preferably, contact associated information includes time information concerning time. This time information indicates the time at which a state, indicated by state information corresponding to the time information, has occurred.

Further, it is preferable that contact associated information include a equipment ID, which is information for identifying a equipment 11 that is a source for the generation of contact information.

The network apparatuses 132 receive contact associated information from the divergence apparatuses 131, and transmit this information to the data collection apparatus 133 The same data structure need not be employed for received contact associated information and contact associated information to be transmitted.

The data collection apparatus 133 receives the contact associated information from the network apparatuses 132, and stores it.

The analysis apparatus 134 obtains contact associated information stored in the data collection apparatus 133, and analyzes the information.

Figure 2:
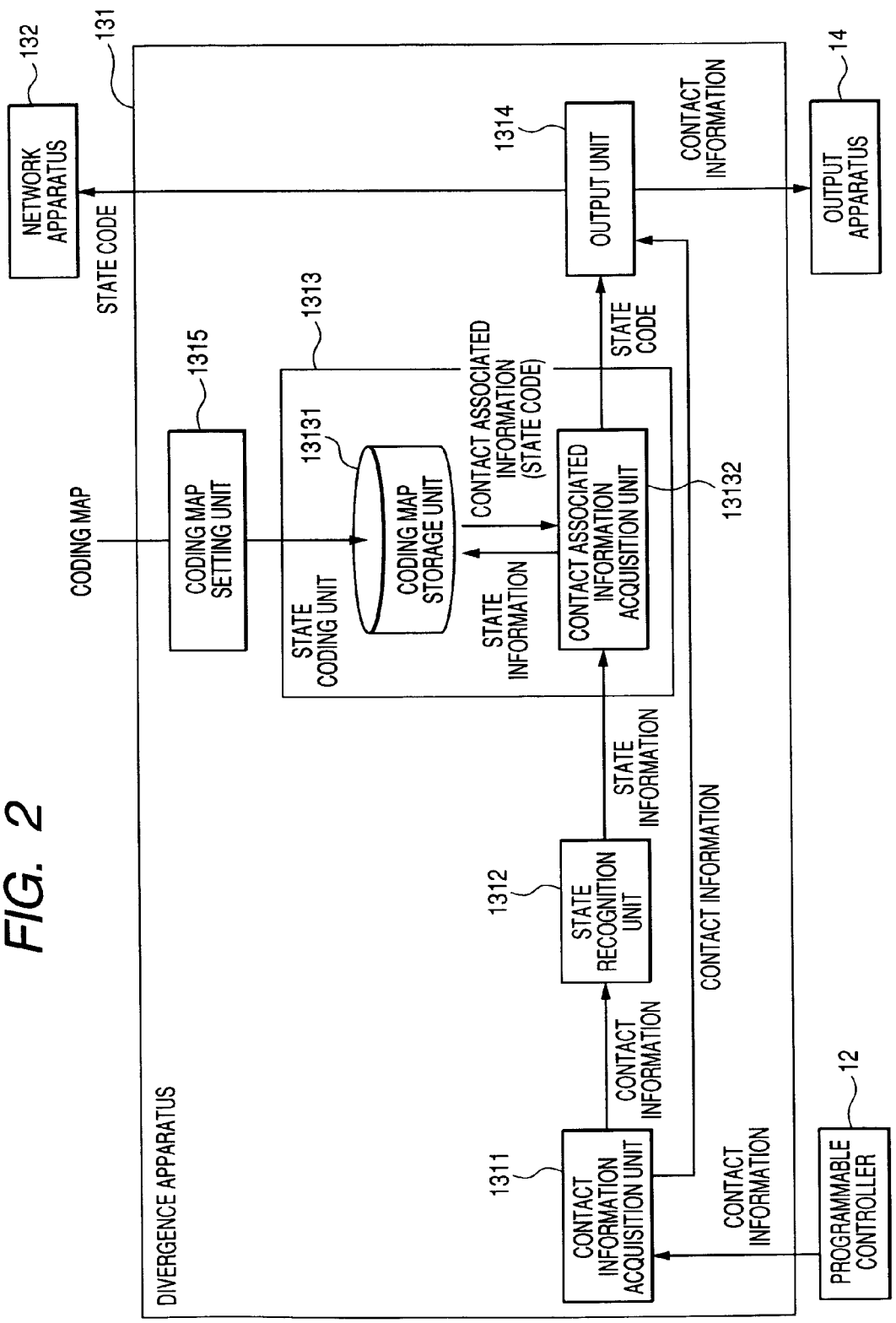
FIG. 2 is a block diagram showing a divergence apparatus according to the first embodiment.

FIG. 2 is a block diagram showing the divergence apparatus 131 in the data collection system 13 The divergence apparatus 131 includes: a contact information acquisition unit 1311, a state recognition unit 1312, a state coding unit 1313, an output unit 1314 and a coding map setting unit 1315.

The state coding unit 1313 includes a coding map storage unit 13131 and a contact associated information acquisition unit 13132.

The contact information acquisition unit 1311 obtains contact information from the equipment 11, directly or indirectly (for example, via programmable controller 12). In this embodiment, the contact information acquisition unit 1311 obtains, through the programmable controller 12, contact information concerning the equipment 11. The contact information acquisition unit 1311 may receive contact information from the programmable controller 12, or read contact information stored in the reequipment 11, i.e., the contact information acquisition method employed by the contact information acquisition unit 1311 is not specifically designated. The contact information acquisition unit 1311 separates a transfer line, for contact information received from the programmable controller 12, into two branches: one branch is to the output unit 1314, so as to output the contact information directly to the output apparatus 14, and the other branch is to the state recognition 1312, so as to perform state recognition. The contact information acquisition unit 1311 can be, for example, an MPU or a memory, or may be a wireless or a wired reception unit. The processing performed by the contact information acquisition unit 1311 is generally provided by software that is recorded on a recording medium, such as a ROM, but may also be provided by hardware (a special circuit).

The state recognition unit 1312 obtains state information, concerning the state of the equipment 11, based on the contact information acquired by the contact information acquisition unit 1311. The state of the equipment 11 includes one of the two states for a buzzer, either ON or OFF, and one of the three states for three types of signal lights, e.g., red, yellow and green lamps, that are lighted, off or blinking. This state can be regarded as a pair of states for a plurality of media, such as a buzzer and a signal light. There are ten state patterns that are paired for all states, and a specific state example will be described later. The state information is information, concerning the state of the equipment 11, that is to be obtained based on the contact information that the contact information acquisition unit 1311 has obtained. In this embodiment, the state information includes: asynchronous information that is generated, asynchronously, with the change in the state of a buzzer and a signal light change. The asynchronous information is production count information concerning the production count for the equipment 1, e.g., information concerning the exchange of dies installed in the equipment 11, information concerning the exchange of a resin employed by the equipment 11, re-insertion information used when a product that was inspected as defective and was corrected is to be inserted, or setup change information used when a setup change is performed. Normally, the state recognition unit 1312 is, for example, an MPU or a memory, and the processing performed by the state recognition unit 1312 is provided by software that is recorded on a recording medium, such as a ROM. However, the processing may also be provided by hardware (a special circuit).

The state coding unit 1313 transforms state information obtained by the state recognition unit 1312 into contact associated information, which is coded information. When state information obtained by the state recognition unit 1312 includes asynchronous information, the state coding unit 1313 transforms contact associated information, which is code having a predetermined value, regardless of the state information other than the asynchronous information. The state coding unit 1313 employs only asynchronous information and omits the other state information to prepare contact associated information, which is coded information. In this case, the analysis apparatus 134 regards the state information other than the asynchronous information as being unchanged from the previous state. An explanation will be specifically given later for a method whereby the state coding unit 1313 transforms state information into contact associated information. Normally, the state coding unit 1313 is, for example, an MPU or a memory, and the processing performed by the state coding unit 1313 is provided by software that is recorded on a recording medium, such as a ROM. However, the processing may also be provided by hardware (a special circuit).

The coding map storage unit 13131 is used to store a coding map, which is information indicating a correlation between state information, that indicates the ON/OFF states of n (n is an integer of two or greater) types, and contact associated information, which is code consisting of (n−1) bits or fewer. The data structure of the coding map is not especially limited, so long as the state information and the contact associated information can be correlated with each other. The state information is an "ON/OFF" pattern for n types of information, i.e., an ON/OFF pattern for five types of information: information indicating that production of a predetermined number of products has been completed; the ON/OFF state of a buzzer; the ON/OFF state of a red LED; the ON/OFF state of a yellow LED; and the ON/OFF state of a green LED. The contact associated information is information consisting of four bits. The coding map storage unit 13131 is preferably a nonvolatile storage medium, such as a hard disk or a ROM; however, a volatile recording medium, such as a RAM, may be used.

The contact associated information acquisition unit 13132 obtains, from the coding map storage unit 13131, contact associated information that corresponds to one or more sets of state information the state recognition unit 1312 has obtained. The contact associated information acquisition unit 13132 may search an externally available coding map, using state information as a key, and obtain contact associated information. In this case, the divergence apparatus 131 does not include a coding map storage unit 13131. Normally, the contact associated information acquisition unit 13132 is, for example, an MPU or a memory, and the processing performed by the contact associated information acquisition unit 13132 is provided by software that is recorded on a recording medium, such as a ROM. However, the processing may also be provided by hardware (a special circuit).

The output unit 1314 transmits to the output apparatus 14 contact information obtained by the contact information acquisition unit 1311, and transmits to the network apparatus 132 contact associated information, concerning the contact information, that is obtained by the state coding unit 1313 through transform. Generally, the output unit 1314 is provided as a wireless or a wired communication unit or broadcasting unit.

The coding map setting unit 1315 stores a coding map in the coding map storage unit 13131. The coding map setting unit 1315 receives a coding map entered using an input unit, such as a keyboard or a mouse, and stores the coding map in the coding map storage unit 13131. An input unit, such as a keyboard or a mouse, may be included in the coding map setting unit 1315.

The network apparatus 132 includes a first contact associated information receiver 1321 and a second contact associated information transmitter 1322.

The first contact associated information receiver 1321 receives contact associated information from the divergence apparatus 131. A wireless communication unit is appropriate for the first contact associated information receiver 1321; however, a broadcasting reception unit or a wired communication unit may also be employed.

The first contact associated information transmitter 1322 transmits to the data collection apparatus 133 contact associated information received by the contact associated information receiver 1321. Generally, the first contact associated information transmitter 1322 is provided by a wireless or a wired communication unit; however, a broadcasting unit may also be employed. The same data structure is employed for the contact associated information received by the first contact associated information receiver 1321 and the contact associated information to be transmitted by the first contact associated information transmitter 1322. However, the network apparatus 132 may change a data structure.

Figure 3:
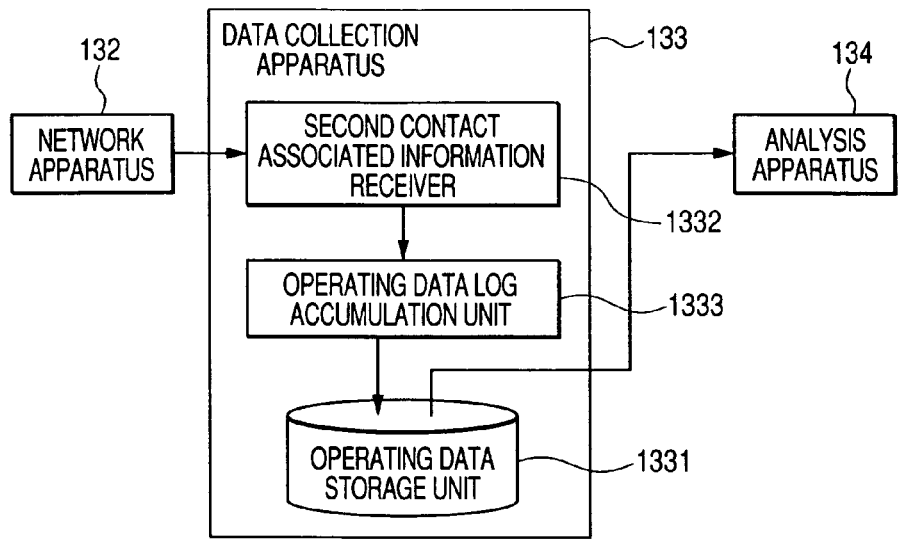
FIG. 3 is a block diagram showing a data collection apparatus according to the first embodiment.

FIG. 3 is a block diagram showing the arrangement of the data collection apparatus 133. The data collection apparatus 133 includes an operating data storage unit 1331, a second contact associated information receiver 1332 and an operating data log accumulation unit 1333.

The operating data storage unit 1331 is used to store contact associated information. A nonvolatile recording medium, such as a hard disk, is appropriate for the operating data storage unit 1331; however, a volatile recording medium, such as a RAM, can also be employed.

The second contact associated information receiver 1332 receives contact associated information from the network apparatus 132. Generally, the second contact associated information receiver 1332 can be provided by a wireless or a wired communication unit, and may also be provided by a broadcast reception unit.

The operating data log accumulation unit 1333 stores in the operating data storage unit 1331 contact associated information received by the second contact associated information receiver 1332. Normally, the operating data log accumulation unit 1333 is, for example, an MPU or a memory, and the processing performed by the operating data log accumulation unit 1333 is provided by software that is recorded on a recording medium, such as a ROM. However, the processing may also be provided by hardware (a special circuit).

Figure 4:
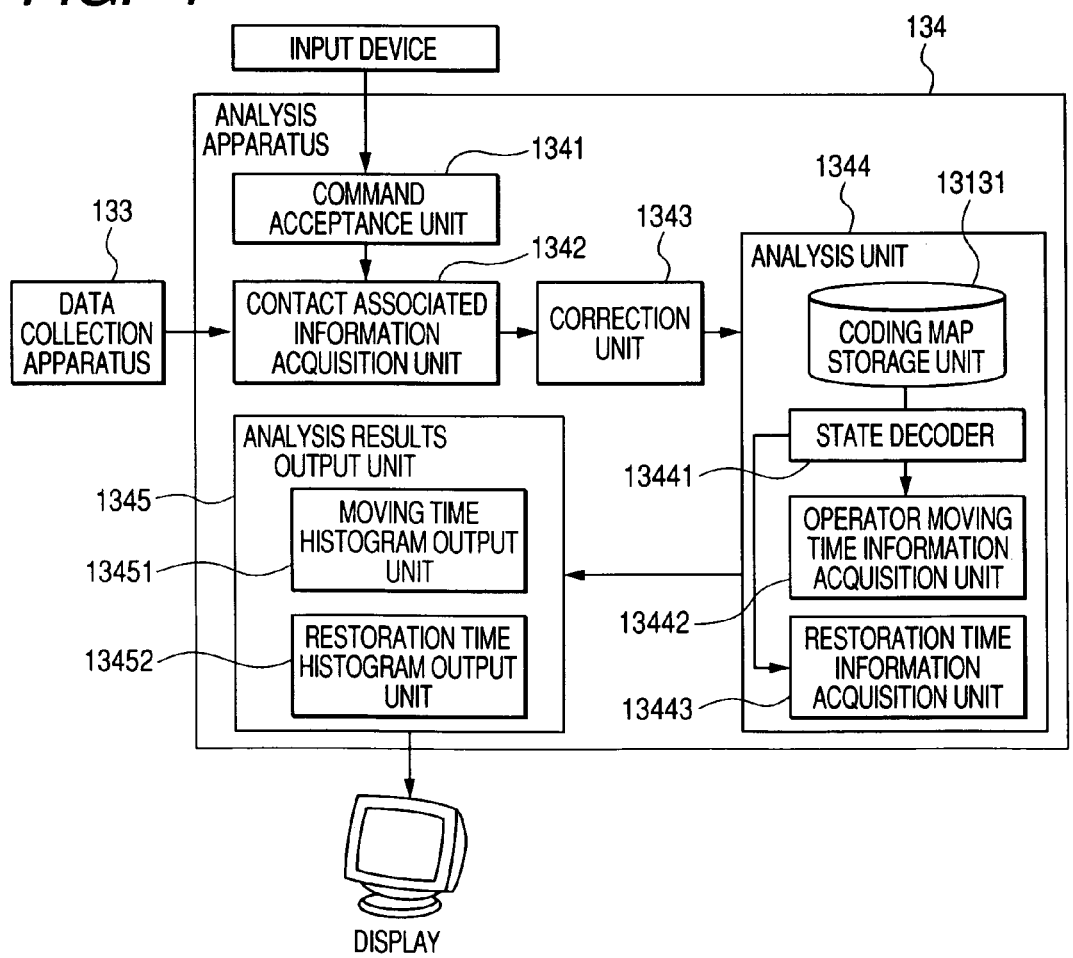
FIG. 4 is a block diagram showing an analysis apparatus according to the first embodiment.

FIG. 4 is a block diagram showing the analysis apparatus 134 constituting the data collection system 13 according to the first embodiment. The analysis apparatus 134 includes an command acceptance unit 1341, a contact associated information acquisition unit 1342, a correction unit 1343, an analysis unit 1344 and an analysis results output unit 1345.

The analysis unit 1344 includes a coding map storage unit 13131, a state decoder 13441, a operator moving time information acquisition unit 13442 and a restoration time information acquisition unit 13443.

The analysis results output unit 1345 includes a moving time histogram output unit 13451 and a restoration time histogram output unit 13452.

The command acceptance unit 1341 accepts a command to start an analysis process. Arbitrary command input means can be employed, such as a ten key pad, a keyboard, a mouse or a menu screen, and the command acceptance unit 1341 can be provided by a device driver for an input device, such as a ten key pad or a keyboard, or control software for a screen menu. The analysis apparatus 134 may start the analysis process by employing, as a trigger, an event that the command acceptance unit 1341 has accepted as a start command for the analysis process, or may automatically start the analysis process when a predetermined time is reached.

The contact associated information acquisition unit 1342 obtains one or more sets of contact associated information (hereinafter referred to as "operating data logs") from the operating data storage unit 1331. Although a trigger or a timing at which the contact associated information acquisition unit 1342 obtains contact associated information is not especially limited, generally, when the command acceptance unit 1341 has received an command from a user, the contact associated information acquisition unit 1342 obtains contact associated information. Further, the contact associated information acquisition unit 1342 obtains, via a communication, an operating data log from the data collection apparatus 133. Normally, the contact associated information acquisition unit 1342 is provided by a wireless or a wired communication unit; however, it may also be provided by a broadcast reception unit.

The correction unit 1343 corrects time information, included in contact associated information, based on a period that the state recognition unit 1312 requires for the acquisition of state information. In this case, the correction unit 1343 stores, in advance, a period that the state recognition unit 1312 requires for the acquisition of state information. Further, for the correction of time information, the correction unit 1343 may employ a period that the state recognition unit 1312 requires for the acquisition of state information that has been transmitted by the divergence apparatus 131 and is stored in the data collection apparatus 133. By delaying the execution time by a value equivalent to the period that the state recognition unit 1312 requires for the acquisition of the state information, the correction unit 1343 can correct the time at which an abnormality occurred in the equipment 11, a time at which a operator pressed a buzzer stop button, a time at which the restoration job was started, or a time at which the job was ended. Since the correction unit 1343 performs a time correction, an accurate time can be obtained when the operator transit information and the restoration time information include time information. Normally, the correction unit 1343 is, for example, an MPU or a memory, and the processing performed by the correction unit 1343 is provided by software that is recorded on a recording medium, such as a ROM. However, the processing may also be provided by hardware (a special circuit). Further, correction unit 1343 may correct one or more sets of state information obtained by the state decoder 13441.

The analysis unit 1344 processes one or more sets of contact associated information obtained by the contact associated information acquisition unit 1342, and obtains predetermined information. Specifically, based on two or more sets of contact associated information (operating data logs), the analysis unit 1344 obtains operator moving time information, which is information concerning the movement time for a operator, and restoration time information, which is information concerning a period required for a restoration job. A specific example for the processing performed by the analysis unit 1344 will be described later. Normally, the analysis unit 1344 is, for example, an MPU or a memory, and the processing performed by the analysis unit 1344 is provided by software that is recorded on a recording medium, such as a ROM. However, the processing may also be provided by hardware (a special circuit).

The state decoder 13441 obtains from the coding map storage unit 13131 one or more sets of state information, which are correlated with one or more sets of contact associated information obtained by the contact associated information acquisition unit 1342. Normally, the state decoder 13441 is, for example, an MPU or a memory, and the processing performed by the state decoder 13441 is provided by software that is recorded on a recording medium, such as a ROM. However, the processing may also be provided by hardware (a special circuit).

Based on one or more sets of state information obtained by the state decoder 13441, the operator moving time information acquisition unit 13442 obtains information concerning a period extending from the time a buzzer is turned on until it is switched off, and defines the obtained information as operator moving time information. Normally, the operator moving time information acquisition unit 13442 is, for example, an MPU or a memory, and the processing performed by the operator moving time information acquisition unit 13442 is provided by software that is recorded on a recording medium, such as a ROM. However, the processing may also be provided by hardware (a special circuit).

Based on two or more sets of contact associated information acquired by the restoration time information acquisition unit 13443, information is obtained concerning the period required for the reequipment 11 to resume normal operation after the buzzer was switched from on to off, and defines the obtained information as restoration time information. Generally, a operator in charge of a restoration job switches a buzzer from on to off, and an operating unit (e.g., a button or a switch) for turning the buzzer off is usually included in the equipment 11, or is positioned somewhere around the periphery of the equipment 11. When the operator in charge manipulates the operating unit to turn off the buzzer, the programmable controller 12, for example, detects the manipulation of the operating unit, to turn off the buzzer, and transmits a notification of this event to the divergence apparatus 131. Normally, the restoration time information acquisition unit 13443 is, for example, an MPU or a memory, and the processing performed by the restoration time information acquisition unit 13443 is provided by software that is recorded on a recording medium, such as a ROM. However, the processing may also be provided by hardware (a special circuit).

The analysis results output unit 1345 outputs predetermined information that includes analysis results obtained by the analysis unit 1344. Here, "output" is a concept that includes presentation of data on a display unit, printing of data performed by a printer, transmission of data to an external apparatus and storage of data on a recording medium. Specifically, in this embodiment, the analysis results output unit 1345 outputs the operating state of the equipment 11 using a graph (a specific example will be described later), or outputs histograms for a moving time and a restoration time. Further, the analysis results output unit 1345 may or may not include an output device, such as a display device. Driver software for an output device, or driver software for an output device and an output device, may be employed to provide the analysis results output unit 1345.

Based on the operator moving time information obtained by the operator moving time information acquisition unit 13442, the moving time histogram output unit 13451 prepares and outputs a histogram that employs, as two axes, a moving time for a operator indicated by the operator moving time information, and a frequency at which movement during the moving time occurred and/or a total time for one or more movement occurrences during the moving time.

Based on the restoration time information obtained by the restoration time information acquisition unit 13443, the restoration time histogram output unit 13452 prepares and outputs a histogram that employs, as two axes, a restoration time indicated by the restoration time information, and a frequency at which a restoration requiring the restoration time occurred and/or a total time for one or more restorations that required the restoration time.

The histogram output process is a well known process, and an example output histogram will be explained later.

The operation of the data collection system 13 will now be described. First, the operation of the divergence apparatus 131 will be explained while referring to the flowchart in FIG. 5.

(step S501) The contact information acquisition unit 1311 substitutes 1 into a counter value i.

(step S502) The contact information acquisition unit 1311 determines whether the i-th contact is present. It should be noted that a contact is a medium that outputs a signal for the operating state of the equipment 11. In this flowchart, assume that n (n is an integer of two or greater) types of contacts are present.

In this flowchart, assume that n (n is an integer of two or greater) types of contacts are present. When the i-th contact is present, program control advances to step S503, or when the i-th contact is not present, program control is shifted to step S509.

(step S503) The contact information acquisition unit 1311 determines whether the contact information for the i-th contact has been obtained. When contact information for the i-th contact has been obtained, program control advances to step S504. When contact information for the i-th contact has not been obtained, program control returns to step S503.

(step S504) The contact information acquisition unit 1311 transmits to the output unit 1314 the contact information obtained at step S503.

(step S505) The contact information acquisition unit 1311 transmits to the state recognition unit 1312 the contact information obtained at step S503.

(step S506) Based on one or more sets of contact information accepted at step S505, the state recognition unit 1312 identifies the state and obtains state information. In this case, for the acquisition of state information, the state recognition unit 1312 employs one or more sets of state information obtained during a predetermined period of time. The state recognition process performed by the state recognition unit 1312 will be described later while referring to the flowchart in FIG. 6.

(step S507) The contact associated information acquisition unit 13132 determines whether the state information has been output at step S506. When the state information has been output at step S506, program control advances to step S508. When the state information has not been not output at step S506, the process at step S503 is repeated.

(step S508) The contact associated information acquisition unit 13132 increments the counter value i by one.

(step S509) The contact associated information acquisition unit 13132 searches the coding map storage unit 13131 by employing one or more sets of state information as a key, and obtains state code (contact associated information) that is paired with one or more sets of state information. When the state information includes asynchronous information, the state code obtained by the contact associated information acquisition unit 13132 is code such that state information other than the asynchronous information can not be identified. An example of this state code will be explained later.

(step S510) The output unit 1314 transmits, to the network apparatus 132, the state code obtained at step S509. It should be noted that the appropriate data size of the state code is equal to or smaller than (n−1) bits.

(step S511) The output unit 1314 outputs to the output apparatus 14 contact information for n types of contacts obtained by the contact information acquisition unit 1311. Upon receiving the contact information, the output apparatus 14 outputs (displays) the received information, unchanged. Thereafter program control returns to step S501.

Figure 5:
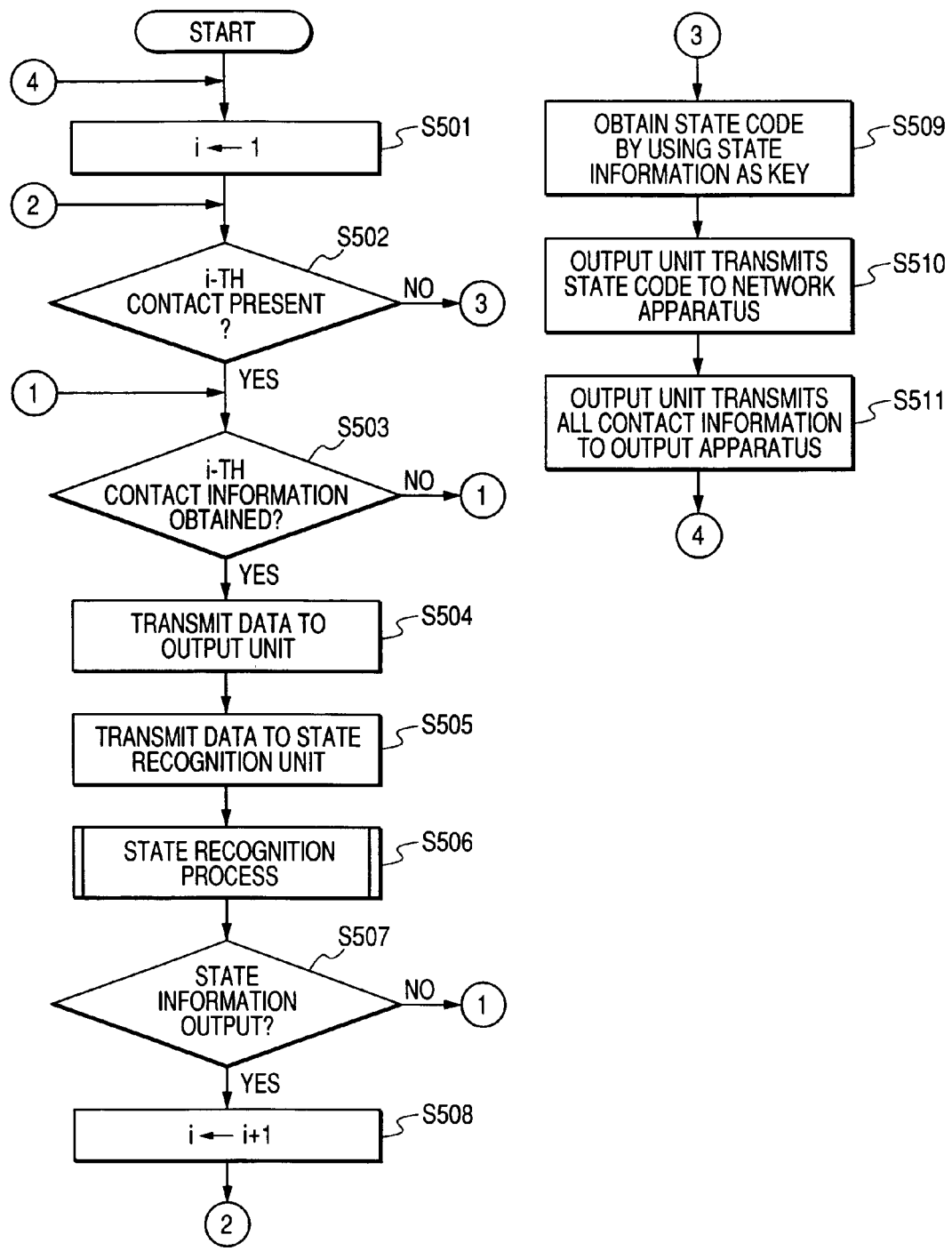
FIG. 5 is a flowchart for explaining the operation of the divergence apparatus of the first embodiment.

In the flowchart in FIG. 5, the contact information acquisition unit 1311 may obtain information for n contacts by performing parallel processing.

The processing in FIG. 5 is terminated by turning the power off, or by a processing end interrupt.

The state recognition process performed by the divergence apparatus 131 will now be described while referring to the flowchart in FIG. 6.

(step S601) The state recognition unit 1312 determines whether the state indicated by contact information is the ON state. When the state is the ON state, program control advances to step S602. When the state is not the ON state, program control is shifted to step S606.

(step S602) The state recognition unit 1312 determines whether the ON state is continued for at least a predetermined period T. When the ON state is continued, program control advances to step S603. When the ON state is not continued, program control is shifted to step S605.

(step S603) The state recognition unit 1312 identifies the state as a light on state or as a buzzer ON state, and prepares state information corresponding to this state.

(step S604) The state recognition unit 1312 outputs the prepared state information and program control returns to a higher function.

(step S605) The state recognition unit 1312 identifies the state as a light off state and prepares state information corresponding to this state. Program control then advances to step S604.

(step S606) The state recognition unit 1312 determines whether the OFF state is continued for at least the predetermined period T. When the OFF state is continued, program control advances to step S607. When the OFF state is not continued, program control is shifted to step S608.

(step S607) The state recognition unit 1312 identifies the state as a light off state or a buzzer OFF state and prepares state information corresponding to this state. Then, program control is shifted to step S604.

(step S608) The state recognition unit 1312 identifies the state as a light off state and prepares state information corresponding to this state. Thereafter, program control is shifted to step S604.

The operation of the network apparatus 132 will now be described. The first contact associated information receiver 1321 of the network apparatus 132 receives contact associated information from the divergence apparatus 131, while the first contact associated information transmitter 1322 transmits the contact associated information to the data collection apparatus 133.

Next, the operation of the data collection apparatus 133 will be explained. The second contact associated information receiver 1332 of the data collection apparatus 133 receives contact associated information from the network apparatus 132, and the operating data log accumulation unit 1333 stores the contact associated information in the operating data storage unit 1331. Upon receiving a request from the analysis apparatus 134, the data collection apparatus 133 transmits to the analysis apparatus 134 a movement information log that includes one or more sets of contact associated information. The analysis apparatus 134 does not need to obtain a movement information log directly from the data collection apparatus 133. The analysis apparatus 134 may read a movement information log from a recording medium on which movement information logs are stored and perform an analysis process.

The operation of the analysis apparatus 134 will now be described while referring to the flowchart in FIG. 7.

(step S701) The command acceptance unit 1341 determines whether an command to start an analysis process has been accepted. When an command for the start of an analysis process has been accepted, program control advances to step S702. When an command for the start of an analysis process has not yet been accepted, program control returns to step S701. The command includes, for example, information for a time period for an analysis target (may also include information for a date), or may be simply a start command. In this case, the analysis apparatus 134 employs, as an analysis target, all contact associated information for the data collection apparatus 133.

(step S702) The contact associated information acquisition unit 1342 obtains from the operating data storage unit 1331 of the data collection apparatus 133 an operating data log for a target designated at step S701.

(step S703) The correction unit 1343 obtains a period (t), which has been stored in advance, that the state recognition unit 1312 requires for the acquisition of state information.

(step S704) The correction unit 1343 employs the period t obtained at step S703 to correct time information that is included in all contact associated information entered in the operating data log acquired at step S702. That is, the correction unit 1343 delays, by the period t, the time indicated by time information included in all the contact associated information entered in the operating data log. For example, when time information included in the contact associated information indicates T1, the correction information 1343 regards (T1−t) as accurate time information.

(step S705) The analysis unit 1344 processes one or more sets of contact associated information, obtained by the contact associated information acquisition unit 1342, and obtains predetermined information (operator moving time and restoration time information). It should be noted that the contact associated information in this case is the information corrected by the correction unit 1343. The analysis process performed by the analysis unit 1344 will be described later in detail while referring to the flowchart in FIG. 8.

(step S706) Based on operator moving time information (the analysis results at step S705) obtained by the operator moving time information acquisition unit 13442, the moving time histogram output unit 13451 prepares a histogram that employs, as two axes, operator moving time indicated by the operator moving time information and a frequency at which movement during the moving time occurred and/or a total time for one or more movements during the moving time.

(step S707) The moving time histogram output unit 13451 outputs the histogram prepared at step S706.

(step S708) Based on the restoration time information (the analysis results at step S705) obtained by the restoration time information acquisition unit 13443, the restoration time histogram output unit 13452 employs, as two axes, a restoration time indicated by the restoration time information, and a frequency at which a restoration requiring the restoration time occurred and/or a total time for one or more restorations requiring the restoration time.

(step S709) The restoration time histogram output unit 13452 outputs the histogram prepared at step S708. The processing is thereafter terminated.

Figure 7:
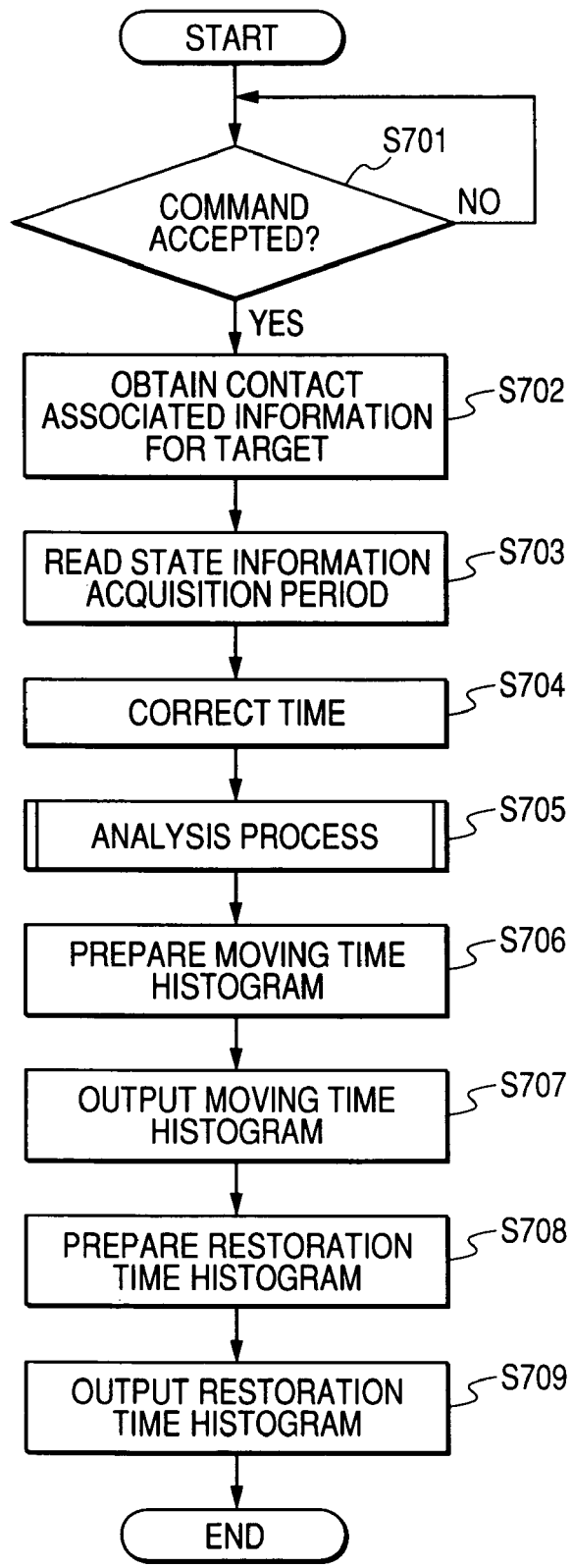
FIG. 7 is a flowchart for explaining the operation of the analysis apparatus of the first embodiment.

In the flowchart in FIG. 7, the analysis results output unit 1345 may output data other than histograms.

The analysis process at step S705 will now be explained while referring to the flowchart in FIG. 8.

(step S801) The analysis unit 1344 substitutes 1 into the counter value i.

(step S802) The analysis unit 1344 determines whether the i-th contact associated information is present in contact associated information obtained by the contact associated information acquisition unit 1342. When the i-th contact associated information is present, program control advances to step S803. When the i-th contact associated information is not present, program control returns to a higher function.

(step S803) The state decoder 13441 obtains from the coding map storage unit 13131 state information corresponding to the i-th contact associated information.

(step S804) The operator moving time information acquisition unit 13442 determines whether state information obtained at step S803 indicates that an abnormality signal light is "ON" and a buzzer is "ON". When the abnormality signal light is "ON" and the buzzer is "ON", program control advances to step S805, or when neither the abnormality signal light nor the buzzer is "ON", program control advances to step S812.

(step S805) The operator moving time information acquisition unit 13442 substitutes 1 into a moving time variable m, which is a variable for measuring moving time.

(step S806) The operator moving time information acquisition unit 13442 substitutes "i+1" into a counter value j.

(step S807) The analysis unit 1344 determines whether the j-th contact associated information is present. When the j-th contact associated information is present, program control advances to step S808, or when the j-th contact associated information is not present, program control returns to a higher function.

(step S808) The state decoder 13441 obtains from the coding map storage unit 13131 state information corresponding to the j-th contact associated information.

(step S809) The operator moving time information acquisition unit 13442 determines whether the state information obtained at step S808 indicates that the abnormality signal light is "ON" and the buzzer is "ON". When the abnormality signal light is "ON" and the buzzer is "ON", program control advances to step S810, or when neither the abnormality signal light nor the buzzer is "ON", program control is shifted to step S813.

(step S810) The operator moving time information acquisition unit 13442 increments a counter value m by one.

(step S811) The operator moving time information acquisition unit 13442 increments the counter value j by one. Program control thereafter returns to step S807.

(step S812) The analysis unit 1344 increments the counter value i by one. Program control then returns to step S802.

(step S813) The operator moving time information acquisition unit 13442 determines whether the obtained state information indicates that the abnormality signal light is "ON" and the buzzer is "OFF". When the abnormality signal light is "ON" and the buzzer is "OFF", program control advances to step S814. When the abnormality signal light is not "ON" and the buzzer is not "OFF", program control is shifted to step S816.

(step S814) The operator moving time information acquisition unit 13442 calculates moving time based on the moving time variable m. Since m is proportional to the number of contact information sets that are output in a period during which a operator is moving, generally, the operator moving time information acquisition unit 13442 defines "m×(time interval at which contact information is output)" as moving time.

(step S815) The restoration time information acquisition unit 13443 substitutes 1 into a restoration time variable r, which is a variable for measuring a restoration time. Program control thereafter advances to step S817.

(step S816) The analysis unit 1344 substitutes "j+1" into the counter value i. Program control thereafter returns to step S802.

(step S817) The restoration time information acquisition unit 13443 increments the counter value j by one. Program control thereafter advances to step S818.

(step S818) The restoration time information acquisition unit 13443 determines whether the j-th contact associated information is present. When the j-th contact associated information is present, program control advances to step S819, or when the j-th contact associated information is not present, program control returns to a higher function.

(step S819) The state decoder 13441 obtains from the coding map storage unit 13131 state information corresponding to the j-th contact associated information.

(step S820) The restoration time information acquisition unit 13443 determines whether the obtained state information indicates that the abnormality signal light is "ON" and the buzzer is "OFF". When the abnormality signal light is "ON" and the buzzer is "OFF", program control advances to step S820. When the abnormality signal light is not "ON" and the buzzer is not "OFF", program control is shifted to step S823.

(step S821) The restoration time information acquisition unit 13443 increments the restoration time variable r by one.

(step S822) The restoration time information acquisition unit 13443 increments the counter value j by one. Then, program control returns to step S818.

(step S823) The restoration time information acquisition unit 13443 determines whether the obtained state information indicates the abnormality signal light is "OFF". When the abnormality signal light is "OFF", program control advances to step S824, or when the abnormality signal light is not "OFF", program control is shifted to step S826.

(step S824) The restoration time information acquisition unit 13443 calculates a restoration time based on the restoration time variable r. Since r is proportional to the number of contact information sets that are output in a period during which a operator is performing a restoration job, generally, the restoration time information acquisition unit 13443 regards "r×(time interval at which contact information is output)" as a restoration time.

(step S825) The analysis unit 1344 prepares analysis results information. The analysis results information includes, for example, time information indicating time of the occurrence of an abnormality, moving time and a period required for a restoration job. Time information for the abnormality is held in contact associated information.

(step S826) The analysis unit 1344 substitutes 0 into the variables m and r.

(step S827) The analysis unit 1344 substitutes "j+1" into the counter value i. Program control thereafter returns to step S802.

An explanation will now be given for specific operations performed by the production system of this embodiment and the data collection system that constitutes this production system. The basic configuration for the production system, including the data collection system, is shown in FIG. 1.

Assume that a programmable computer (the programmable controller 12) installed in the equipment 11 outputs the following patterns as the contact is changed to the ON/OFF state.

Three types of signal lights, i.e., "red", "yellow" and "green" lamps, are present. Each of the red, yellow and green signal lights has three states, light on, blinking and light off.

A buzzer shows either the ON/OFF state.

The programmable controller 12 outputs production count information concerning a production count. Specifically, each time a finished work (e.g., a product) has passed along the production line (the equipment 11), a pulse signal is transmitted to the programmable controller 12. For each 100 pulses received, the programmable controller 12 outputs a pulse. This pulse is asynchronous information that is generated asynchronously.

Further, the individual patterns maybe parallel for information indicating five states, i.e., the states of the three signal lights and the buzzer and the production count information.

The parallel patterns are specifically "red off, yellow blinking, green on and buzzer ON" patterns.

In the data collection system 13 of the production system of this embodiment, the divergence apparatus 131 changes these patterns into bit codes, and the data collection apparatus 133 stores the bit codes. The analysis apparatus 134 decodes state code stored in the data collection apparatus 133, and transforms the state information into, for example, a graph display format, so that a operator can visually understand the time and the period within which each pattern occurred.

FIG. 9 is a diagram showing an example coding map stored in the coding map storage unit 13131. The coding map includes contact associated information and state information. In FIG. 9, state definition information is also entered, which indicates the definition of contact associated information and/or state information. The state definition information is not requisite information for the coding map. In "state definition information column, attribute value "power source OFF" indicates that the power of the equipment 11 is off. Attribute value "normal operation" indicates that the equipment 11 is normal operation. Attribute value "normal operation+no preprocessed works" indicates that the equipment 11 is normal operation, and that no works are present for a preprocess in a plurality of processes for the equipment 11. Attribute value "work full for post process" indicates that works are queued for a post process in a plurality of processes in the equipment 11. Attribute value "no parts (attending)" indicates that there are no parts used for a process, and this manner is currently handled. Attribute value "halt" indicates that the equipment 11 is currently halted. Attribute value "abnormal halt (attending)" indicates that the equipment 11 has been abnormally halted, and this matter is currently being coped with. Attribute value "no parts (unattended)" indicates that there are no parts used for a process, and this condition is not yet being coped with. Attribute value "abnormal halt (unattended)" indicates that the equipment 11 has been abnormally halted, and that this condition is not yet being coped with. Attribute value "100 work passed" indicates that 100 works have been passed.

The state information indicates the states of five types of contacts. In FIG. 9, the following values can be provided for the attribute values of state information. Production quantity "○" is information indicating that 100 works from the programmable controller 12 were passed along one production line (equipment 11). When there is no entry in the production count column, it is assumed that 100 works have not yet passed along one production line (equipment 11). Buzzer "○" indicates that the buzzer is in the ON state, and "X" indicates that the buzzer is in the OFF state. "Red", "yellow" and "green" represent the colors of the signal lights, and "○" for the individual signal lights indicates "light on", "Δ" indicates blinking, and "X" indicates "light off". The divergence apparatus 131 correlates, for example, "○" with "0", "Δ" with "1" and "X" with "2". In FIG. 9, the contact associated information is provided by four bits of code, for which the bit values (0 or 1), individually indicate "state 1", "state 2", "state 3" and "state 4".

A specific operation performed by the data collection system 13 will now be explained.

First, the divergence apparatus 131 of the data collection system 13 branches the path for a signal output by the programmable controller 12 to the output apparatus 14 and to the network apparatus 132. That is, the divergence apparatus 131 outputs this output signal directly to the output unit 14, while the divergence apparatus 132 recognizes the pattern of the output signal (contact information), and outputs, to the network apparatus 132, state code (contact associated information) that matches the pattern. Among these processes, the process for preparing contact associated information based on contact information will now be specifically explained.

Based on contact information obtained by the contact information acquisition unit 1311, the state recognition unit 1312 identifies a state and obtains state information. Specifically, the state recognition unit 1312 identifies patterns for the signal lights, the buzzer and the production count.

The state recognition unit 1312 performs pattern recognition for the signal lights in the following manner. When, for example, one second contact information indicates the ON state, or the OFF state, the state recognition unit 1312 determines that the signal light is on, or the signal light is off. When one second contact information indicates either the light on pattern or the light off pattern, the state recognition unit 1312 determines that the warning light is blinking.

Further, when the buzzer contact is turned on, the state recognition unit 1312 identifies the ON state, or when the buzzer contact is turned off, identifies the OFF state.

Figure 6:
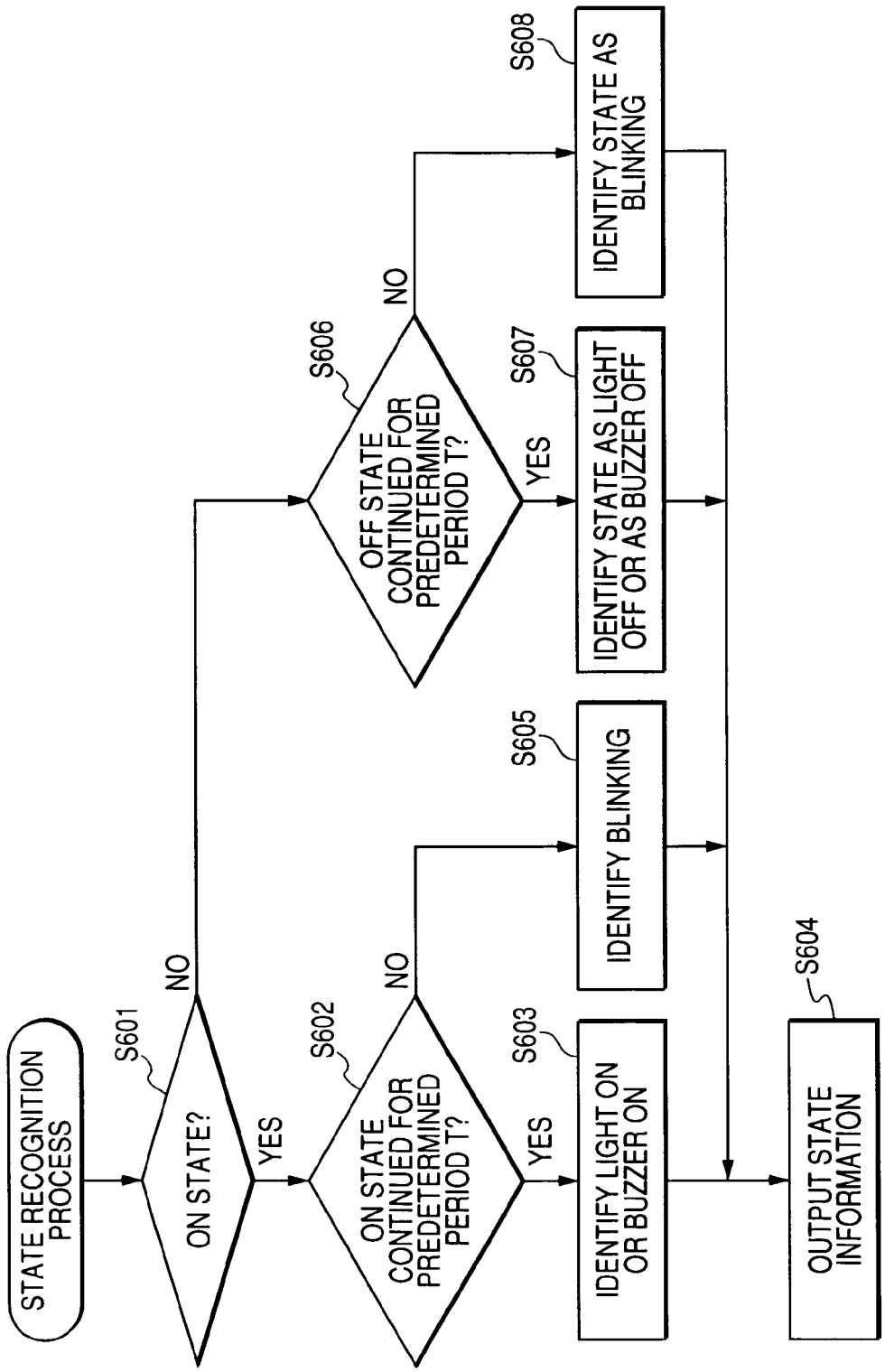
FIG. 6 is a flowchart for explaining the operation of a state recognition processing unit of the first embodiment.

A specific algorithm for state recognition has been explained while referring to FIG. 6.

In this embodiment, when one work is passed along a production line, a pulse signal is transmitted to the programmable controller 12, and the state recognition unit 1312 determines that a counter has counted 100 pulses.

Following this, the contact associated information acquisition unit 13132 obtains, from the coding map storage unit 13131, contact associated information that is correlated with state information that has been identified and obtained by the state recognition unit 1312. In this embodiment, state information is information for five channels, and when this state information is coded by the contact associated information acquisition unit 13132, four bits of data are obtained. Therefore, by performing pattern recognition for state information, the amount of state information stored is reduced, compared with the amount of information that is directly branched and stored as operating data logs. Further, the network traffic is also reduced.

The state recognition unit 1312 outputs a one second pulse (hereinafter referred to as a "count up pulse", as needed) as a signal indicating that 100 pulses have been reached, relative to the production count. The count up pulse is to be very rarely output, while taking into account the pattern changes for the signal lights and buzzer, and also to be generated asynchronously with these changes. By considering this property, it is assumed that the code for the count up pulse is independent of the codes for the signal lights and the buzzer. That is, when the count up pulse is generated, the code ("1111" in FIG. 9) is to be written to the operating data log by an interrupt. As shown in FIG. 9, the independent code ("1111" in FIG. 9) is provided for the production count count-up pulse, and when the state information indicates the ON state, the state recognition unit 1312 overwrites and outputs the code. Then, so long as the production count count-up pulse is being output, the analysis apparatus 134 regards the state as having been continued. That is, when contact associated information is "1111", the analysis apparatus 134 employs the preceding or succeeding contact associated information to obtain the states of the three signal lights "red", "yellow" and "green" and the state of the buzzer. Through this process, the number of contact channels required for data collection can be reduced. Further, network traffic can be reduced.

FIG. 10 is a diagram showing an output example code (contact associated information) for a count up pulse. In FIG. 10, at least one or more records that include attribute values "date", "time" and "contact associated information" are entered. "Contact associated information" includes four bits of information indicating "state 1", "state 2", "state 3" and "state 4". Further, for each record in FIG. 10, contact associated information indicated by attribute value "contact associated information" was output at a time indicated by attribute values "date" and "time". At "12:52:22" in FIG. 10, a signal light/buzzer pattern was (0, 0, 0, 1), i.e., green light ON. Since the production count counter value was incremented to "12: 52:23", a count up pulse was output for one second. Since during the output of the count up pulse the signal light/buzzer pattern was unchanged from green light ON, at "12:52:24" the code was changed again to (0, 0, 0, 1), i.e., returned to green light ON. When the code of the count up pulse was output, the lighting pattern for the signal light and the sound pattern of the buzzer were unknown. However, since the count up pulse was output in a short period of only one second, it is not inconvenient for the green lighting state to be continued while the count up pulse was being output, so long as, as is apparent from the code output example in FIG. 10, the preceding and succeeding states were the same as the green lighting state.

The contact associated information acquisition unit 13132 codes the contact information. The advantage of obtaining bit code for the contact information is as follows. When a pattern is to be identified without bit coding, five channels for contacts (red, yellow, green, a buzzer and a production count) are required for pattern recognition. However, when bit coding is employed for contact information, all the patterns, ten in this embodiment, can be represented by four bits, i.e., four channels, so that the number of channels is reduced to represent patterns.

Further, since an independent code is allocated for information, such as a count up pulse, it is very rarely generated, and log description can be performed by an interrupt. Thus, the number of channels is not unnecessarily increased.

After the state information has been coded by the contact associated information acquisition unit 13132, the output unit 1314 outputs the obtained state code to the network apparatus 132.

Generally, the output unit 1314 outputs to the output apparatus 14 contact information for n types of contacts obtained by the contact information acquisition unit 1311, without being especially processed. Since the output process performed by the output apparatus 14 is a well known process, no detailed explanation for it will be given.

Sequentially, the network apparatus 132 receives coded contact associated information (also called "state code", as needed) from the divergence apparatus 131, and transmits this information to the data collection apparatus 133.

The data collection apparatus 133 receives contact associated information from the network apparatus 132, and stores the received contact associated information in the operating data storage unit 1331. Information stored in the operating data storage unit 1331 is an operating data log consisting of one or more sets of contact associated information. Generally, the contact associated information includes time information (the "date" and "time" information shown in FIG. 10).

Through the above processing, a large amount of contact associated information shown in FIG. 10 is accumulated in the data collection apparatus 133.

A specific operation performed by the analysis apparatus 134 will now be explained.

Assume that the command acceptance unit 1341 of the analysis apparatus 134 accepts an analysis start command from a user.

Then, the contact associated information acquisition unit 1342 obtains an operating data log, having the data structure shown in FIG. 10, from the operating data storage unit 1331 of the data collection apparatus 133.

The correction unit 1343 obtains a period ("t=one second" in this embodiment), which is stored in advance, that the state recognition unit 1312 requires for the acquisition of state information.

Sequentially, the correction unit 1343 employs the obtained period t (one second) to correct a time that is included in all the contact associated information for the obtained operating data log.

A time correction process performed by the correction unit 1343 will now be described while referring to FIG. 11. Assume that the state indicated by contact associated information is the state of a signal light shown in FIG. 11. While referring to FIG. 11, the signal light at time T1 is blinking; however, in order to obtain the blinking state at T0 ("T1−t"), the correction unit 1343 changes time information included in the contact associated information from T1 to T0. Through this process, the analysis apparatus 134 can perform an analysis process based on the state at the exact time, while taking into account the period (t) that the state recognition unit 1312 requires for the acquisition of state information.

Figures 11, 12A, 12B:
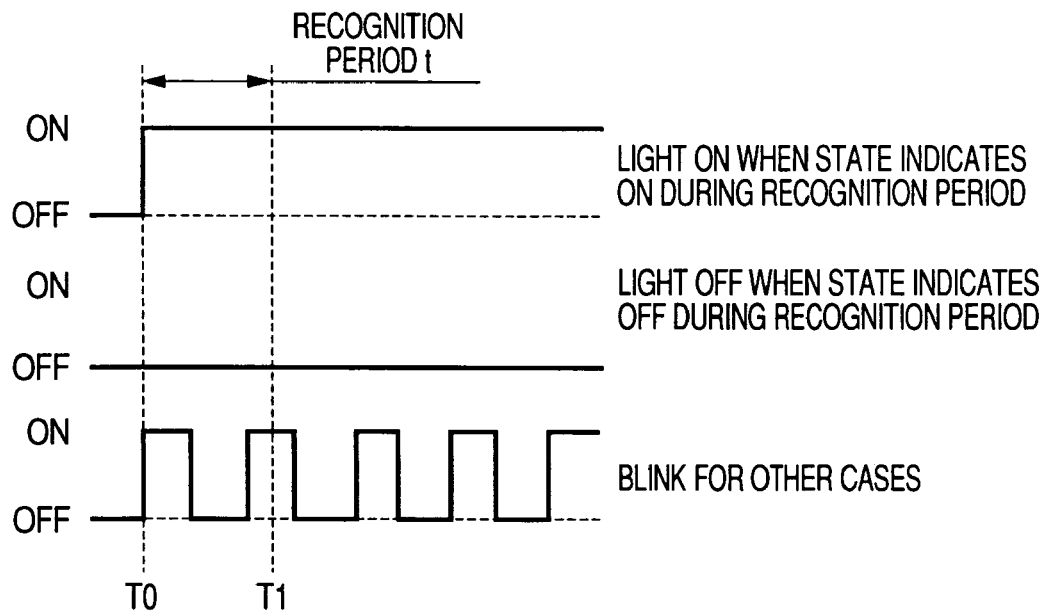
FIG. 11 is a diagram for explaining time correction for the first embodiment.
FIGS. 12A and 12B are diagrams showing example contact associated information before and after time correction is performed for the first embodiment.

Specifically, for example, as shown in FIG. 12, through time correction performed by the correction unit 1343, contact associated information (FIG. 12A) before correction is changed to contact associated information (FIG. 12B) after correction. Using this correction process, the time at which the pattern was changed can be accurately obtained.

Next, the analysis unit 1344 performs the analysis process in the following manner, and obtains operator moving time information and restoration time information based on one or more sets of contact associated information.

The state decoder 13441 of the analysis unit 1344 decodes the contact associated information to state information. As a result, the analysis unit 1344 can obtain information with which a timing chart in FIG. 13 can be prepared.

Following this, moving time and a restoration time are calculated based on the ON/OFF states of an abnormality signal light and a buzzer (operator paging buzzer). The operator moving time information acquisition unit 13442 and the restoration time information acquisition unit 13443 may calculate moving time and a restoration time by employing, as a trigger, the depression of a buzzer halt button, instead of employing the state of the buzzer.

Specifically, assume that a table in FIG. 14 is obtained by decoding and patterning the operating data log (one or more sets of contact associated information). In FIG. 14, since red blinking, i.e., the lighting start time for an abnormality signal light is "12:52:46", and buzzer the stop time is "12:53:01", the operator moving time information acquisition unit 13442 calculates "moving time=buzzer stop time lighting start time for the abnormality signal light=15 (s)". In this case, red blinking indicates an abnormal halt, and green lighting indicates the normal operating state (see state definition information in FIG. 9).

The restoration time information acquisition unit 13443 calculates a "restoration time=resume time−buzzer stop time=12 (m) 4 (s)". It should be noted that, in FIG. 14, the resume time is "13:05:05".

The results obtained by the operator moving time information acquisition unit 13442 and the restoration time information acquisition unit 13443 are at least temporarily stored by using an analysis results management table shown in FIG. 15. The analysis results management table in FIG. 15 includes at least one record consisting of time information indicating an abnormality start time, moving time and a restoration time.

Next, based on the operator moving time information (analysis results in FIG. 15) obtained by the operator moving time information acquisition unit 13442, the moving time histogram output unit 13451 prepares and outputs a histogram that employs, as two axes, the moving time for a operator indicated by the operator moving time information, and a frequency at which a movement in the moving time occurred and/or a total time for one or more movements during the moving time.

Furthermore, based on the restoration time information (analysis results in FIG. 15) obtained by the restoration time information acquisition unit 13443, the restoration time histogram output unit 13452 prepares and outputs a histogram that employs, as two axes, a restoration time indicated by the restoration time information and a frequency at which a restoration requiring the restoration time occurred and/or a total time for one or more restorations that required restoration times.

FIGS. 16A to 16D are diagrams showing specific output example histograms. Transit time histograms are shown in FIGS. 16A and 16B. While referring to FIG. 16A, since the median of the moving time is smaller than a threshold value, it is determined that no problem exists. While referring to FIG. 16B, since the median of the moving time is greater than the threshold value, it is determined that a problem exists, and in this case, an increase in the number of operators is required. It should be noted that the median is a value located in the middle when values are sorted in the ascending order or in the descending order. Furthermore, this determination may be performed by a person, or by the analysis apparatus 134. The output unit 1314 of the analysis apparatus 134 calculates the average moving time, and when the average is greater than a threshold value stored in advance, outputs warning information (displays a message "an increase in operators is required" or releases sounds).

Also, restoration time histograms are shown in FIGS. 16C and 16D. While referring to FIG. 16C, since the median for the restoration time is smaller than a threshold value, it can be determined that a countermeasure for a "short time halt" is required. A "short time halt" is a short equipment stop event, such as clogged conveying line, from which the equipment can be restored by performing a comparatively easy process. While referring to FIG. 16D, since the median for the restoration time is greater than the threshold value, it can be determined that a countermeasure for a "trouble halt" is required. A "trouble halt" is a comparatively long equipment stop event that occurs in the case wherein a practical countermeasure not yet been commonly employed, e.g., either operators other than those having special skills can not handle the fault, or to determine the required corrective action a manual or manuals must be referred to. The countermeasure for a "trouble halt" is, for example, the establishment of procedures for a restoration job. It should be noted that the analysis unit 1344 holds, in advance, information for the threshold value. The analysis unit 1344 may determine whether the median is greater or smaller than the threshold value, and the analysis results output unit 1345 may output information in accordance with the determination results.

The moving time histogram output unit 13451 and the restoration time histogram output unit 13452 specifically perform the following processing, and output the histograms shown in FIGS. 16A to 16D.

Based on records acquired in the past, the moving time histogram output unit 13451 divides the moving time in accordance with suitable levels to form the horizontal axis. The moving time histogram output unit 13451 provides, for the vertical axis, the frequency (the number of times) for the moving time at each level, or the total number of time periods. As a result, it can be ascertained at a glance which moving time adversely affected a period of time halted. When the frequency of short moving times is high, this is not especially a problem, because it is assumed that when a equipment halt occurs, a operator can immediately respond and cope with the problem. On the other hand, when the frequency of long moving times is high, it is assumed that when a equipment halt occurs, it takes time for a operator to arrive at the site, and a problem in the distribution of operators exists. Thus, it is ascertained that the operator distribution planning should be reviewed.

Based on records acquired in the past, the restoration time histogram output unit 13452 divides the restoration time in accordance with suitable levels to form the horizontal axis. The restoration time histogram output unit 13452 provides, for the vertical axis, the frequency (the number of times) at which restoration times were required at each level, or the total time. As a result, it can be ascertained at a glance which restoration time adversely affected conditions during a halt period. When the frequency of short restoration times is high, it is assumed that "short time halts" occurred frequently, and determination of the reasons and the countermeasures required for "short time halts" are required. On the other hand, when the frequency of long restoration times is high, it is assumed that "trouble halts" have occurred frequently, and determination of the reasons and the countermeasures required for "trouble halts" are required.

In this manner, halt periods are displayed using histograms for moving times and for restoration times, so as to provide for support for the determination of methods for improving the operating rate for the equipment.

Figure 17:
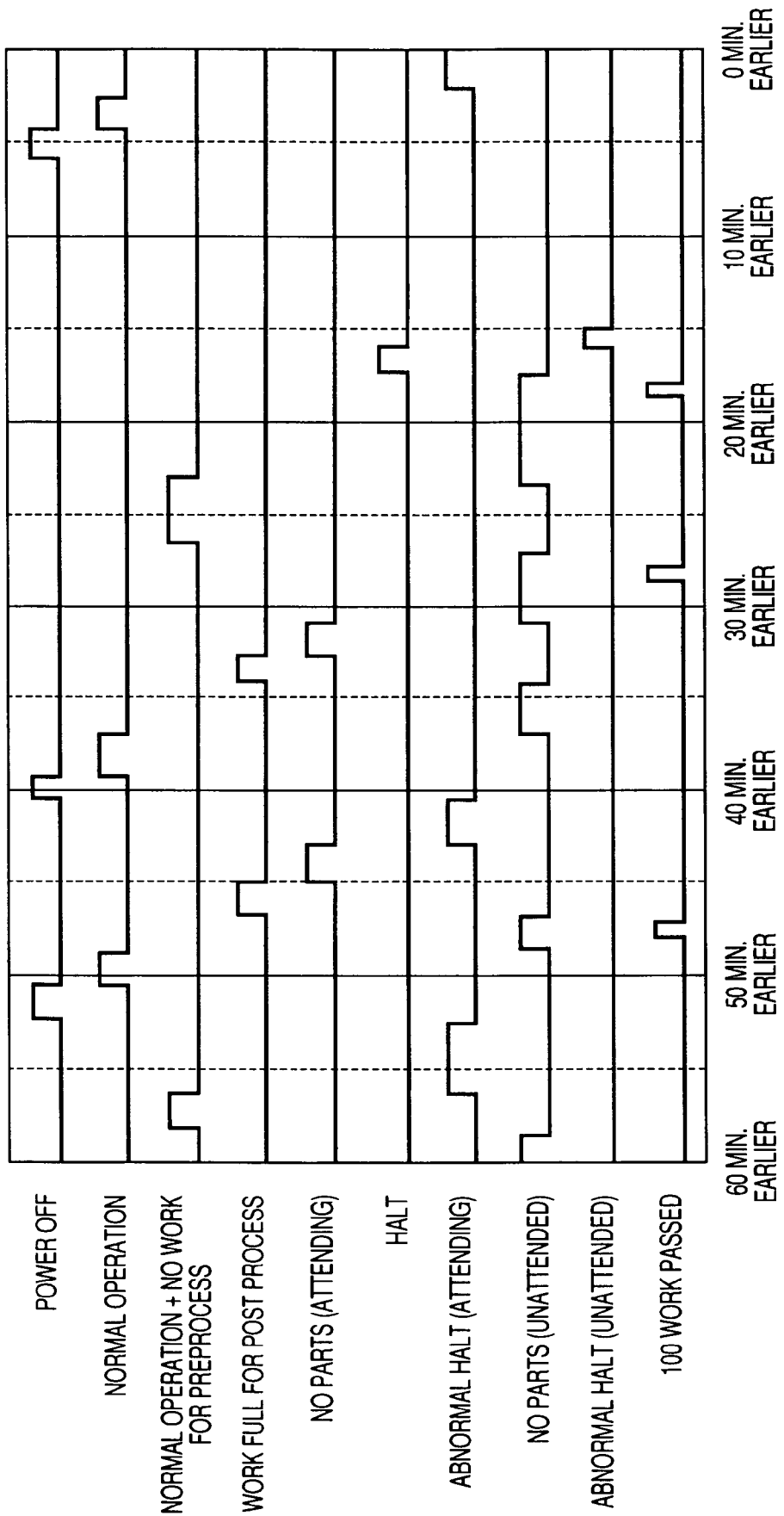
FIG. 17 is a diagram showing example output analysis results for the first embodiment.

The analysis results output unit 1345 may output a graph of the operating information shown in FIG. 17. In this case, the analysis apparatus 134 should also hold the state definition information shown in FIG. 10. Then, state definition information (e.g., "power off" data) correlated with state information is output using a timing chart. Since the process for outputting the timing chart is well known, no detailed explanation for this will be given. It should be noted that the definition for the timing chart is the same as that for a time chart.

According to this embodiment, information concerning the operation of a equipment can be easily obtained, without having to reconstruct a equipment, such as a equipment, or having to greatly change a sequence program, such as a programmable controller, mounted in the equipment. The data collection system of this embodiment is extremely effective, especially when introduced into a large production system, such as a plant.

Further, according to this embodiment, when the analysis apparatus 134 analyzes an operating data log, corrective measures to be taken, such as the need to increase the number of operators or the need to establish procedures for restoration jobs, can be adopted.

Furthermore, according to this embodiment, data to be transmitted to the network apparatus is coded, and network traffic can be reduced. Additionally, only a small amount of data is required for the storage of operating data logs.

Moreover, according to the embodiment, when state information includes asynchronous information that is generated asynchronously with a change in the state of a buzzer and changes in the states of signal lights, regardless of whether state information other than the asynchronous information is obtained, the information can be transformed into contact associated information, which is code having a predetermined value. Therefore, the network traffic can be reduced even more.

Further, according to this embodiment, information (operator moving times and restoration times) concerning the operation of a equipment can be easily obtained, without changing related art procedures for the tasks assigned a operator at a job site (e.g., performance of a duty such that when an abnormality occurs at a equipment, a operator can move to the equipment and press a buzzer stop button). Thus, countermeasures to be taken at a production site can be easily performed.

Furthermore, since moving times are displayed using histograms, it can readily be ascertained whether long moving times or short moving times occurred more frequently when a equipment was halted. And when long moving times were most frequent, it can be assumed that the planning for the disposition of operators should be reviewed. Further, since the restoration time is displayed using histograms, it can be ascertained whether long restoration times or short restoration times occurred most frequently when the equipment was halted. When long restoration times were most frequent, it can be assumed that "trouble halts" occurred most frequently and that appropriate countermeasures for "trouble halts" are required. And when short restoration times were not frequent, it can be assumed that "short time halts" occurred most frequently and that appropriate countermeasures for "short time halts" are required. Since the histograms are displayed in this manner, the process for determining what measures to take for a equipment can be supported.

Since the analysis apparatus includes the correction unit for correcting time, the exact time at which the state of a equipment is changed (e.g., the occurrence of a fault, restoration) can be obtained, and as a result, the cause for a fault, for example, can be easily determined.

In this embodiment, the coding map is not limited to the map shown in FIG. 9, and a map shown in FIG. 18 or 19 may be employed. In FIG. 18 or 19, "–" means "don't care", i.e., can be either "0" or "1".

Figure 20A:
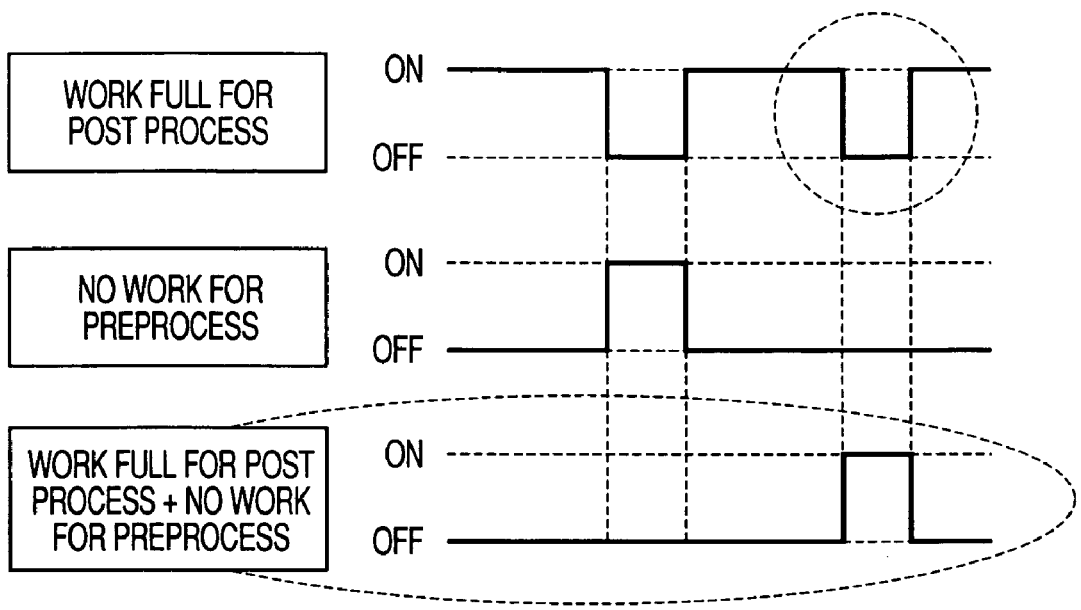
FIGS. 20A and 20B are diagrams for explaining the effects obtained by the coding map for the first embodiment.
Figure 20B:
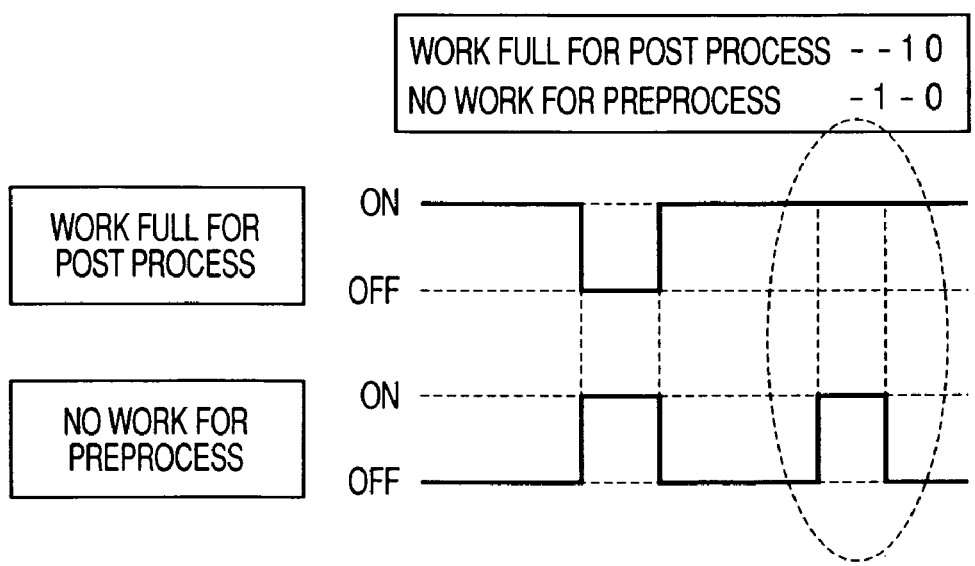

When the coding map in FIG. 18 is employed, for attribute value "no work for a preprocess+work full for post process", state information indicates that a "yellow" signal light is ON and a "green" signal light is blinking (see the seventh record in FIG. 18). For "work full for post process", state information indicates the "green" signal light is blinking (see the third record in FIG. 18). For "no work for preprocess", state information indicates that the "yellow" signal light is ON and the "green" signal light is also ON (see the fifth record in FIG. 18). And while referring to FIG. 18, the operating state "no work for preprocess+work full for post process", which is generated at the same time, is sorted. In other words, in the coding map in FIG. 18, three types of state information can be represented by contact associated information provide using two bits ("state 2" and "state 3" in FIG. 18). Further, according to the coding map in FIG. 18, contact associated information for state information that indicates two or more states ("no work for preprocess" and "work full for post process" in this case) is regarded as the sum ("–110") of correlated contact associated information sets ("–100" and "–010"). That is, "–" (don't care) is regarded as not affecting addition. This is because at a production site many states for a equipment must be transmitted by using a small number of signal lights (hardware). On the other hand, in a production management department, it is preferable that operating states generated at the same time be separated, and that three states, "no works for a preprocess", "work full for post process" and "no works for a preprocess+work full for post process", must be determined based on two output waveforms, instead of three. That is, as shown in FIGS. 20A and 20B, a waveform for "no works for a preprocess+work full for post process", shown at the bottom in FIG. 20A, is put together with "no works for a preprocess" and "work full for post process" (FIG. 20B). As a result, the production management department can ascertain the state of a equipment at a glance. And when a different coding map is employed, the same processes can be employed, for example, for the state code unit 1313, the coding map setting unit 1315, the contact associated information acquisition unit 13132, the analysis unit 1344 and the state decoder 13441.

It should be noted that a circular portion and elliptical portions indicated by broken lines should be referred to for the above described processing.

The functions of the individual apparatuses in this embodiment may be provided using software. This software may be distributed by being downloaded, or by being recorded on a recording medium, such as a CD-ROM. This can be applied for another embodiment for this invention. The software that provides the divergence apparatus in this embodiment is the following program. The program permits a computer to perform:

a contact information acquisition step of obtaining contact information from the equipment, and an output step of transmitting to the output apparatus contact information obtained at the contact information acquisition step, and transmitting, to the network apparatus, contact associated information, which is information concerning the contact information.

Further, preferably, the program permits the computer to perform:

a state recognition step of employing contact information acquired at the contact information acquisition step to obtain state information, which is information concerning a state of the equipment; and a state coding step of transforming the state information obtained by the state recognition unit into coded contact associated information, and whereby, at the output step, the contact information obtained at the contact information acquisition step is transmitted to the output apparatus, and the contact associated information obtained through a transform performed at the state coding step is transmitted to the network apparatus.

Furthermore, preferably, for the program, a coding map storage unit, a coding map is stored that represents a correlation between state information, which indicates state patterns for n contacts (n is an integer of two or greater), and contact associated information, which is code in (n–1) bits or smaller. And, the state coding step includes:

a contact associated information acquisition step of obtaining, from the coding map, contact associated information that is correlated with state information obtained at the state recognition step.

Further, preferably, for the program, the contact outputs the state of a buzzer that is to be set either to the ON or to the OFF state, or the state of a signal light that is to be turned on or off, or to blink. The state information includes: asynchronous information that is generated asynchronously with a change in the state of the buzzer and a change in the state of the signal light. When state information obtained at the state recognition step includes asynchronous information, at the state coding step, the state information is transformed into contact associated information, which is code having a predetermined value, regardless of whether information other than the asynchronous information is included in the state information obtained at the state recognition step.

Further, the software used to provide the analysis apparatus of this embodiment is the following program. The program permits a computer to perform:

a contact associated information acquisition step of reading one or more sets of contact associated information from a data collection apparatus, an analysis step of processing the one or more sets of contact associated information read at the contact associated information acquisition step and obtaining predetermined information, and an analysis results output step of outputting the predetermined information obtained at the analysis.

Further, for the program, at the analysis step, two or more sets of contact associated information may be employed to obtain operator moving time information, which concerns moving time for a operator, and restoration time information, which concerns a restoration time.

Furthermore, for the program, the analysis step includes:

a operator moving time information acquisition step of obtaining, based on two or more sets of contact associated information, information concerning a period extending from the start of the ON state of a buzzer to the OFF state, and defining the information as operator moving time information; and a restoration time information acquisition step of employing, after the buzzer has been changed from on to off, two or more sets of contact associated information to obtain information concerning a period required before the equipment is normal operation, and defining the information as restoration time information.

Additionally, for the program, the analysis results output step includes:

a moving time histogram output step of preparing, based on operator moving time information obtained at the operator moving time information acquisition step, a histogram that employs, as respective axes, operator moving time, which is represented by the operator moving time information, and a frequency at which movement during the pertinent moving time occurred and/or a total time for one or more movements during the moving time, and outputting the histogram; and a restoration time histogram output step of, based on restoration time information obtained at the restoration time information acquisition step, preparing a histogram that employs, as respective axes, a restoration time, which is represented by the restoration time information, and a frequency of an occurrence of a restoration requiring the restoration time and/or a total time for one or more restorations each of which require the restoration time, and outputting the histogram.

Moreover, for the program, the contact associated information includes time information, which is time related information. And the program permits the computer to further perform:

a correction step of correcting, based on a period that acquisition of state information is required at the state recognition step, correcting the operator moving time information and the restoration time information.

Second Embodiment

According to a second embodiment of this invention, an explanation will now be given for an analysis apparatus that performs a statistical process for two or more sets of state information, and obtains statistical data to ascertain the operation situation of one or more equipments.

A production system for this embodiment is the same as that for the first embodiment, except only for an analysis apparatus. The equipment includes: one or more equipments 11, one or more programmable controllers 12, one or more data collection systems 1913 and one or more output apparatuses 14.

The data collection system 1913 includes one or more divergence apparatuses 131, one or more network apparatuses 132, a data collection apparatus 133 and an analysis apparatus 2134.

Figure 21:
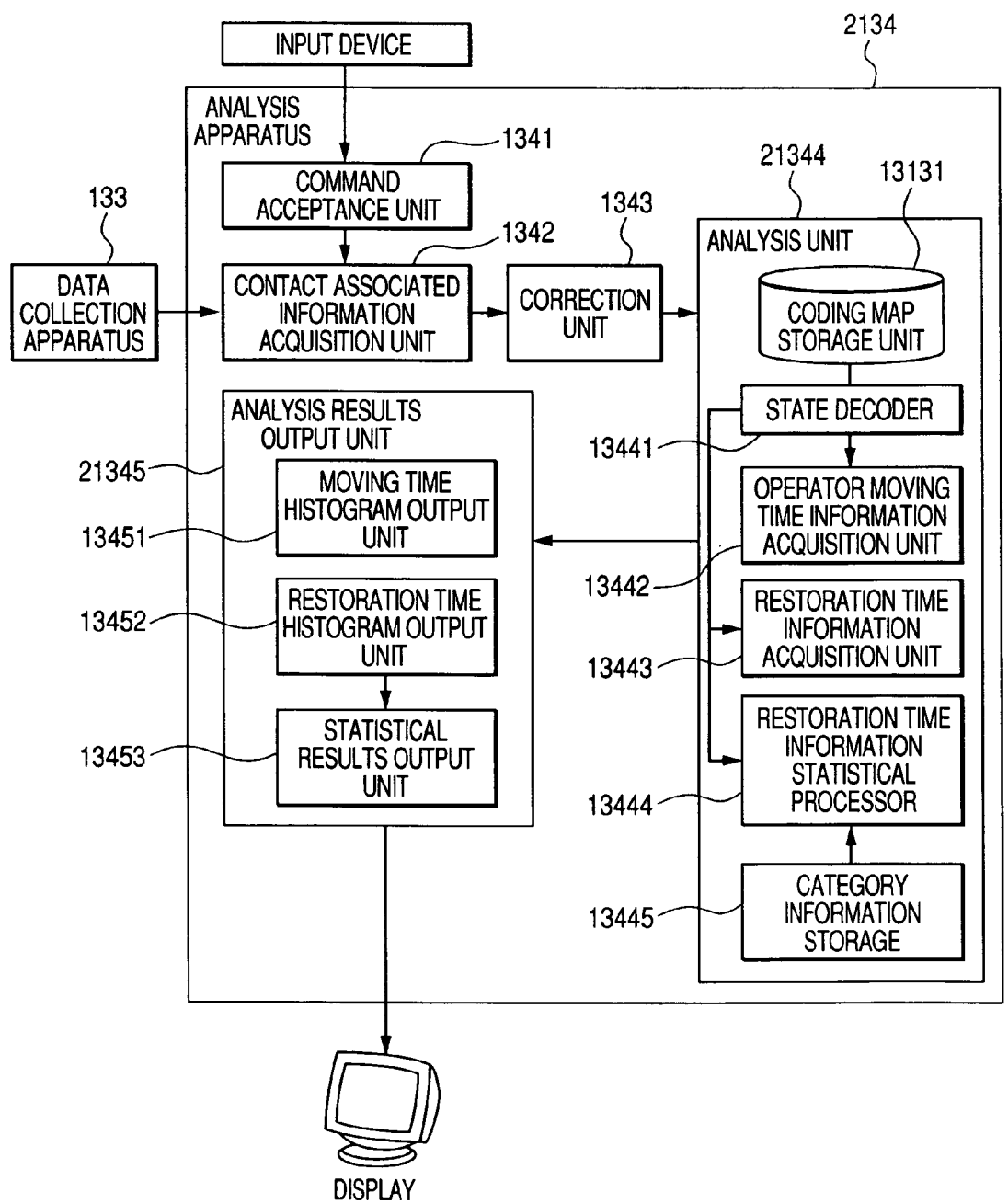
FIG. 21 is a block diagram showing an analysis apparatus according to the second embodiment of the present invention.

FIG. 21 is a block diagram showing the analysis apparatus 2134 constituting the data collection system 1913 according to the second embodiment.

The analysis apparatus 2134 includes an command acceptance unit 1341, a contact associated information acquisition unit 1342, a correction unit 1343, an analysis unit 21344 and an analysis results output unit 21345.

The analysis unit 21344 includes a coding map storage unit 13131, a state decoder 13441, a operator moving time information acquisition unit 13442, a restoration time information acquisition unit 13443, an operating data statistical processor 13444 and a category information storage unit 13445.

The analysis results output unit 21345 includes a moving time histogram output unit 13451, a restoration time histogram output unit 13452 and a statistical results output unit 13453.

The analysis unit 21344 processes one or more sets of contact associated information obtained by the contact associated information acquisition unit 1342, and obtains predetermined information. Specifically, based on two or more sets of contact associated information (operating data logs), the analysis unit 21344 obtains operator moving time information, which is information concerning the movement time for a operator, and restoration time information, which is information concerning a period required for a restoration job. Specifically, in order, for example, to ascertain the operating situations for one or more equipments 11 the analysis unit 21344 performs the statistical process for one or more sets of contact associated information and obtains statistical data. A specific example for the processing performed by the analysis unit 21344 will be described later. Normally, the analysis unit 21344 is, for example, an MPU or a memory, and the processing performed by the analysis unit 21344 is provided by software that is recorded on a recording medium, such as a ROM. However, the processing may also be provided by hardware (a special circuit).

The operating data statistical processor 13444 performs a statistical process for two or more sets of state information obtained by the state decoder 13441, and obtains statistical data to ascertain the operation situation of one or more equipments 11. The operating data statistical processor 13444 calculates, for each equipment 11, a total time of the durations of individual states indicated by the state information. That is, the operating data statistical processor 13444 calculates, for each equipment 11, the durations and the frequencies of individual states indicated by state information, and based on category information that will be described later, divides the obtained durations and frequencies of the states into categories (groups) indicated by the category information.

The category information storage unit 13445 stores category information, which is information for categories for which the operating data statistical processor 13444 performs a statistical process. The category information is information used for categorizing a fault in accordance with a duration that indicates a period during which a specific state (e.g., state "no supply of works from preprocess") is continued, and is completed, for example, "within 1 min. to within 10 min, or every 1 min".

The analysis results output unit 21345 outputs predetermined information that includes analysis results obtained by the analysis unit 21344. Here, "output" is a concept that includes presentation of data on a display unit, printing of data performed by a printer, transmission of data to an external apparatus and storage of data on a recording medium. Specifically, in this embodiment, the analysis results output unit 21345 outputs the operating state of the equipment 11 using a graph (a specific example will be described later), or outputs histograms for a moving time and a restoration time. Specifically, the analysis results output unit 21345 outputs a graph showing, for example, statistical data obtained by the operating data statistical processor 13444. More specifically, for each equipment, the analysis results output unit 21345 employs a total time for the durations of the individual states indicated by state information, and outputs, for example, a pie chart that represents the occurrence rates (temporal rates) of the individual states indicated by state information. Further, specifically, for each state duration indicated by state information, the analysis results output unit 21345 outputs a histogram indicating a frequency. While referring to this histogram, a user can understand the operating situation of the equipment 11. The analysis results output unit 21345 may or may not include an output device, such as a display device. Driver software for an output device, or driver software for an output device and the output device, may be employed to provide the analysis results output unit 21345.

The statistical results output unit 13453 employs a predetermined graph, such as a pie chart or a histogram, to output statistical data obtained by the operating data statistical processor 13444. The process for outputting a pie chart or a histogram is a well known process, and an example output pie chart or histogram will be described later.

The operation of the analysis apparatus 2134 will now be described while referring to the flowchart in FIG. 22. In the flowchart in FIG. 22, only those steps will be described that differ from those in the flowchart in FIG. 7. In step S705, although the analysis process is indicated as "analysis process 1" in order to distinguish from "analysis process 2" and "analysis process 3", the analysis process 1 is the same process of "analysis process" in FIG. 7 and thus its explanation will be omitted.

(step S710) The operating data statistical processor 13444 performs the statistical process for two or more sets of state information obtained by the state decoder 13441, and obtains statistical data in order to ascertain the operating situations for one or more equipments 11. The obtained statistical data pertains to each equipment 11 and represents a total time for the occurrence of state information. This process is referred to as an "analysis process 2". The analysis process 2 will be described in detail later while referring to the flowchart in FIG. 23.

(step S711) Based on the data that represent the total time, obtained at step S710, for the occurrences of the states indicated by the state information, the statistical results output unit 13453 outputs a graph, such as a pie chart, in which the temporal rate of each state is indicated.

(step S712) The operating data statistical processor 13444 performs the statistical process for two or more sets of state information obtained by the state decoder 13441, and obtains statistical data in order to ascertain the operating situations for one or more equipments 11. The obtained statistical data is frequency data for each category that is indicated by category information pertaining to the state indicated state information. This process is referred to as an "analysis process 3". The analysis process 3 will be described in detail later, while referring to the flowchart in FIG. 24.

(step S713) The statistical results output unit 13453 outputs a histogram based on frequency data for each category obtained at step S712. It should be noted that the histogram is output for each equipment 11 and or each state. The processing is thereafter terminated.

Figure 22:
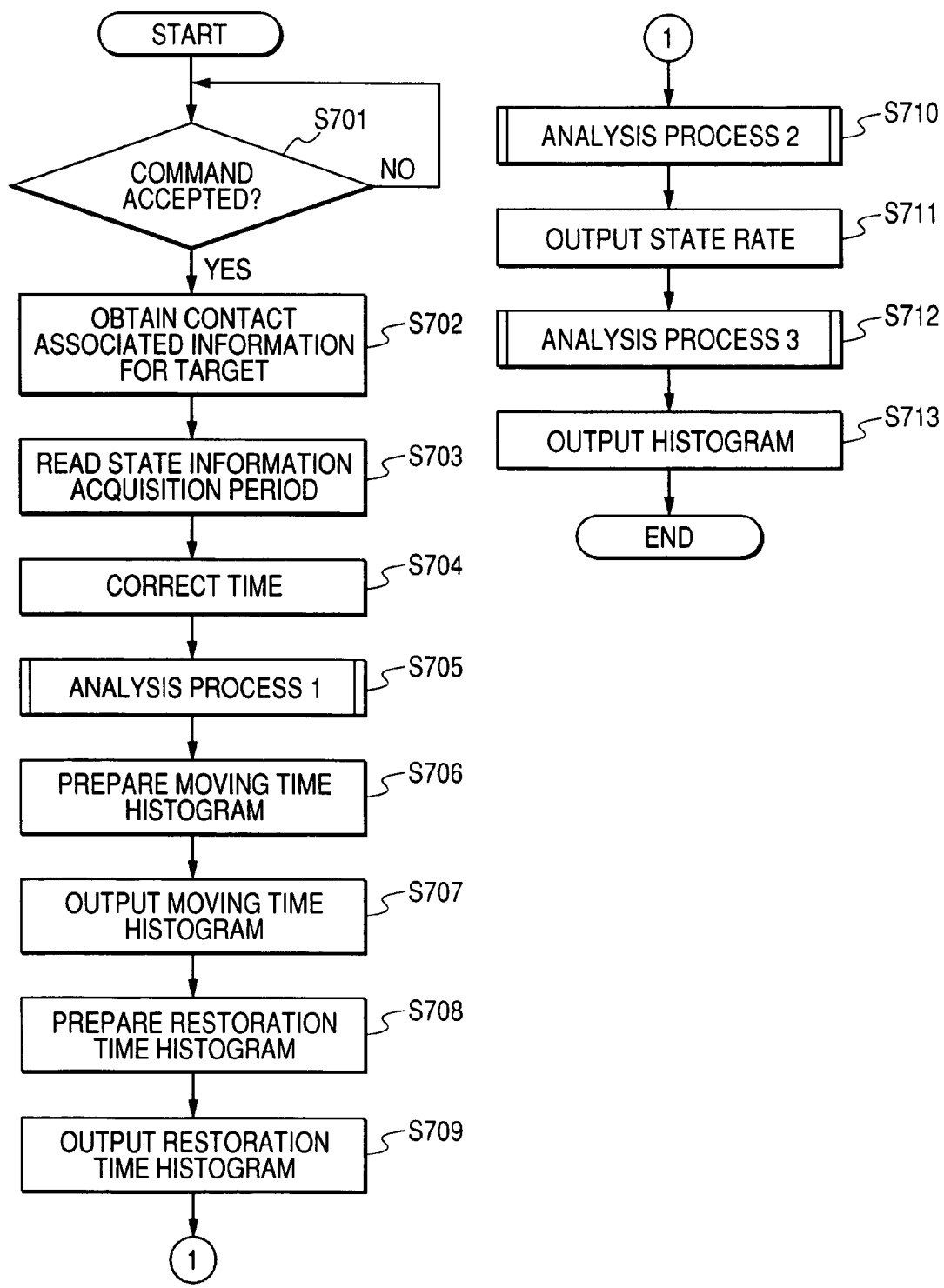
FIG. 22 is a flowchart for explaining the operation of the analysis apparatus of the second embodiment.

In the flowchart in FIG. 22, the analysis results output unit 21345 may employ a form other than a histogram or a pie graph as the output. Further, in the flowchart in FIG. 22, instead of performing the analysis processes 1, 2 and 3 independently, overlapping process may be performed only once.

The analysis process 2 at step S710 will now be described while referring to the flowchart in FIG. 23.

(step S901) The operating data statistical processor 13444 performs the initialization process. The initialization process includes a process for substituting 1 into a counter value i and a process for substituting 0 into a variable corresponding to each set of state information. The variable corresponding to each set of state information is a variable used for calculating a duration for each state indicated by the state information. This variable is referred to as a "state time variable," as needed.

(step S902) The operating data statistical processor 13444 determines whether i-th state information is present among state information (data) obtained at step S808. When the i-th state information is present, program control advances to step S903, or when the i-th state information is not present, program control is shifted to a higher function.

(step S903) The operating information statistical processor 13444 increments, by one, the state time variable that corresponds to the i-th state information.

(step S904) The operating data statistical processor 13444 increments the counter value i by one, and program control returns to step S902.

Figure 23:
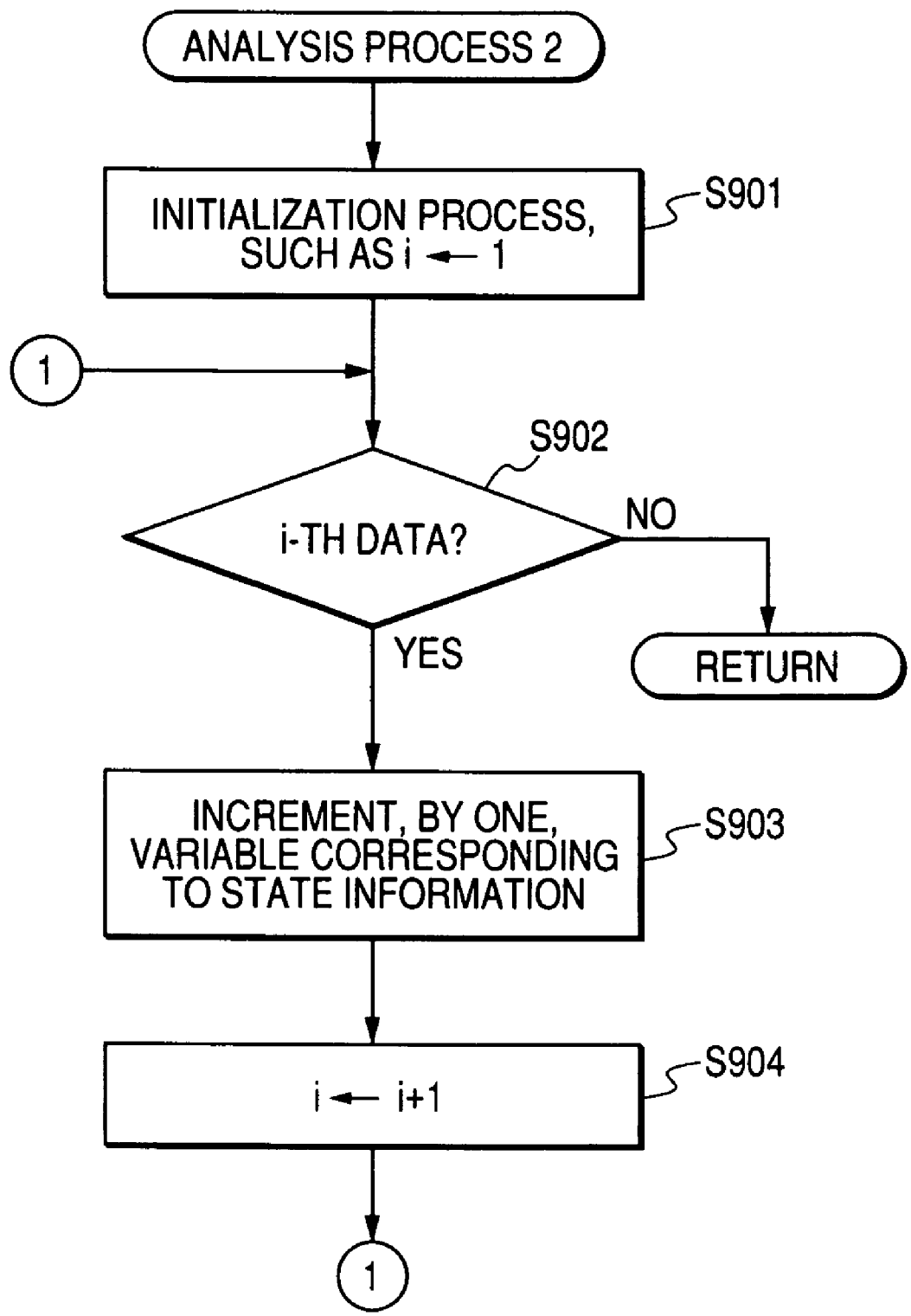
FIG. 23 is a flowchart for explaining the operation of the analysis apparatus of the second embodiment.

In the flowchart in FIG. 23, a period corresponding to the value "1" of a state time variable is a time interval required for the acquisition of constant associated information. Further, a period corresponding to the value "1" for the state time variable is not always "1" second.

The analysis process 3 at step S712 will now be explained while referring to the flowchart in FIG. 24.

(step S1001) The operating data statistical processor 13444 performs the initialization process. The initialization process includes a process for substituting 1 into the counter value i and a process for substituting 0 into each state time variable.

(step S1002) The operating data statistical processor 13442 determines whether the i-th state information is present. When the i-th state information is present, program control advances to step S1003, or when the i-th state information is not present, program control is shifted to step S1007.

(step S1003) The operating data statistical processor 13444 determines whether the i-th state information differs from the previously obtained state information (the (i-th) th state information) (the state is changed). When the state is changed, program control advances to step S1004, or when the state is not changed, program control is shifted to step S1005.

(step S1004) The operating data statistical processor 13444 stores, as a set, information that describes a category indicated by the value of the state time variable for the preceding state, and information indicating the preceding state and the value (duration) of a state time variable. When the categories are "1: in one minute", "2: in two minutes", . . . , "10: in ten minutes" and "11: longer than ten minutes", category information, for example, is ID"2" for each category. For category "1: in one minute", the ID is "1", which means that the pertinent state will be continued in one minute. Information indicating the preceding state may be state information or the ID provided for the state information. The operating information statistical processor 13444 registers, for example, "2, normal operation, 1870". In "2, normal operation, 1870", "2" represents the ID of a category, "normal operation" represents information indicating the preceding state, and "1870" represents the duration (seconds).

(step S1005) The operating data statistical processor 13444 increments, by one, the state time variable that corresponds to the i-th state information.

(step S1006) The operating data statistical processor 13444 increments, by one, the counter value i, and program control thereafter returns to step S1002.

(step S1007) The operating data statistical processor 13444 calculates a total time for each state based on information registered at step S1004. Then, program control returns to a higher function.

In the flowchart in FIG. 24, a "total time", which will be described later, may be calculated.

A specific operation performed by the analysis apparatus 2134 will now be explained.

Assume that the command acceptance unit 1341 of the analysis apparatus 2134 accepts an analysis start command from a user.

Then, the contact associated information acquisition unit 1342 obtains an operating data log, having the data structure shown in FIG. 10, from the operating data storage unit 1331 of the data collection apparatus 133.

The correction unit 1343 obtains a period ("t=one second" in this embodiment), which is stored in advance, that the state recognition unit 1312 requires for the acquisition of state information.

Sequentially, the correction unit 1343 employs the obtained period t (one second) to correct a time that is included in all the contact associated information for the obtained operating data log.

Next, the analysis unit 21344 performs the analysis process in the following manner, and obtains operator moving time information and restoration time information based on one or more sets of contact associated information.

The state decoder 13441 of the analysis unit 21344 decodes the contact associated information to state information. As a result, the analysis unit 21344 can obtain information with which a timing chart in FIG. 13 can be prepared.

First, the analysis unit 21344 performs the analysis process 1 described above.

Next, the operating data statistical processor 13444 performs the analysis process 2 described above. That is, the operating data statistical processor 13444 substitutes 0 into a variable (a state time variable) that corresponds to each set of state information. Following this, the operating data statistical processor 13444 examines a coding map (see FIG. 9), and sequentially obtains state information based on contact associated information shown in FIG. 10. Then, upon each acquisition of state information, the operating data statistical processor 13444 increments, by one, the state time variable that is consonant with the state information. Through this process, the total number of periods can be obtained wherein the individual states, indicated by the state information, occurred.

The operating information statistical processor 13444 obtains a state duration management table in FIG. 25. The state duration management table includes one or more records, each of which includes a "state information ID", "state information", a "state time variable (s)", a "rate (%)" and "state definition information". The "state information ID" is an ID for identifying state information. The "state time variable" is information indicating the total length of the periods wherein the individual states indicated by state information occurred. The "rate (%)" is the rate at which a state indicated by state information occurred. That is, the operating data statistical processor 13444 calculates an attribute value "rate (%)" based on the "state time variable" corresponding to all the state information. In FIG. 25, the "rate (%)" is a value obtained by rounding off to the first decimal place.

Figures 26, 27:
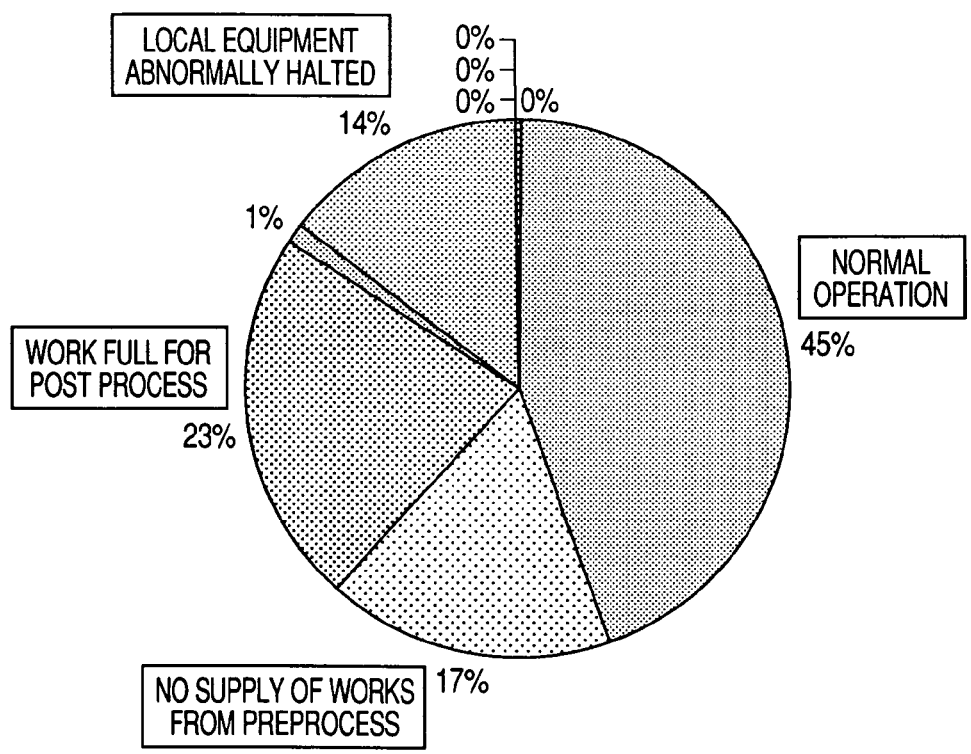
FIG. 26 is a diagram showing an example output graph showing the rates for durations of states according to the second embodiment.
FIG. 27 is a diagram showing a state information duration frequency management table according to the second embodiment.

Next, the statistical results output unit 13453 outputs a pie chart shown in FIG. 26 by employing the "rate (%)" and the "state definition information" in the state duration management table in FIG. 25. The pie chart in this embodiment is a graph showing the temporal rate of each state. By referring to the pie chart in FIG. 26, a user on a production job site can examine a total ON period for the normal operating state and can obtain a rate that corresponds to the operation rate. Further, the user on the production job site can examine other operating information to determine whether the cause of a halt is present in the local equipment, in the preprocess or in the post process.

Following this, the operating information statistical processor 13444 performs the analysis process 3. Specifically, the operating information statistical processor 13444 substitutes 0 into a variable (a state time variable) that corresponds to each set of state information, and obtains state information. Then, the operating data statistical processor 13444 compares the latest obtained state information (i-th state information) with the previously obtained state information ((i−1)th state information), and increments, by one, the state time variable that corresponds to the pertinent state information before the state is changed. When the state is changed, information designating a category indicated by the value of the state time variable for the preceding state, information that indicates the preceding state, and a total time of time are stored as a set. Through this process, frequencies at which the individual states indicated by state information occurred continuously can be obtained as categories. Specifically, the operating data statistical processor 13444 obtains, for example, a state information duration frequency management table shown in FIG. 27. The state information duration frequency management table includes one or more records, each of which includes, as attributes, a "category", a "frequency" and a "total time". The "category" is information used for grouping durations when specific states are continued. The "frequency" is the number of times a specific state was continued for a period indicated in a category. And the "total time" is the total number of the durations, equivalent to the frequencies, for the state in the category.

Figure 28:
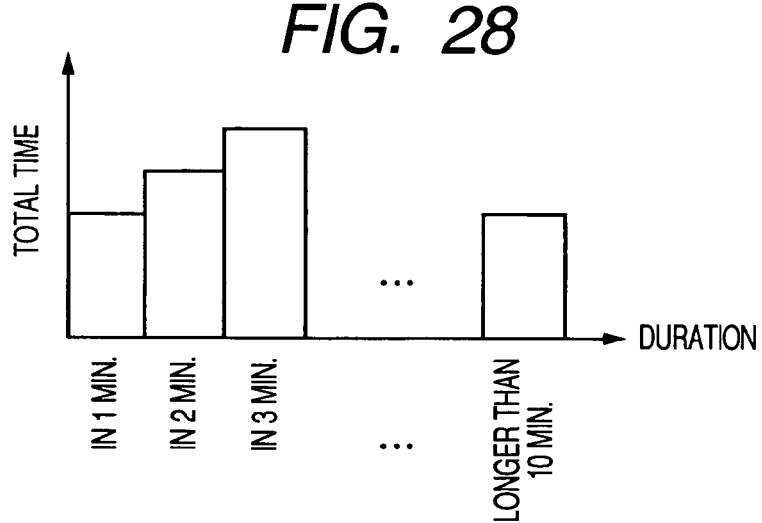
FIG. 28 is a diagram showing an example histogram output by a statistical results output unit according to the second embodiment.

The operating data statistical processor 13444 obtains for each state a state information duration frequency management table. FIG. 28 is a state information duration frequency management table of the state "no work for preprocess", for example.

Sequentially, the statistical results output unit 13453 outputs a histogram based on the obtained state information duration frequency management table. It should be noted that the histogram is output for each equipment 11 and for each state.

FIG. 28 is a diagram showing an example histogram output by the statistical results output unit 13453. In FIG. 28, a "total time" along the vertical axis represents a period obtained by adding, to a value equivalent to a frequency, a duration for each category. Further, in FIG. 28, the horizontal axis is divided into eleven levels (categories), such as in one minute, in two minutes, in three minutes, . . . and longer than ten minutes. For an analysis, it is not proper for the numbers of the occurrences to be displayed, because since events having short durations occur more frequently, the graph tends to incline to the right and downward. Therefore, the "total time" should be provided for the vertical axis, so that a comparison of the individual levels can be easily performed. Further, for example, when as a one minute halt a 30 second halt occurred once, 10 second halts occurred three times and 20 second halts occurred three times, the "total time" is "30×1+10×3+20×3=120 (seconds)".

Figure 29A:
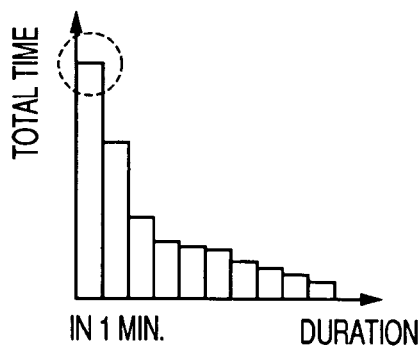
FIGS. 29A to 29D are diagrams showing example histograms output by the statistical results output unit according to the second embodiment.
Figure 29B:
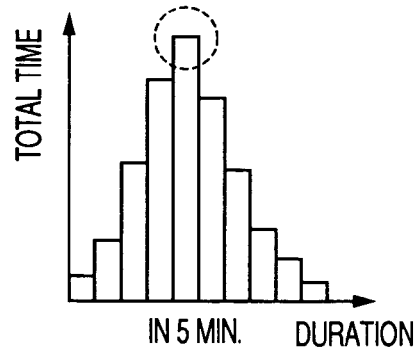
Figure 29C:
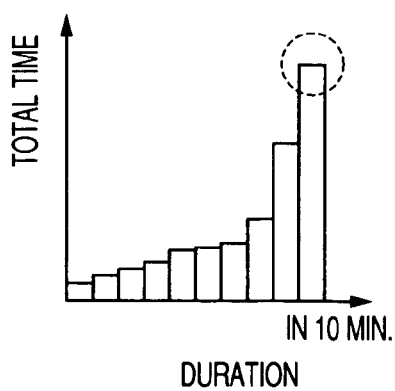
Figure 29D:
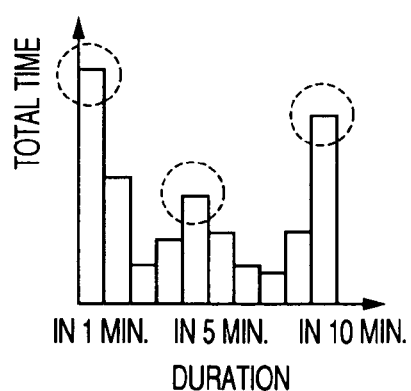

Furthermore, when the statistical results output unit 13453 has output the histograms shown in FIGS. 29A to 29D, a user uses them to ascertain the following. Assume that the histograms in FIGS. 29A to 29D represent the results obtained by measuring the duration and the frequency of the state "no supply of works from preprocess". When the statistical results output unit 13453 outputs the histogram in FIG. 29A, the user determines that a tact balance relative to the preprocess is disturbed. When histogram in FIG. 29B is output, the user determines that a "short time halt" frequently occurred in the preprocess. When the histogram in FIG. 29C is output, the user determines that "trouble halts" occurred frequently during the preprocess. And when the histogram in FIG. 29D is output, the user determines that a plurality of factors are present for a production line defect. These determinations can be arrived at while referring to circular portions indicated by broken lines in the histograms in FIGS. 29A to 29D.

Further, according to this embodiment, in addition to the effects of first embodiment, since statistical data indicating the duration of a specific state, or indicating the occurrence frequency for a specific state is output, the cause of a defect, for example, on a production line can be readily identified.

Furthermore, according to this embodiment, since the analysis apparatus includes the correction unit for correcting the time, the times at which the state of the equipment changed (e.g., upon the occurrence of a fault and the restoration) can be accurately determined, and as a result, the cause of a fault can be easily found.

In this embodiment, as with the first embodiment, the coding map is not limited to the map shown in FIG. 9, and a map shown in FIG. 18 or 19 may be employed. In FIG. 18 or 19, "–" means "don't care", i.e., can be either "0" or "1".

Further, the functions of the individual apparatuses in this embodiment may be provided using software. This software may be distributed by being downloaded, or by being recorded on a recording medium, such as a CD-ROM. This can be applied for another embodiment for this invention. The software that provides the divergence apparatus in this embodiment is the program as mentioned above in the first embodiment.

Additionally, for the above program, the contact associated information includes time information, and the program permits a computer to further execute a correction step of:

employing a period required for the acquisition of state information to correct the operator moving time information and the restoration time information.

Further, for the program, the analysis step includes an operating data statistical processing step of:

calculating the durations of the individual states indicated by state information for one or more equipments. Further, it is preferable, at the analysis results output step, that a graph of the occurrence rate for a state be output based on the total time, obtained at the operating data statistical processing step, for the durations of the states indicated by state information.

Further, for the program, the analysis step includes an operating information statistical processing step of:

calculating the durations or/and the frequencies of individual states indicated by state information for one or more equipment. Further, it is preferable that, at the analysis results output step, histograms showing the frequencies of the individual states be output based on the durations and/or the frequencies obtained at the operating data statistical processing step.

Third Embodiment

An explanation will now be given for a third embodiment of the present invention, wherein a data collection apparatus includes two network interfaces, and separates a network by which information is obtained that indicates the operation of a equipment from a network by which data is provided for an analysis apparatus, so that network traffic is reduced and congestion is avoided.

Figure 30:
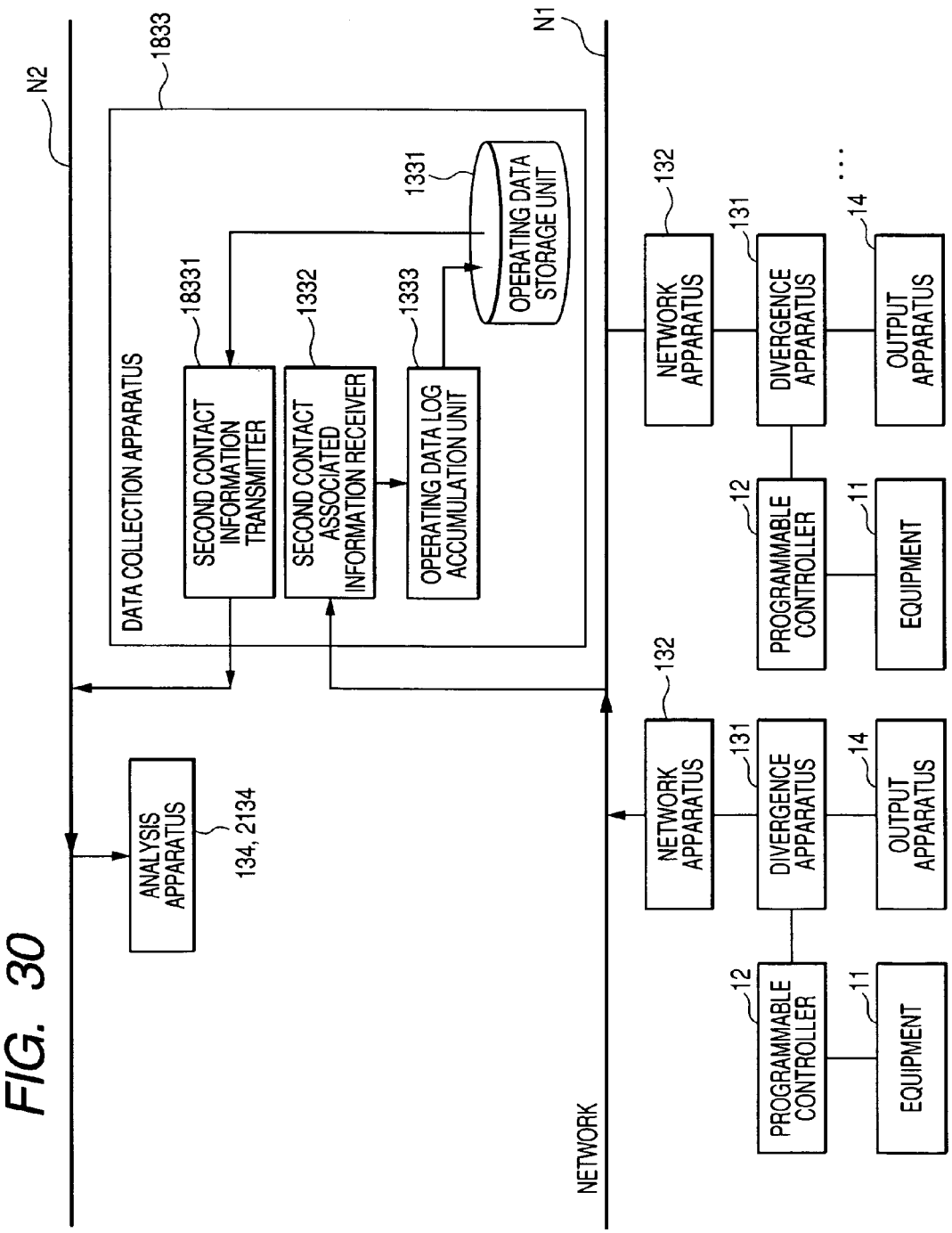
FIG. 30 is a diagram showing the basic configuration of a production system according to a third embodiment of the present invention.

FIG. 30 is a diagram showing the basic configuration of a production system according to this embodiment. The production system includes one or more equipments 11, one or more programmable controllers 12, one or more data collection systems 183 and one or more output apparatuses 14.

The data collection apparatuses 183 each include one or more divergence apparatuses 131, one or more network apparatuses 132, a data collection apparatus 1833 and an analysis apparatus 134, 2134.

The arrangement and the operation of the data collection apparatus 1833 are the same as those for the first embodiment, except that different network interfaces are employed for connection to the divergence apparatus 131 and connection to the analysis apparatus 134, 2134.

The data collection apparatus 1833 includes an operating data storage unit 1331, a second contact associated information receiver 1332, an operating data log accumulation unit 1333 and a second contact associated information transmitter 18331.

The second contact associated information transmitter 18331 transmits to the analysis apparatus 134 contact associated information stored in the operating data storage unit 1331. The second contact associated information transmitter 18331 is provided by a wireless or a wired communication means.

Further, two different networks, a network N1 and a network N2, are provided for the production system. The network N1 is a local network provided between production facilities, and the network N2 is an office network.

According to this embodiment, while the load imposed on a network is increased as the operating state of a equipment is attained, the data analysis process is not hindered by an increase in the load.

Fourth Embodiment

According to a fourth embodiment of this invention, an explanation will now be given for an analysis apparatus that measures and outputs frequency operating information at each "occurrence interval", in order to determine whether a specific operating state occurred frequently or rarely. Further, for this embodiment, an explanation will also be given for an analysis apparatus that can more accurately analyze occurrence trends for an operating state by employing, together, the occurrence frequency for a direction in the operating state and the occurrence frequency for an interval. Furthermore, the analysis apparatus of this embodiment categorizes a duration by length as a "long time type" or a "short time type" based on the duration frequency, or categorizes an occurrence interval by length as being a "frequent occurrence type" or a "sporadic occurrence type", based on the frequency for the occurrence interval. As a result, the trend is for there to be four types of operating information occurrence categories.

A production system for this embodiment is the same as that for the second embodiment, except only for an analysis apparatus. The equipment includes: one or more equipments 11, one or more programmable controllers 12, one or more data collection systems 293 and one or more output apparatuses 14.

The data collection system 293 includes one or more divergence apparatuses 131, one or more network apparatuses 132, a data collection apparatus 133 and an analysis apparatus 2934.

Figure 31:
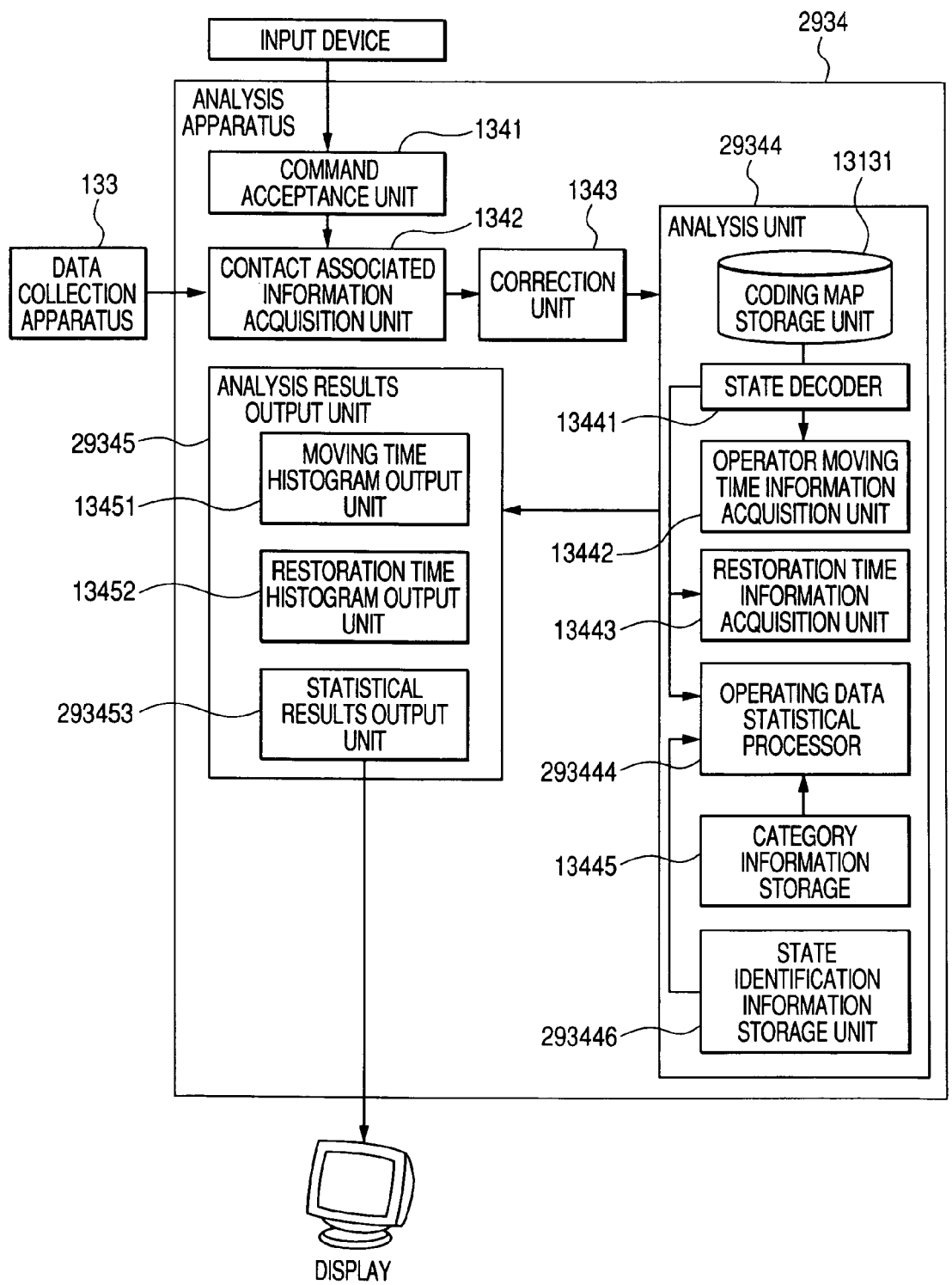
FIG. 31 is a block diagram showing an analysis apparatus according to a fourth embodiment of the present invention.

FIG. 31 is a block diagram showing the analysis apparatus 2934 constituting the data collection system 293. The analysis apparatus 2934 includes an command acceptance unit 1341, a contact associated information acquisition unit 1342, a correction unit 1343, an analysis unit 29344 and an analysis results output unit 29345.

The analysis unit 29344 includes: a coding map storage unit 13131, a state decoder 13441, a operator moving time information acquisition unit 13442, a restoration time information acquisition unit 13443, an operating data statistical processor 293444, a category information storage unit 13445 and a state identification information storage unit 293446.

The analysis results output unit 29345 includes: a moving time histogram output unit 13451, a restoration time histogram output unit 13452 and a statistical results output unit 293453.

The operating data statistical processor 293444 performs the statistical process for two or more sets of state information obtained by the state decoder 13441, and obtains statistical data for ascertaining the operation situations of one or more equipments 11. Specifically, for example, the operating data statistical processor 293444 calculates for each equipment 11 a total number of ON durations for individual states indicated by state information as well as a total number of OFF durations for the states. Then, the operating data statistical processor 293444 calculates an ON duration and an OFF duration and a frequency for each state indicated by state information. Sequentially, based on category information that will be described later, the operating data statistical processor 293444 sorts into categories (groups), indicated by the category information, the ON durations and their frequencies and the OFF durations and their frequencies for the individual states for each equipment 11. Following this, the operating data statistical processor 293444 determines an occurrence type, which is a type for the occurrence of a state, based on information concerning the ON duration and its frequency for a specific state, and/or information concerning the OFF duration and its frequency for the specific state. Thereafter, the operating data statistical processor 293444 obtains, from the state occurrence type, state identification information that designates a state. Further, the operating data statistical processor 293444 may obtain state identification information from two or more state occurrence types in the same time slot. It should be noted that there are, for example, four occurrence types: a "long and frequent occurrence type", a "short and frequent occurrence type", a "long and sporadic occurrence type" and a "short and sporadic occurrence type". For each state, the trend for the length of a duration is categorized as either a "long type" or a "short type", based on the frequency for the duration of a specific state (the frequency for the ON duration of a specific state). Further, the trend for an occurrence frequency is categorized as a "frequent occurrence type" or a "sporadic occurrence type", based on the frequency of the occurrence interval for a specific state (the frequency for the OFF duration of a specific state). Each of the four occurrence types consist of a trend for the length of a direction and a trend for the occurrence frequency. Normally, the operating data statistical processor 293444, for example, is an MPU or a memory, and the processing performed by the operating data statistical processor 293444 is provided by software that is recorded on a recording medium, such as a ROM. However, the processing may also be provided by hardware (a special circuit).

State identification information and one or more occurrence types are stored in the state identification information storage unit 293446, in correlation with each other. A non-volatile recording medium, such as a hard disk or a ROM, is appropriate for the state identification information storage unit 293446; however, a volatile recording medium, such as a RAM, can also be employed.

The statistical results output unit 293453 employs a predetermined graph, such as a pie chart or a histogram, to output statistical data obtained by the operating data statistical processor 293444. In this embodiment, an ON histogram is defined for a histogram, output by the statistical results output unit 293453, wherein the ON durations and their frequencies for the individual states are sorted into categories (groups) indicated by category information. Further, an OFF histogram is defined for a histogram, output by the statistical results output unit 293453, wherein the OFF durations and their frequencies for the individual states are sorted into categories (groups) indicated by category information. Additionally, the statistical results output unit 293453 outputs the occurrence type determined by the operating data statistical processor 293444, and also outputs state identification information obtained by the operating data statistical processor 293444. The processes for the output of a pie chart and a histogram are well known, and an example output of the statistical results output unit 293453 will be explained later. In this case, the output is a concept that include a display on a display device, printing by a printer, transmission to an external apparatus and storage on a recording medium. Driver software for an output device, or driver software for an output device and an output device, may be employed to provide the statistical results output unit 293453.

Figure 32:
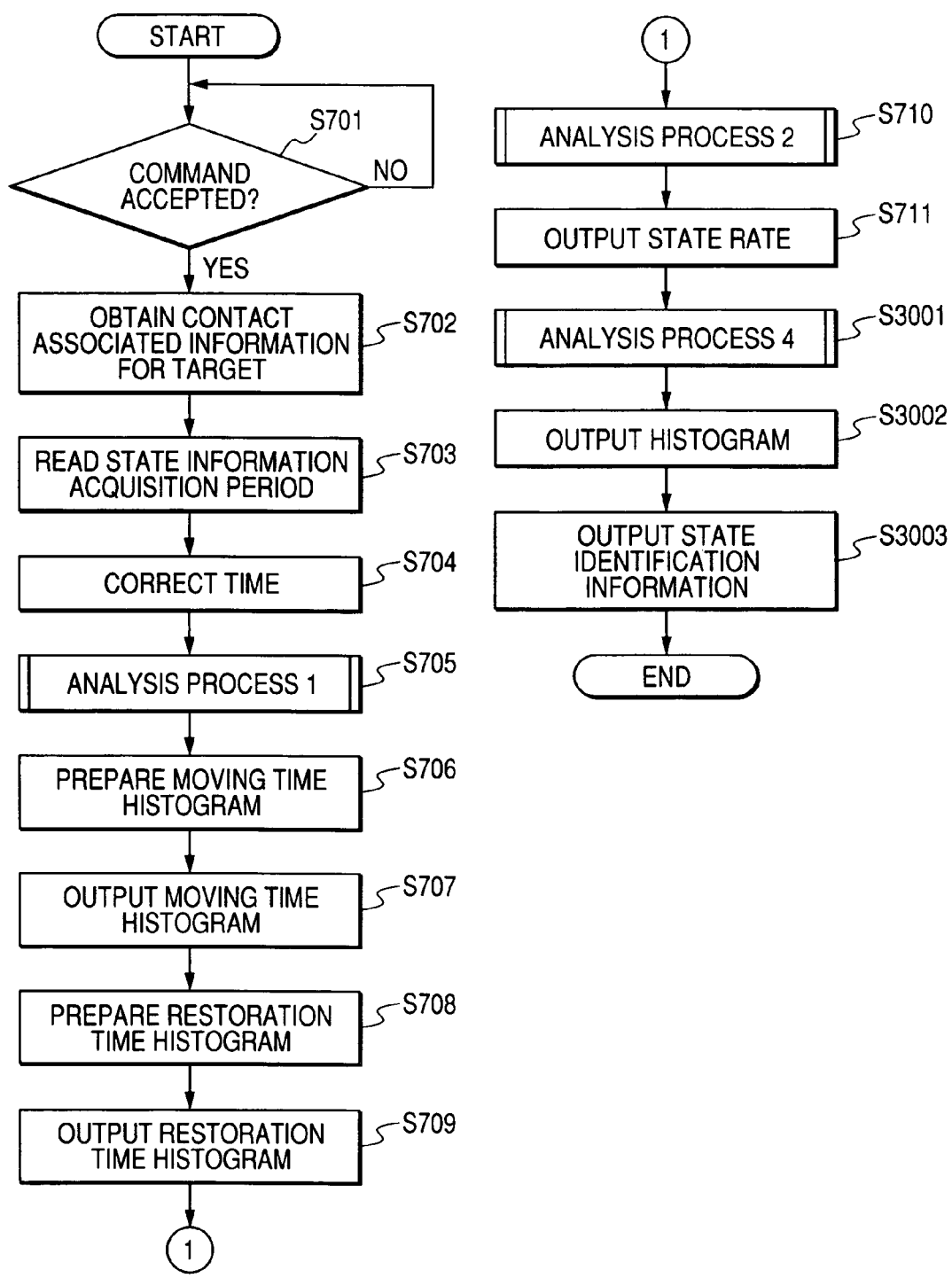
FIG. 32 is a flowchart for explaining the operation of the analysis apparatus for the fourth embodiment.

The operation of the analysis apparatus 2934 will now be described while referring to the flowchart in FIG. 32. In the flowchart in FIG. 32, only those steps will be described that differ from those in the flowchart in FIG. 22.

(step S3001) The operating data statistical processor 293444 performs the statistical process for two or more sets of state information obtained by the state decoder 13441, and obtains statistical data in order to ascertain the operating situation for one or more equipments 11. Further, the operating data statistical processor 293444 employs two or more state occurrence types in the same time slot to obtain state identification information for designating a state. This process is called an "analysis process 4". The analysis process 4 will be explained in detail later while referring to the flowcharts in FIGS. 33 and 34.

(step S3002) The statistical results output unit 293453 outputs a histogram based on frequency data obtained for a category at step S3001. The histogram is output, for example, for each equipment 11, and for the ON/OFF state. That is, the statistical results output unit 293453 outputs an ON histogram and an OFF histogram for each state.

(step S3003) The statistical results output unit 293453 outputs the state identification information obtained at step S3001. The processing is thereafter terminated.

The analysis process 4 at step S3001 will now be explained while referring to the flowcharts in FIGS. 33 and 34. In the flowchart in FIG. 33, only those steps will be described that differ different from those in the flowchart in FIG. 24.

(step S3101) The operating data statistical processor 293444 stores, as a pair, information that indicates the preceding state is ON and the value (duration) of a state time variable. The information indicating the preceding state can be either state information or the ID of state information. The operating data statistical processor 293444 registers, for example, "normal operation, ON, 1870". In "normal operation, ON, 1870", "normal operation, ON" is information that the preceding state is ON, and "1870" is a duration (in seconds).

(step S3102) The operating data statistical processor 293444 stores one or more sets, each consisting of information that one or more states, other than the preceding state, are OFF and the values of state time variables (durations). When information registered at step S3101 is "normal operation, ON, 1870", at step S3102, the operating data statistical processor 293444 registers three sets of information indicating, for example, "self halted, OFF, 1870", "post process works full, OFF, 1870" and "no work for preprocess, OFF, 1870". Three sets of information provide the OFF duration for a specific state and the frequency for the OFF duration. Then, program control advances to step S1005. It should be noted that one more state, other than the preceding state, is not always one of the three states described above. One of the other states can, for example, be "manually halted, OFF".

(step S3103) The operating data statistical processor 293444 determines the state occurrence type based on the ON duration and its frequency form a specific state, and/or the OFF duration and its frequency for the specific state. The operation for determining the occurrence type will be described in detail later, while referring to the flowchart in FIG. 34.

(step S3104) The operating data statistical processor 293444 searches the state identification information storage unit 293446, and finds state identification information consonant with the occurrence type determined at step S3103. When two or more occurrence types are determined at step S3103, the operating data statistical processor 293444 may find two or more sets of state identification information. Program control thereafter returns to a higher function.

The operation at step S3103 for determining the occurrence type will now be explained while referring to the flowchart in FIG. 34.

(step S3201) The operating data statistical processor 293444 performs an initialization process. The initialization process includes a process for substituting 1 into a counter value i, and a process, for example, for calculating the total number of OFF durations for a specific contiguous state.

(step S3202) The operating data statistical processor 293444 determines whether the i-th state is present. When the i-th state is present, program control advances to step S3203, or when the i-th state is not present, returns to a higher function.

(step S3203) The operating data statistical processor 293444 obtains the long period occurrence count for the ON sub-state of the i-th state. The long period occurrence count is the total of the occurrence frequencies in categories that indicate periods longer (or equal to or longer) than a period allocated for a predesignated category.

(step S3204) The operating data statistical processor 293444 obtains the short period occurrence count for the ON sub-state in the i-th state. The long period occurrence count is a total of the occurrence frequencies in categories that indicate periods shorter (or equal to or shorter) than a period allocated to a predesignated category.

(step S3205) The operating data statistical processor 293444 determines whether "the long period occurrence count obtained at step S3203>the short period occurrence count obtained at step S3204". When this condition is established, program control advances to step S3206, or when this condition is not established, program control is shifted to step S3207.

(step S3206) The operating data statistical processor 293444 determines the i-th state to be a long period type, and writes an information pair that indicates the i-th state and information that indicates a long period type. Program control thereafter advances to step S3208.

(step S3207) The operating data statistical processor 293444 determines the i-th state to be a short period type, and writes an information pair for information that indicates the i-th state and information that indicates a short period type.

(step S3208) The operating data statistical processor 293444 obtains a long period occurrence count for the OFF sub-state of the i-th state.

(step S3209) The operating data statistical processor 293444 obtains a short period occurrence count for the OFF sub-state of the i-th state.

(step S3210) The operating data statistical processor 293444 determines whether the long period occurrence count obtained at step S3208>the short period occurrence count obtained at step S3209" is established. When this condition is established, program control advances to step S3211, or when this condition is not established, program control is shifted to step S3212.

(step S3211) The operating data statistical processor 293444 determines the i-th state to be a sporadic occurrence type, and writes an information pair that indicates the i-th state and information that indicates a sporadic occurrence type. Program control advances to step S3213.

(step S3212) The operating data statistical processor 293444 determines the i-th state to be a frequent occurrence type, and writes a pair of information that indicates the i-th state and information that indicates a frequent occurrence type.

(step S3213) The operating data statistical processor 293444 registers the occurrence type for the i-th state. For registration of the occurrence type, for example, information for identifying the i-th state and information of either a long period type or a short period type and either a sporadic occurrence type or a frequent occurrence type are entered as a pair.

(step S3214) The operating data statistical processor 293444 increments the counter value i by one, and program control returns to step S3202.

Figure 34:
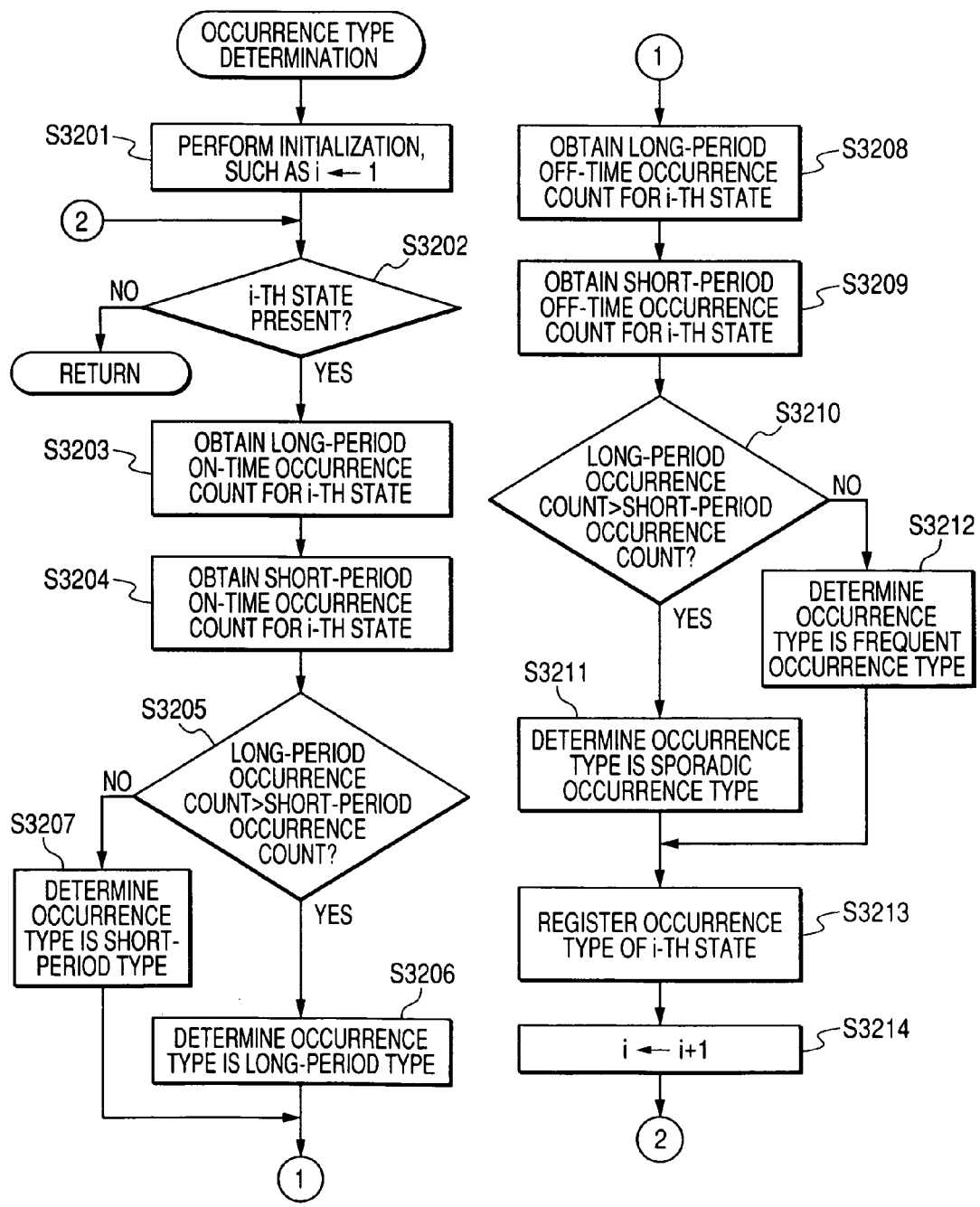
FIG. 34 is a flowchart for explaining the operation of the analysis apparatus for the fourth embodiment.

In the flowchart in FIG. 34, the method for determining the long period type or the short period type, and the sporadic occurrence type or the frequent occurrence type is not limited to the above described algorithm. For example, the operating data statistical processor 293444 may obtain a category for a period in which the ON occurrence count for a state is the maximum, and when this category is for a long period, may determine that the occurrence type is a long period type, or when the category is for a short period, may determine the occurrence type is a short period type. In this case, the operating data statistical processor 293444 also obtains the for a period in which the OFF occurrence count for a state is maximum, and when this category is for a long period, determines that the occurrence type is a sporadic occurrence type, or when this category is for a short period, determines that the occurrence type is a frequent occurrence type.

Further, a long period type or a short period type, and a sporadic occurrence type or a frequent occurrence type need not always be determined for all the states, and it is appropriate that this occurrence type is determined only for a state that shows a noticeable trend.

A specific operation of the analysis apparatus for this embodiment will now be described.

FIG. 35 is a diagram showing a state type management table stored in operating data statistical processor 293444. The state type management table includes attributes "ID" and "state identifier". The "state identifier" is information for identifying information.

FIG. 36 is a diagram showing a status identification information management table stored in the state identification information storage unit 293446. A correlation between the state occurrence type and state identification information is managed in the state identification management table, and attributes "ID", "state identifier", "occurrence type" and "state identification information" are included. The "state identification information" is an attribute indicating state identification information.

In this situation, assume that the analysis apparatus 2934 obtained, for example, contact associated information shown in FIG. 14A, and has corrected this information in the manner as described in the second embodiment, and obtained contact associated information shown in FIG. 12B. In FIGS. 12A and 12B, state 1 to state 4 are, for example, "normal operation," and "abnormally halted".

Sequentially, the analysis apparatus 2934 outputs a moving time histogram and a restoration time histogram through the process performed as in the second embodiment.

Next, an explanation will be given for the function for calculating the interval and frequency for generation of operation interval, which is the feature of this embodiment. This function is the analysis process 4 described above.

First, the operating data statistical processor 293444 sequentially obtains state information, and compares the latest obtained state information ((i−1)th state information with the previously obtained state information ((i-th) state information). Until the state is changed, the operating data statistical processor 293444 increments, by one, the state time variable that corresponds to the state information. When the state is changed, information that indicates a category indicated by the value of the state time variable for the preceding state, information indicating that the preceding state is ON, and a total time of time are stored as a set. This set of information is, for example, "normal operation, ON, 60 minutes".

Furthermore, the operating data statistical processor 293444 stores one or more sets of information indicating that states other than the preceding state are OFF and the value (duration) of the state time variable. For acquisition of states other than the preceding state, the operating data statistical processor 293444 employs the state type management table in FIG. 35, and prepares and registers information "state identifier, OFF, above obtained total time" for all the other states. Specifically, the operating data statistical processor 293444 stores "abnormally halted, OFF, 60 minutes", "no work for preprocess, OFF, 60 minutes", "works for work full for post process, OFF, 60 minutes".

The operating data statistical processor 293444 performs the above described processing for all the state information, and obtains, for example, a state duration management table in FIG. 37. The state duration management table includes one or more records, each of which consists of attributes "ID", "sub-state identifier" and "duration". The "sub-state identifier" is information indicating ON/OFF, and represents one state, together with the "state identifier".

Next, the operating data statistical processor 293444 adds the durations for the OFF time for a specific state that is timewise contiguous. In this case, "timewise contiguous" is a timewise contiguous record having the same state identifier. That is, while referring to FIG. 37, record "ID=3", record "ID=7" and record "ID=11" are contiguous records that should be added together. Further, record "ID=4", record "ID=8" and record "ID=12" in FIG. 37 are also contiguous. Thus, the operating data statistical processor 293444 adds the attribute values of the durations in record "ID=3", record "ID=7" and record "ID=11" in FIG. 37, and obtains a new record. Similarly, the operating data statistical processor 293444 adds the attribute values of the durations in record "ID=4", record "ID=8" and record "ID=12" in FIG. 37, and obtains a new record. As a result, the operating data statistical processor 293444 creates a new state duration management table in FIG. 38.

Following this, the operating data statistical processor 293444 obtains, for each state (e.g., normal operation, abnormally halted), the occurrence frequency for each category (e.g., "in one minute", "in nine minutes" or "longer than ten minutes"). This occurrence frequency represents the number of records in the table in FIG. 38 that includes a duration to be entered in the time length allocated to each category.

Then, the operating data statistical processor 293444 obtains a state frequency management table in FIG. 39 The state frequency management table includes one or more records, each of which includes attributes "ID", "state identifier", "sub-state identifier", "category" and "frequency". While referring to FIG. 39, a phenomenon that the normal operation ON state was continued longer than ten minutes occurred 48 times. Further, a phenomenon that the normal operation OFF state was continued in one minute occurred 18 times.

Sequentially, the operating data statistical processor 293444 obtains occurrence count "48" of the long (e.g., "longer than ten minutes") normal operation ON state. Sequentially, the operating data statistical processor 293444 obtains occurrence count "0" (total of "in one minute" to "in six minutes") of the short (e.g., "in six minutes") normal operation ON state. Then, the operating data statistical processor 293444 determines that "occurrence count "48" for a long period state >occurrence count "0" for a short period state,", and registers information indicating a long period type as the normal operation state.

Next, the operating data statistical processor 293444 obtains occurrence count "1" of the long (e.g., "longer than ten minutes") normal operation OFF state. Sequentially, the operating data statistical processor 293444 obtains occurrence count "25" (total of "in one minute" to "in six minutes", and frequency "18" for "in one minute" is included) of the short (e.g., "in six minutes") normal operation OFF state. Since "occurrence count "1" for a long period state<occurrence count "25" for a short period state," the operating data statistical processor 293444 registers information indicating a frequent occurrence type as the normal operation state. Through this processing, the operating data statistical processor 293444 writes "long period frequent occurrence type" as the normal operation state.

Similarly, the operating data statistical processor 293444 performs the processing for the abnormally halted state, and writes "short period sporadic occurrence type" for the abnormally halted state.

Then, the operating data statistical processor 293444 searches the state identification information management table in FIG. 36 by employing, as a key, the normal operation state and "long period frequent occurrence type", and finds state identification information "normally operating". Furthermore, the operating data statistical processor 293444 searches the state identification information management table in FIG. 36 also by employing, as a key, the abnormally halted state and "short period sporadic occurrence type", and finds state identification information "normally operating".

Figure 40A:
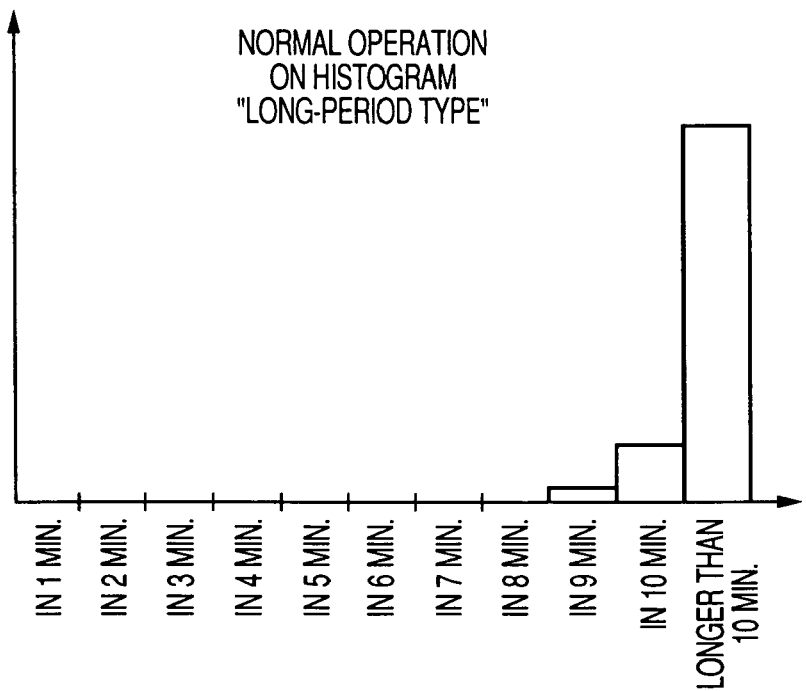
FIGS. 40A and 40B are diagrams showing example output histograms for the fourth embodiment.
Figure 40B:
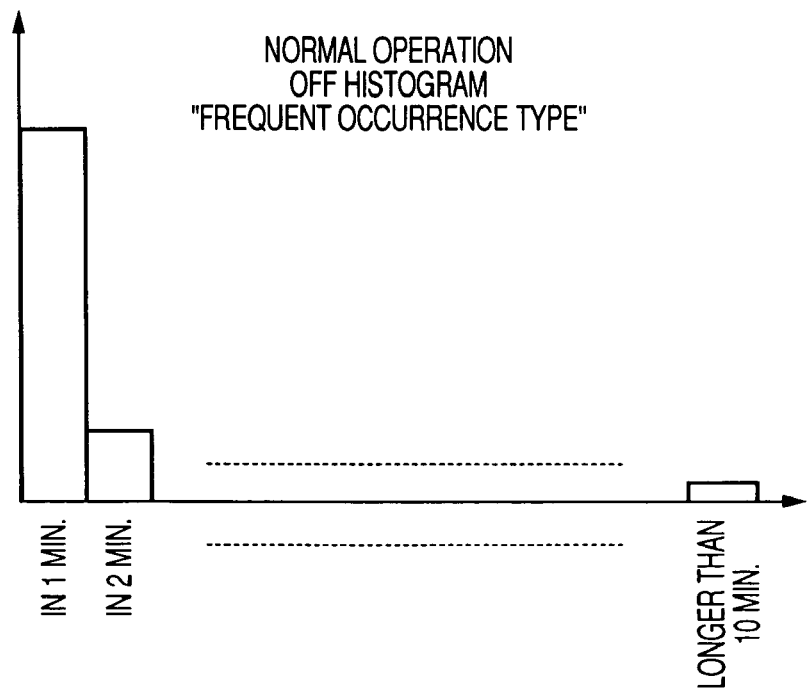

Next, the statistical results output unit 293453 outputs histograms in FIGS. 38A and 38B. The histogram in FIG. 40A is a histogram showing the sub-state for the normal operation ON state (ON histogram), and the histogram in FIG. 40B is a histogram showing the sub-state for the normal operation OFF state (OFF histogram).

Figure 41:
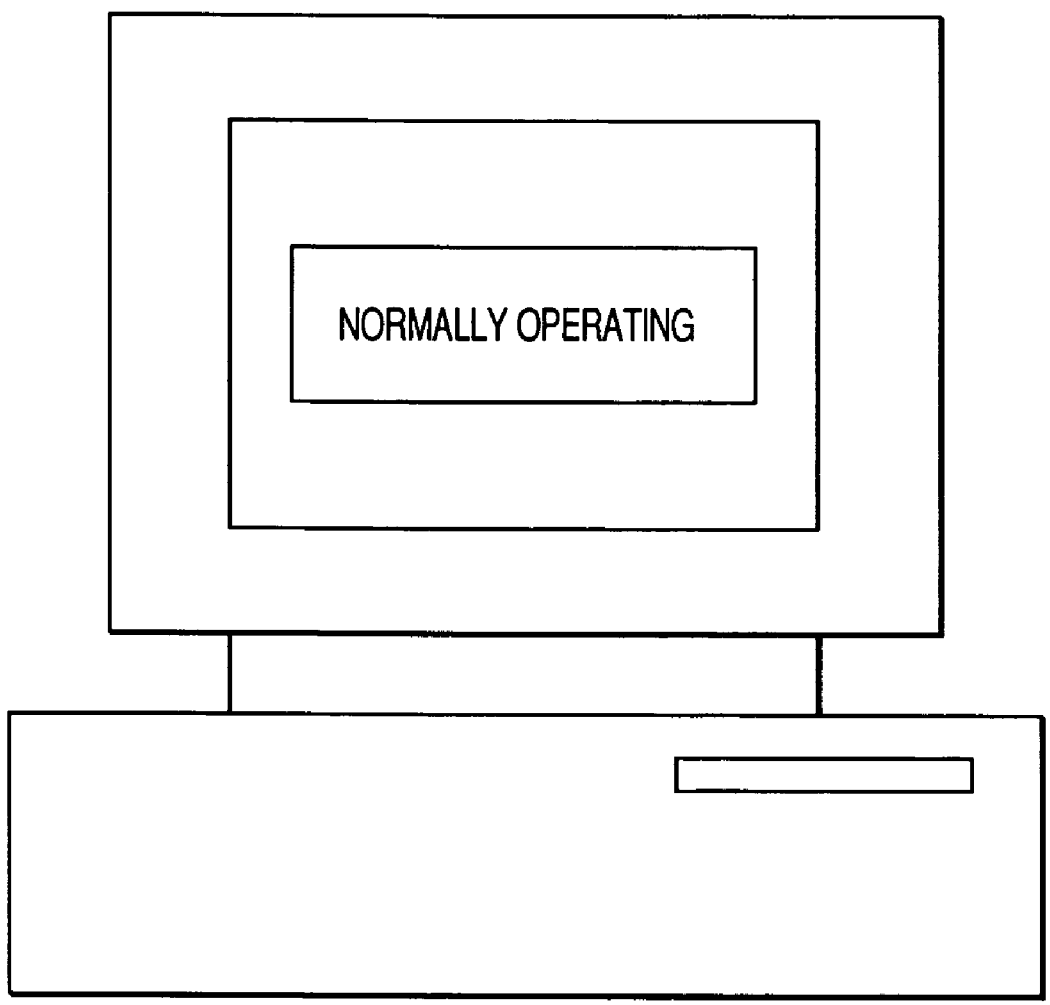
FIG. 41 is a diagram showing example state identification information that is output for the fourth embodiment.

Sequentially, the statistical results output unit 293453 outputs the obtained state specification information "normally operating", as shown in FIG. 41. In the above processing, two sets of state identification information "normally operating" are found; however, since these two sets of information have the same contents, only one information is output.

Figure 42:
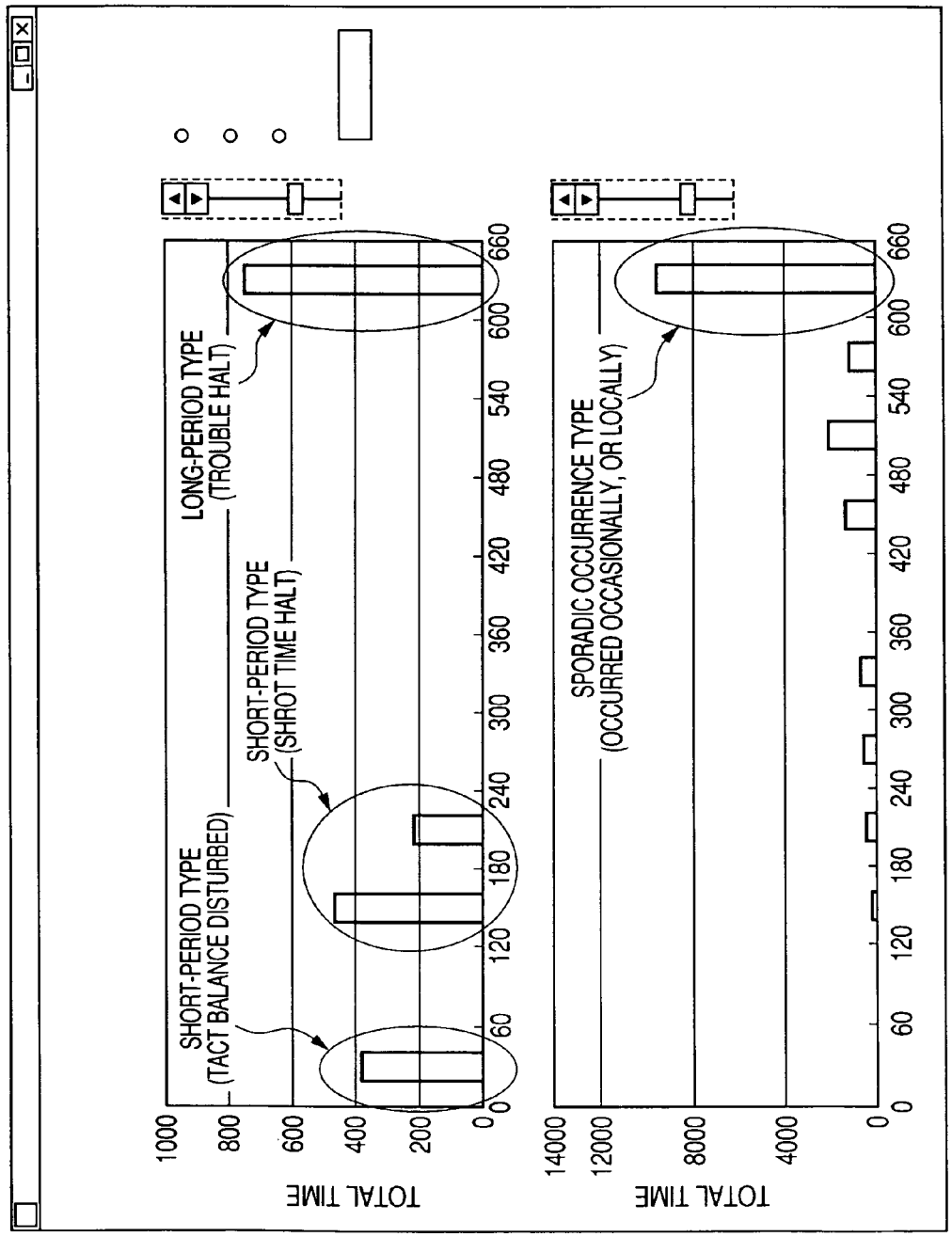
FIG. 42 is a diagram showing example histogram and state identification information that are output for the fourth embodiment.

As shown in FIG. 42, the statistical results output unit 293453 may output histograms and state identification information on one screen. The histograms in FIG. 42 are prepared by focusing on state "works full for post process", and in FIG. 42, the upper portion is an ON histogram, and the lower portion is an OFF histogram. While referring to FIG. 42, a halt trend appears in the histograms. Specifically, it is apparent that, in FIG. 42, losing of a tact balance, and a short time halt and a trouble halt occurred only in specific time slots.

As described above, according to the embodiment, since the histograms showing the ON state and OFF state are prepared and output, the occurrence trend for the operating state can be clearly categorized. Specifically, when, for example, a state wherein a equipment was halted for ten minutes or longer is frequent by referring to the ON histogram, the occurrence trend of the state can be categorized as "long period type", and it is understood that a "trouble halt" occurred. A state wherein a equipment is halted for five to six minutes or less is frequent, the occurrence trend of the state can be categorized as "short period type", and it is understood that a "short time halt" or losing of a tact balance occurred. Further, a state wherein a equipment is halted longer than, for example, five minutes is frequent by referring to the OFF histogram, the occurrence trend of the state can be categorized as "sporadic occurrence type", and it is understood that the state only rarely occurred. A state wherein a equipment is halted shorter than five minutes is frequent, the occurrence trend of the state can be categorized as "frequent occurrence type", and it is understood that the state frequently occurred. That is, according to the ON/OFF state histograms, the occurrence trend of the state can be categorized into four types: "long period frequent occurrence type", "long period sporadic occurrence type", "short period frequent occurrence type" and "short period sporadic occurrence type".

Furthermore, when operating data collected and stored for an extended period of time is displayed simply using a time chart, it is not easily identified whether the individual operating states were maintained ON for an extended period of time, or frequently switched between ON and OFF. However, when these states are displayed by using the ON/OFF histograms and categorized as four occurrence types, the occurrence trends of the operating states can be easily obtained.

In the above embodiment, the operating data statistical processor 293444 may prepare only an ON histogram or an OFF histogram. That is, the operating data statistical processor 293444 does not need to determine an occurrence type and obtain state identification information. In this case, a user should examine the ON histogram and the OFF histogram output by the statistical results output unit 293453, and should manually determine an occurrence type, and obtain state identification information.

Further, in the embodiment, the state identification information management table in FIG. 36 has been employed to search one state identification information based on one identifier and an occurrence type. However, a state identification information management table in FIG. 43 may be employed. In this table in FIG. 43, two or more state identifiers and occurrence types are employed to identify one set of state identification information. In the state identification information management table in FIG. 43, when state identifier "normal operation" of record "ID=1" is a short period frequent occurrence type, and state identifier "no work for preprocess" is also a short period frequent occurrence type, this represents state "tact balance is disturbed for preprocess". In this case, the operating data statistical processor 293444 employs a plurality of state occurrence types to obtain state identification information.

Further, when the state identification information management table in FIG. 43 is stored wherein are entered state identifier "normal operation", occurrence type "short period frequent occurrence type", state identifier "works for work full for post process" and occurrence type "short period frequent occurrence type", the operating data statistical processor 2934444 searches the state identification management table in FIG. 43, and obtains state identification information "tact balance is disturbed in the post process".

Then, the statistical results output unit 293453 outputs a histogram (see FIG. 40 for example displayed histograms).

Then, the statistical results output unit 293453 outputs the obtained state identification information "tact balance is disturbed in the post process" in the manner shown in FIG. 44.

Furthermore, when the state identification information management table in FIG. 36 is employed, and when the state identifier "abnormally halted" is a long period sporadic occurrence type, the operating data statistical processor 293444 obtains state identification information "a trouble halt occurs occasionally". The statistical results output unit 293453 outputs the obtained state identification information "a bit halt occurs occasionally". That is, the state identification information to be output can be various types.

Further, in this embodiment, the ON histogram and the OFF histogram is output at the same time; however, either the ON histogram or the OFF histogram may be output. Based on the ON histogram, the occurrence type of a state can be determined to be either a "short-period type" or a "long period type". Further, based on the OFF histogram, the occurrence type of a state can be determined to be either a "frequent occurrence type" or a "sporadic occurrence type".

Further, software that provides the analysis apparatus for this embodiment is the following program. The program permits a computer to perform:

a contact associated information acquisition step of obtaining one or more sets of contact associated information from a data collection apparatus;

an analysis step of processing the one or more sets of contact associated information obtained at the contact associated information acquisition step, and obtaining predetermined information, and an analysis results output step of outputting the predetermined information obtained at the analysis step.

The analysis step of the program includes:

an operating data statistical processing step of calculating ON durations and frequencies for the individual states indicated by state information for the equipment, and also calculating OFF durations and frequencies for the states. Furthermore, preferably, based on the ON durations and frequencies and the OFF durations, and frequencies for the individual states that have been obtained at the operating data statistical processing step, ON histograms and OFF histograms that represent ON and OFF frequencies for the states are output at the analysis output step.

Further, at the operating data statistical processing step of the program, an occurrence type that is a type of an occurrence of a state is determined by employing the ON duration and the frequency of a state and/or the OFF duration and the frequency of a state, and the occurrence type is output at the analysis results output step.

Further, at the operating data statistical processing step of the program, the ON duration and a frequency of a state and/or the OFF duration and a frequency of a state are employed to determine an occurrence type that is a type of an occurrence of a state, and the occurrence type is employed to find state identification information. Furthermore, the state identification information is output at the analysis results output step.

In the individual embodiments, the individual processes (functions) may be centralized and performed by a single apparatus (system), or they may be distributed to a plurality of apparatuses.

The information transmission step and the information reception step of the program do not include processes performed by hardware, such as processes performed using a modem or an interface card (processes performed only by hardware).

A single computer or multiple computers may be employed to perform the program of the invention. That is, centralized processing, or distributed processing may be performed.

Further, in the embodiments, two or more communication units (information transmitter or output unit), such as data transmitters, present in one apparatus, may be physically provided by a single medium.

The present invention is not limited to the above described embodiments and can be variously modified, and these modifications are also included within the technical scope of the present invention.

As described above, the data collection system of the invention is effective and useful, because this system can collect operating data for existing production facilities, without affecting the performance of these production facilities.

[FIG. 1]
11: EQUIPMENT
12: PROGRAMMABLE CONTROLLER
13: DATA COLLECTION SYSTEM
14: OUTPUT APPARATUS
131: DIVERGENCE APPARATUS
132: NETWORK APPARATUS
133: DATA COLLECTION APPARATUS
134: ANALYSIS APPARATUS
a: NETWORK

[FIG. 2]
12: PROGRAMMABLE CONTROLLER
14: OUTPUT APPARATUS
131: DIVERGENCE APPARATUS
132: NETWORK APPARATUS
a: CODING MAP
b: STATE CODE
1311: CONTACT INFORMATION ACQUISITION UNIT
c: CONTACT INFORMATION
1312: STATE RECOGNITION UNIT
d: STATE INFORMATION
1313: STATE CODING UNIT
13131: CODING MAP STORAGE UNIT
e: CONTACT ASSOCIATED INFORMATION (STATE CODE)
13132: CONTACT ASSOCIATED INFORMATION ACQUISITION UNIT
1314: OUTPUT UNIT
1315: CODING MAP SETTING UNIT

[FIG. 3]
132: NETWORK APPARATUS
133: DATA COLLECTION APPARATUS
1331: OPERATING DATA STORAGE UNIT
1332: SECOND CONTACT ASSOCIATED INFORMATION RECEIVER
1333: OPERATING DATA LOG ACCUMULATION UNIT
134: ANALYSIS APPARATUS

[FIG. 4]
133: DATA COLLECTION APPARATUS
134: ANALYSIS APPARATUS
1341: COMMAND ACCEPTANCE UNIT
1342: CONTACT ASSOCIATED INFORMATION ACQUISITION UNIT
1343: CORRECTION UNIT
1344: ANALYSIS UNIT
13131: CODING MAP STORAGE UNIT
13441: STATE DECODER
13442: OPERATOR MOVING TIME INFORMATION ACQUISITION UNIT
13443: RESTORATION TIME INFORMATION ACQUISITION UNIT
1345: ANALYSIS RESULTS OUTPUT UNIT
13451: MOVING TIME HISTOGRAM OUTPUT UNIT
13452: RESTORATION TIME HISTOGRAM OUTPUT UNIT
a: INPUT DEVICE
b: DISPLAY

[FIG. 5]
a: START
S502: i-TH CONTACT PRESENT?
S503: i-TH CONTACT INFORMATION OBTAINED?
S504: TRANSMIT DATA TO OUTPUT UNIT.
S505: TRANSMIT DATA TO STATE RECOGNITION UNIT.
S506: STATE RECOGNITION PROCESS
S507: STATE INFORMATION OUTPUT?
S509: OBTAIN STATE CODE BY USING STATE INFORMATION AS KEY.
S510: OUTPUT UNIT TRANSMITS STATE CODE TO NETWORK APPARATUS.
S511: OUTPUT UNIT TRANSMITS ALL CONTACT INFORMATION TO OUTPUT APPARATUS.

[FIG. 6]
a: STATE RECOGNITION PROCESS
S601: ON STATE?
S602: ON STATE CONTINUED FOR PREDETERMINED PERIOD T?
S603: IDENTIFY LIGHT ON OR BUZZER ON.
S604: OUTPUT STATE INFORMATION.
S605: IDENTIFY BLINKING.
S606: OFF STATE CONTINUED FOR PREDETERMINED PERIOD T?
S607: IDENTIFY STATE AS LIGHT OFF OR AS BUZZER OFF.
S608: IDENTIFY STATE AS BLINKING.

[FIG. 7]
a: START

S701: COMMAND ACCEPTED?
S702: OBTAIN CONTACT ASSOCIATED INFORMATION FOR TARGET.
S703: READ STATE INFORMATION ACQUISITION PERIOD.
S704: CORRECT TIME.
S705: ANALYSIS PROCESS
S706: PREPARE MOVING TIME HISTOGRAM.
S707: OUTPUT MOVING TIME HISTOGRAM.
S708: PREPARE RESTORATION TIME HISTOGRAM.
S709: OUTPUT RESTORATION TIME HISTOGRAM.
B: END

Figure 8:
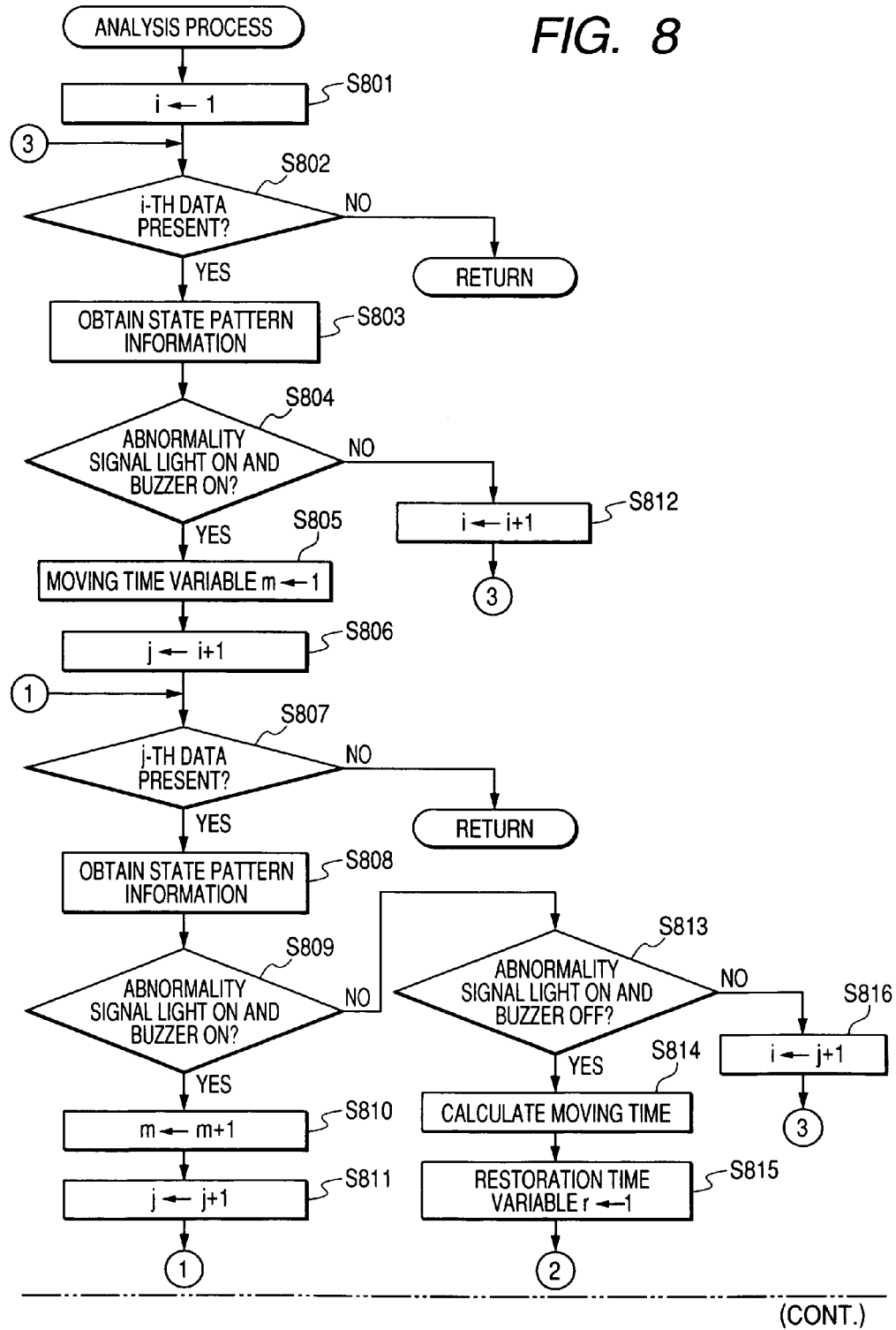
FIG. 8 is a flowchart for explaining the operation of the analysis apparatus of the first embodiment.

[FIG. 8]
a: ANALYSIS PROCESS
S802: i-TH DATA PRESENT?
B: RETURN
S803: OBTAIN STATE PATTERN INFORMATION.
S804: ABNORMALITY SIGNAL LIGHT ON AND BUZZER ON?
S805: MOVING TIME VARIABLE M←1.
S807: j-TH DATA PRESENT?
S808: OBTAIN STATE PATTERN INFORMATION
S809: ABNORMALITY SIGNAL LIGHT ON AND BUZZER ON?
S813: ABNORMALITY SIGNAL LIGHT ON AND BUZZER OFF?
S814: CALCULATE MOVING TIME.
S815: RESTORATION TIME VARIABLE R←1.
S818: j-TH DATA PRESENT?
S819: OBTAIN STATE PATTERN INFORMATION.
S820: ABNORMALITY SIGNAL LIGHT ON AND BUZZER OFF?
S823: ABNORMALITY SIGNAL LIGHT OFF?
S824: CALCULATE RESTORATION TIME.
S825: PREPARE ANALYSIS RESULTS INFORMATION.

[FIG. 9]
a: CONTACT ASSOCIATED INFORMATION
b: STATE 1
c: STATE 2
d: STATE 3
e: STATE 4
f: STATE INFORMATION
g: PRODUCTION COUNT
h: BUZZER
i: RED
j: YELLOW
k: GREEN
l: STATE DEFINITION INFORMATION
m: POWER OFF
n: NORMAL OPERATION
o: NORMAL OPERATION+NO WORK FOR PREPROCESS
p: WORK FULL FOR POST PROCESS
q: NO PARTS (ATTENDING)
r: HALT
s: ABNORMAL HALT (ATTENDING)
t: NO PARTS (UNATTENDED)
u: ABNORMAL HALT (UNATTENDED)
v: 100 WORK PASSED

[FIG. 10]
a: DATE
b: TIME
c: STATE 1
d: STATE 2
e: STATE 3
f: STATE 4

[FIG. 11]
a: RECOGNITION PERIOD
b: LIGHT ON WHEN STATE INDICATES ON DURING RECOGNITION PERIOD
c: LIGHT OFF WHEN STATE INDICATES OFF DURING RECOGNITION PERIOD
d: BLINK FOR OTHER CASES

[FIG. 12A]
a: (BEFORE CORRECTION)
b: STATE 1
c: STATE 2
d: STATE 3
e: STATE 4

[FIG. 12B]
a: (AFTER CORRECTION)
b: STATE 1
c: STATE 2
d: STATE 3
e: STATE 4

[FIG. 13]
a: ABNORMALITY SIGNAL LIGHT
b: OPERATOR CALL BUZZER
c: BUZZER STOP BUTTON
d: TIME
e: MOVING TIME
f: RESTORATION TIME
g: EQUIPMENT ABNORMALITY OCCURRED.
h: OPERATOR ARRIVED.
i: BUZZER STOP BUTTON PRESSED.
j: EQUIPMENT RESTARTED.

[FIG. 14]
a: RED BLINKING+BUZZER ON
b: RED BLINKING+BUZZER OFF
c: GREEN LIGHTING

[FIG. 15]
a: TIME INFORMATION (ABNORMALITY START TIME)
b: HALT PERIOD
c: MOVING TIME (s)
d: RESTORATION TIME (s)

[FIG. 16A, 16B]
a: COUNT
b: CMEDIAN
c: MOVING TIME

[FIG. 16C, 16D]
a: COUNT
b: CMEDIAN
c: RESTORATION TIME

[FIG. 17]
a: POWER OFF
b: NORMAL OPERATION
c: NORMAL OPERATION+NO WORK FOR PREPROCESS
d: WORK FULL FOR POST PROCESS
e: NO PARTS (ATTENDING)
f: HALT
g: ABNORMAL HALT (ATTENDING)
h: NO PARTS (UNATTENDED)
i: ABNORMAL HALT (UNATTENDED)
j: 100 WORK PASSED
k: 60 MIN. EARLIER l: 50 MIN. EARLIER
m: 40 MIN. EARLIER
n: 30 MIN. EARLIER
o: 20 MIN. EARLIER
p: 10 MIN. EARLIER
q: 0 MIN. EARLIER

[FIG. 18]
a: CONTACT ASSOCIATED INFORMATION
b: STATE 1
c: STATE 2
d: STATE 3
e: STATE 4
f: STATE INFORMATION
g: RED
h: YELLOW
i: GREEN
j: STATE DEFINITION INFORMATION
k: POWER OFF
l: NORMAL OPERATION
m: WORK FULL FOR POST PROCESS
n: NO PARTS (+WORK FULL FOR POST PROCESS)
o: NO WORK FOR PREPROCESS
p: HALT
q: NO WORK FOR PREPROCESS+WORK FULL FOR POST PROCESS
r: ABNORMAL HALT
s: 100 WORK PASSED

[FIG. 19]
a: CONTACT ASSOCIATED INFORMATION
b: STATE 1
c: STATE 2
d: STATE 3
e: STATE 4
f: STATE INFORMATION
g: RED
h: YELLOW
i: GREEN
j: STATE DEFINITION INFORMATION
k: POWER OFF
l: NORMAL OPERATION
m: WORK FULL FOR POST PROCESS
n: NO PARTS (+WORK FULL FOR POST PROCESS)
o: NO WORK FOR PREPROCESS
p: HALT
q: ABNORMAL HALT
r: 100 WORK PASSED

[FIG. 20A]
a: WORK FULL FOR POST PROCESS
b: NO WORK FOR PREPROCESS
c: WORK FULL FOR POST PROCESS+NO WORK FOR PREPROCESS

[FIG. 20B]
a: WORK FULL FOR POST PROCESS
b: NO WORK FOR PREPROCESS

[FIG. 21]
133: DATA COLLECTION APPARATUS
2134: ANALYSIS APPARATUS
1341: COMMAND ACCEPTANCE UNIT
1342: CONTACT ASSOCIATED INFORMATION ACQUISITION UNIT
1343: CORRECTION UNIT
21344: ANALYSIS UNIT
13131: CODING MAP STORAGE UNIT
13441: STATE DECODER
13442: OPERATOR MOVING TIME INFORMATION ACQUISITION UNIT
13443: RESTORATION TIME INFORMATION ACQUISITION UNIT
13444: RESTORATION TIME INFORMATION STATISTICAL PROCESSOR
13445: CATEGORY INFORMATION STORAGE
21345: ANALYSIS RESULTS OUTPUT UNIT
13451: MOVING TIME HISTOGRAM OUTPUT UNIT
13452: RESTORATION TIME HISTOGRAM OUTPUT UNIT
13453: STATISTICAL RESULTS OUTPUT UNIT
a: INPUT DEVICE
b: DISPLAY

[FIG. 22]
a: START
S701: COMMAND ACCEPTED?
S702: OBTAIN CONTACT ASSOCIATED INFORMATION FOR TARGET.
S703: READ STATE INFORMATION ACQUISITION PERIOD.
S704: CORRECT TIME.
S705: ANALYSIS PROCESS 1
S706: PREPARE MOVING TIME HISTOGRAM.
S707: OUTPUT MOVING TIME HISTOGRAM.
S708: PREPARE RESTORATION TIME HISTOGRAM.
S709: OUTPUT RESTORATION TIME HISTOGRAM.
S710: ANALYSIS PROCESS 2
S711: OUTPUT STATE RATE.
S712: ANALYSIS PROCESS 3
S713: OUTPUT HISTOGRAM.
b: END

[FIG. 23]
a: ANALYSIS PROCESS 2
S901: INITIALIZATION PROCESS, SUCH AS i←1.
S902: i-TH DATA?
S903: INCREMENT, BY ONE, VARIABLE CORRESPONDING TO STATE INFORMATION.
b: RETURN

Figure 24:
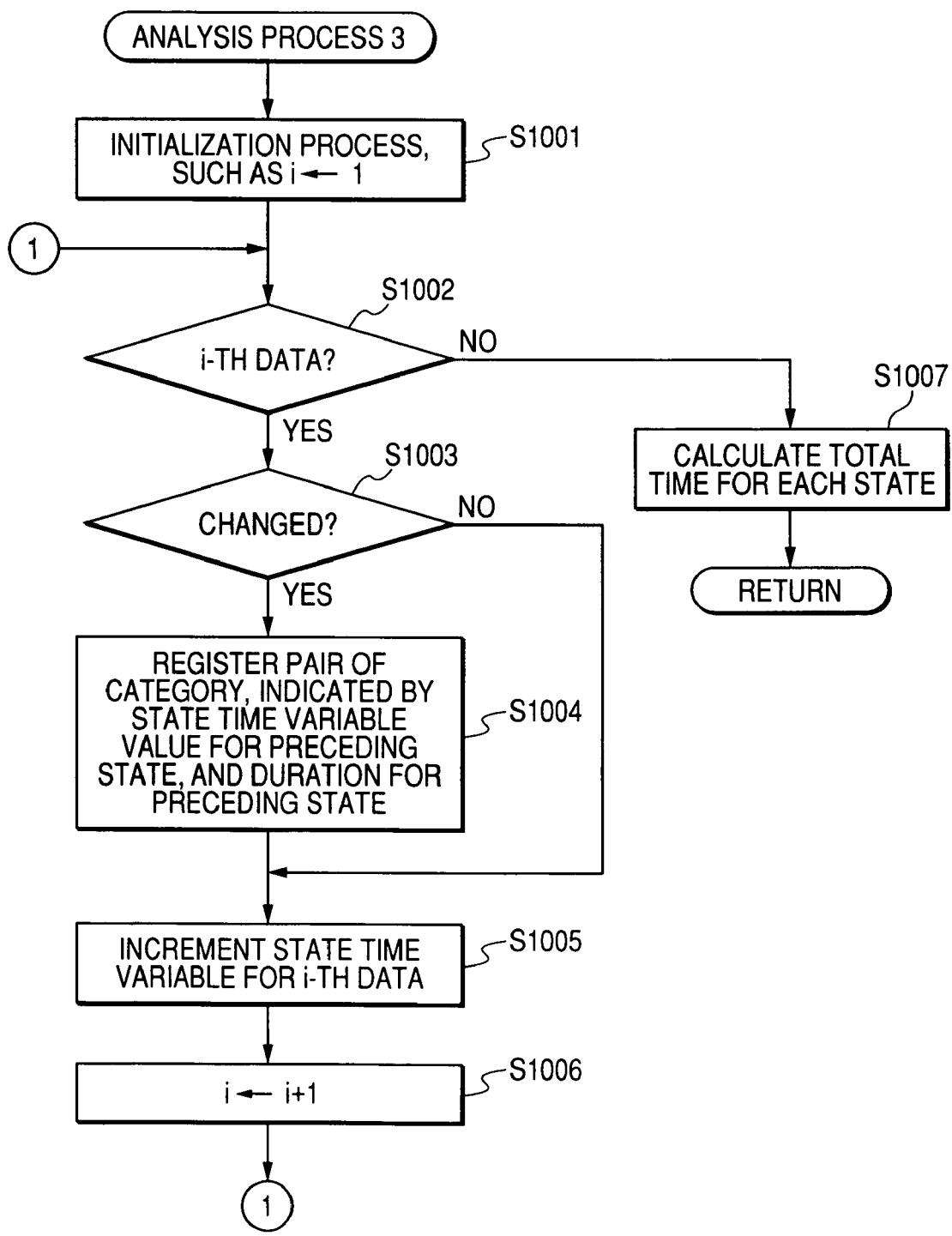
FIG. 24 is a flowchart for explaining the operation of the analysis apparatus of the second embodiment.

[FIG. 24]
a: ANALYSIS PROCESS 3
S1001: INITIALIZATION PROCESS, SUCH AS i←1.
S1002: i-TH DATA?
S1003: CHANGED?
S1004: REGISTER PAIR OF CATEGORY, INDICATED BY STATE TIME VARIABLE VALUE FOR PRECEDING STATE, AND DURATION FOR PRECEDING STATE.
S1005: INCREMENT STATE TIME VARIABLE FOR i-TH DATA.
S1007: CALCULATE TOTAL TIME FOR EACH STATE.
b: RETURN

[FIG. 25]
a: STATE INFORMATION ID
b: STATE INFORMATION
c: PRODUCTION COUNT
d: BUZZER
e: RED
f: YELLOW
GREEN
h: STATE TIME VARIABLE (s)
i: RATE (%)
j: STATE DEFINITION INFORMATION
k: NORMAL OPERATION
l: NO SUPPLY OF WORKS FROM PREPROCESS m: WORK FULL FOR POST PROCESS
n: NO PARTS
o: LOCAL EQUIPMENT ABNORMALLY HALTED

[FIG. 26]
a: RATE OF TOTAL ON TIME FOR INDIVIDUAL OPERATING DATA
b: LOCAL EQUIPMENT ABNORMALLY HALTED
c: WORK FULL FOR POST PROCESS
d: NO SUPPLY OF WORKS FROM PREPROCESS
e: NORMAL OPERATION

[FIG. 27]
a: CATEGORY
b: FREQUENCY
c: TOTAL TIME (s)
d: IN 1 MIN.
e: IN 2 MIN.
f: IN 3 MIN.
g: IN 4 MIN.
h: IN 5 MIN.
i: IN 6 MIN.
j: IN 7 MIN.
k: IN 8 MIN.
l: IN 9 MIN.
m: IN 10 MIN.
n: LONGER THAN 10 MIN.

[FIGS. 28]
a: TOTAL TIME
b: IN 1 MIN.
c: IN 2 MIN.
d: IN 3 MIN.
e: LONGER THAN 10 MIN.
f: DURATION

[FIGS. 29A]
a: TOTAL TIME
b: DURATION
c: IN 1 MIN.

[FIGS. 29B]
a: TOTAL TIME
b: DURATION
c: IN 5 MIN.

[FIGS. 29C]
a: TOTAL TIME
b: DURATION
c: IN 10 MIN.

[FIGS. 29D]
a: TOTAL TIME
b: DURATION
c: IN 1 MIN.
d: IN 5 MIN.
e: IN 10 MIN.

[FIG. 30]
11: EQUIPMENT
12: PROGRAMMABLE CONTROLLER
131: DIVERGENCE APPARATUS
132: NETWORK APPARATUS
134: ANALYSIS APPARATUS
14: OUTPUT APPARATUS
1833: DATA COLLECTION APPARATUS
1331: OPERATING DATA STORAGE UNIT
1332: SECOND CONTACT ASSOCIATED INFORMATION RECEIVER
1333: OPERATING DATA LOG ACCUMULATION UNIT
18331: SECOND CONTACT INFORMATION TRANSMITTER
a: NETWORK

[FIG. 31]
133: DATA COLLECTION APPARATUS
2934: ANALYSIS APPARATUS
1341: COMMAND ACCEPTANCE UNIT
1342: CONTACT ASSOCIATED INFORMATION ACQUISITION UNIT
1343: CORRECTION UNIT
29344: ANALYSIS UNIT
13131: CODING MAP STORAGE UNIT
13441: STATE DECODER
13442: OPERATOR MOVING TIME INFORMATION ACQUISITION UNIT
13443: RESTORATION TIME INFORMATION ACQUISITION UNIT
293444: OPERATING DATA STATISTICAL PROCESSOR
13445: CATEGORY INFORMATION STORAGE
293446: STATE IDENTIFICATION INFORMATION STORAGE UNIT
29345: ANALYSIS RESULTS OUTPUT UNIT
13451: MOVING TIME HISTOGRAM OUTPUT UNIT
13452: RESTORATION TIME HISTOGRAM OUTPUT UNIT
293453: STATISTICAL RESULTS OUTPUT UNIT
a: INPUT DEVICE
b: DISPLAY

[FIG. 32]

[FIG. 22]
a: START
S701: COMMAND ACCEPTED?
S702: OBTAIN CONTACT ASSOCIATED INFORMATION FOR TARGET.
S703: READ STATE INFORMATION ACQUISITION PERIOD.
S704: CORRECT TIME.
S705: ANALYSIS PROCESS 1
S706: PREPARE MOVING TIME HISTOGRAM.
S707: OUTPUT MOVING TIME HISTOGRAM.
S708: PREPARE RESTORATION TIME HISTOGRAM.
S709: OUTPUT RESTORATION TIME HISTOGRAM.
S710: ANALYSIS PROCESS 2
S711: OUTPUT STATE RATE.
S3001: ANALYSIS PROCESS 4
S3002: OUTPUT HISTOGRAM.
S3003: OUTPUT STATE IDENTIFICATION INFORMATION.
b: END

Figure 33:
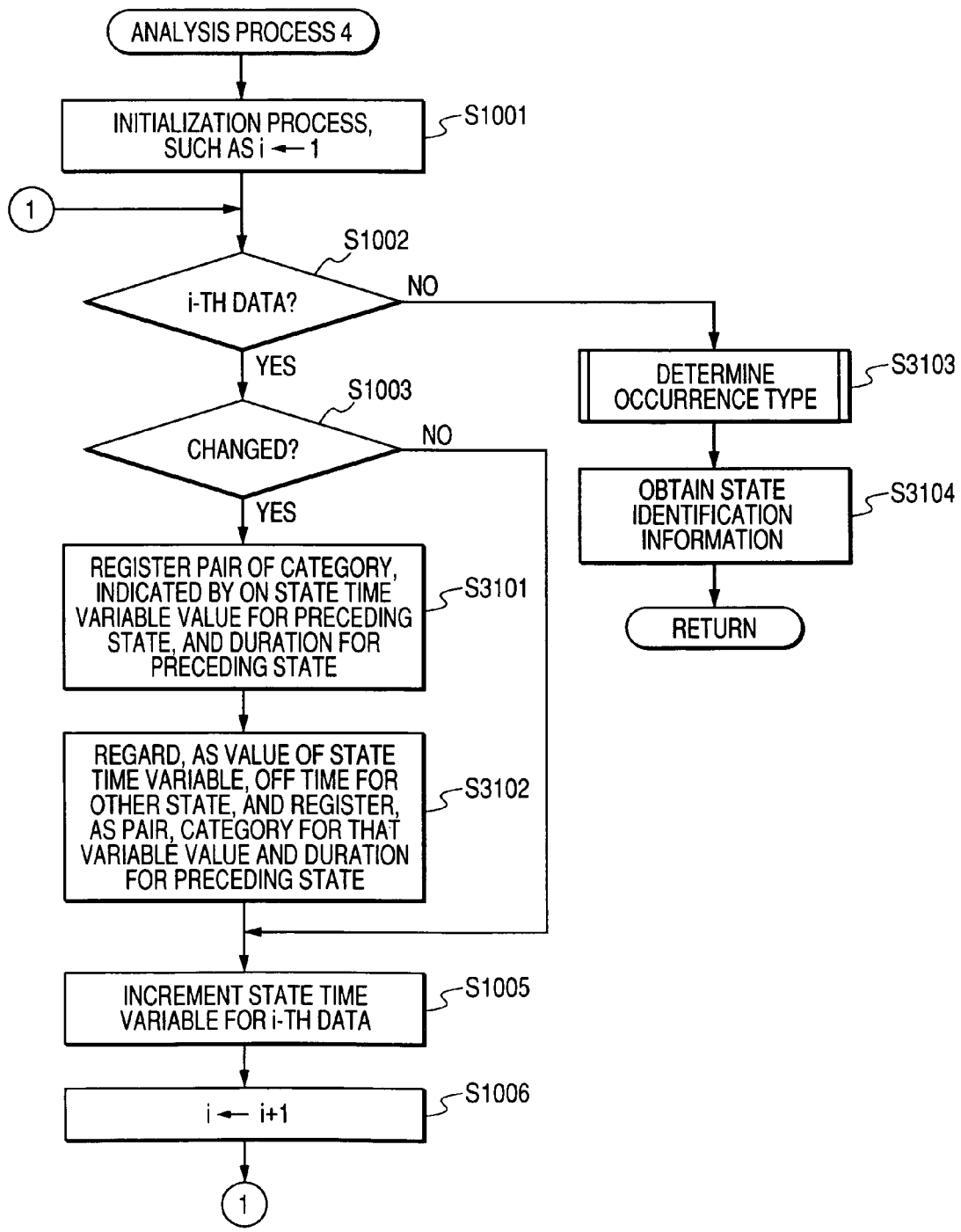
FIG. 33 is a flowchart for explaining the operation of the analysis apparatus for the fourth embodiment.

[FIG. 33]
a: ANALYSIS PROCESS 4
S1001: INITIALIZATION PROCESS, SUCH AS i←1.
S1002: i-TH DATA?
S1003: CHANGED?
S3101: REGISTER PAIR OF CATEGORY, INDICATED BY ON STATE TIME VARIABLE VALUE FOR PRECEDING STATE, AND DURATION FOR PRECEDING STATE.
S3102: REGARD, AS VALUE OF STATE TIME VARIABLE, OFF TIME FOR OTHER STATE, AND REGISTER, AS PAIR, CATEGORY FOR THAT VARIABLE VALUE AND DURATION FOR PRECEDING STATE.
S3103: DETERMINE OCCURRENCE TYPE.
S3104: OBTAIN STATE IDENTIFICATION INFORMATION.
S1005: INCREMENT STATE TIME VARIABLE FOR i-TH DATA.
b: RETURN

[FIG. 34]
a: OCCURRENCE TYPE DETERMINATION
S3201: PERFORM INITIALIZATION, SUCH AS i←1.
S3202: i-TH STATE PRESENT?
b: RETURN
S3203: OBTAIN LONG-PERIOD ON-TIME OCCURRENCE COUNT FOR i-TH STATE.
S3204: OBTAIN SHORT-PERIOD ON-TIME OCCURRENCE COUNT FOR i-TH STATE.
S3205: LONG-PERIOD OCCURRENCE COUNT>SHORT-PERIOD OCCURRENCE COUNT?
S3206: DETERMINE OCCURRENCE TYPE IS LONG-PERIOD TYPE.
S3207: DETERMINE OCCURRENCE TYPE IS SHORT-PERIOD TYPE.
S3208: OBTAIN LONG-PERIOD OFF-TIME OCCURRENCE COUNT FOR i-TH STATE.
S3209: OBTAIN SHORT-PERIOD OFF-TIME OCCURRENCE COUNT FOR i-TH STATE.
S3210: LONG-PERIOD OCCURRENCE COUNT>SHORT-PERIOD OCCURRENCE COUNT?
S3211: DETERMINE OCCURRENCE TYPE IS SPORADIC OCCURRENCE TYPE.
S3212: DETERMINE OCCURRENCE TYPE IS FREQUENT OCCURRENCE TYPE.
S3213: REGISTER OCCURRENCE TYPE OF i-TH STATE.

[FIG. 35]
a: STATE IDENTIFIER
b: NORMAL OPERATION
c: ABNORMAL OPERATION
d: NO WORK FOR-PREPROCESS
e: WORK FULL FOR POST PROCESS

[FIG. 36]
a: STATE IDENTIFIER
b: NORMAL OPERATION
c: ABNORMALLY HALTED
d: OCCURRENCE TYPE
e: LONG-PERIOD FREQUENT OCCURRENCE
f: LONG-PERIOD SPORADIC OCCURRENCE
g: SHORT-PERIOD FREQUENT OCCURRENCE
h: SHORT-PERIOD SPORADIC OCCURRENCE
i: STATE IDENTIFICATION INFORMATION
j: NORMALLY OPERATING
k: TROUBLE HALT OCCURS OCCASIONALLY
l: TACT BALANCE IS DISTURBED

[FIG. 37]
a: STATE IDENTIFIER
b: NORMAL OPERATION
c: ABNORMALLY HALTED
d: NO WORK FOR PREPROCESS
e: WORK FULL FOR POST PROCESS
f: SUB-STATE IDENTIFIER
g: DURATION TIME
h: 60 MIN.
i: 1 MIN.
j: 89 MIN.

[FIG. 38]
a: STATE IDENTIFIER
b: NORMAL OPERATION
c: ABNORMALLY HALTED
d: NO WORK FOR PREPROCESS
e: WORK FULL FOR POST PROCESS
f: SUB-STATE IDENTIFIER
g: DURATION TIME
h: 60 MIN.
i: 480 MIN.
j: 1 MIN.
k: 89 MIN.

[FIG. 39]
a: STATE IDENTIFIER
b: NORMAL OPERATION
c: ABNORMAL OPERATION
d: SUB-STATE IDENTIFIER
e: CATEGORY
f: IN 1 MIN.
g: IN 2 MIN.
h: IN 3 MIN.
i: IN 4 MIN.
j: IN 5 MIN.
k: IN 6 MIN.
l: IN 7 MIN.
m: IN 8 MIN.
n: IN 9 MIN.
o: IN 10 MIN.
p: LONGER THAN 10 MIN.
q: FREQUENCY

[FIG. 40A]
a: NORMAL OPERATION ON HISTOGRAM "LONG-PERIOD TYPE"
b: IN 1 MIN.
c: IN 2 MIN.
d: IN 3 MIN.
e: IN 4 MIN.
f: IN 5 MIN.
g: IN 6 MIN.
h: IN 7 MIN.
i: IN 8 MIN.
j: IN 9 MIN.
k: IN 10 MIN.
l: LONGER THAN 10 MIN.

[FIG. 40A]
a: NORMAL OPERATION OFF HISTOGRAM "FREQUENT OCCURRENCE TYPE"
b: IN 1 MIN.
c: IN 2 MIN.
d: LONGER THAN 10 MIN.

[FIG. 41]
a: NORMALLY OPERATING

[FIG. 42]
a: SHORT-PERIOD TYPE
(TACT BALANCE DISTURBED)
b: SHORT-PERIOD TYPE
(SHORT TIME HALT)
c: LONG-PERIOD TYPE
(TROUBLE HALT)
d: SPORADIC OCCURRENCE TYPE
(OCCURRED OCCASIONALLY, OR LOCALLY)

[FIG. 43]
a: STATE IDENTIFIER
b: NORMAL OPERATION
NO WORK FOR PREPROCESS
NORMAL OPERATION
WORKS FULL IN POST-PREPROCESS
d: OCCURRENCE TYPE
e: SHORT-PERIOD FREQUENT OCCURRENCE TYPE
f: STATE IDENTIFICATION INFORMATION
g: TACT BALANCE IS DISTURBED IN PREPROCESS
h: TACT BALANCE IS DISTURBED IN POST-PROCESS

[FIG. 44]
a: TACT BALANCE IS DISTURBED IN POST-PROCESS.

What is claimed is:

1. A data collection system comprising:
a divergence apparatus, located between an equipment and an output apparatus, for outputting contact information concerning an operation performed by the equipment;
a network apparatus; and
a data collection apparatus connected to the network apparatus via a network,
wherein the divergence apparatus includes:
a contact information acquisition unit, for obtaining contact information from the equipment; and
an output unit, for transmitting to the output apparatus contact information obtained by the contact information acquisition unit, and for transmitting, to the network apparatus, contact associated information, which is information concerning the contact information;
wherein the network apparatus includes:
a first contact associated information receiver, for receiving contact associated information from the divergence apparatus; and
a first contact associated information transmitter, for transmitting, to the data collection apparatus via the network, the contact associated information received by the first contact associated information receiver;
wherein the data collection apparatus includes:
an operating data storage unit, used to store the contact associated information;
a second contact associated information receiver, for receiving contact associated information from the network apparatus via the network; and
an operating data log accumulation unit, for storing in the operating data storage unit contact associated information received by the second contact associated information receiver;
wherein the divergence apparatus further includes:
a state recognition unit, for employing contact information acquired by the contact information acquisition unit to obtain state information, which is information concerning a state of the equipment; and
a state coding unit, for transforming the state information obtained by the state recognition unit into coded contact associated information;
wherein the output unit transmits to the output apparatus the contact information obtained by the contact information acquisition unit, and also transmits to the network apparatus the contact associated information obtained through a transform performed by the state coding unit;
wherein the state coding unit further includes:
a coding map storage unit, for storing a coding map representing a correlation between state information, which indicates state patterns for n contacts, and contact associated information, which is code in (n−1) bits or smaller; and
a contact associated information acquisition unit, for obtaining, from the coding map, contact associated information that is correlated with state information obtained by the state recognition unit; and
wherein n is an integer of two or greater.

2. A data collection system according to claim 1, wherein the state coding unit includes:
a coding map storage unit, for storing a coding map according to which contact associated information, correlated with state information that indicates a set of two or more states, is regarded as the sum of contact associated information sets that are correlated with the two or more states; and
a contact associated information acquisition unit, for obtaining from the coding map contact associated information correlated with state information obtained by the state recognition unit.

3. A data collection system according to claim 1,
wherein the contact outputs the state of a buzzer that is to be set either to the ON or to the OFF state, or the state of a signal light that is to be turned on or off, or to blink;
wherein the state information includes asynchronous information that is generated asynchronously with a change in the state of the buzzer and a change in the state of the signal light;
wherein, when state information obtained by the state recognition unit includes asynchronous information, the state coding unit transforms the state information into contact associated information, which is code having a predetermined value, regardless of whether information other than the asynchronous information is included in the state information obtained by the state recognition unit.

4. A data collection system according to claim 3, wherein the asynchronous information is production count information indicating a production count for the equipment.

5. A data collection system according to claim 1, wherein the data collection apparatus employs different network interfaces to connect to the divergence apparatus and to connect to the analysis apparatus.

6. A data collection system according to claim 1, further comprising:
an analysis apparatus, including:
a contact associated information acquisition unit, for reading one or more sets of contact associated information from the operating data storage unit;
an analysis unit, for processing the one or more sets of contact associated information read by the contact associated information acquisition unit and obtaining predetermined information; and
an analysis results output unit, for outputting the predetermined information obtained by the analysis unit.

7. A data collection system according to claim 6, wherein the analysis unit employs two or more sets of contact associated information to obtain operator moving time information, which concerns the moving time for a operator, and restoration time information, which concerns a restoration time.

8. A data collection system according to claim 7, wherein the analysis unit includes:
a operator moving time information acquisition unit, for obtaining, based on two or more sets of contact associated information, information concerning a period extending from the start of the ON state of a buzzer to the OFF state, and defining the information as operator moving time information; and
a restoration time information acquisition unit, for employing, after the buzzer has been switched from on to off, two or more sets of contact associated information to obtain information concerning a period required before the equipment is normal operation, and defining the information as the restoration time information.

9. A data collection system according to claim 8, wherein the analysis results output unit includes:
a moving time histogram output unit, for preparing, based on operator moving time information obtained by the operator moving time information acquisition unit, a histogram that employs, as respective axes, operator moving time, which is represented by the operator moving time information, and a frequency at which movement during the pertinent moving time occurred and/or a total time for one or more movements during the moving time, and for outputting the histogram; and a restoration time histogram output unit for, based on restoration time information obtained by the restoration time information acquisition unit, preparing a histogram that employs, as respective axes, a restoration time, which is represented by the restoration time information, and a frequency for an occurrence of a restoration requiring the restoration time and/or a total time for one or more restorations, each of which require the restoration time, and for outputting the histogram.

10. A data collection system according to claim 7, wherein the divergence apparatus further includes a state recognition unit, for employing contact information acquired by the contact information acquisition unit to obtain state information, which is information concerning a state of the equipment;

wherein the contact associated information includes time information, which is time related information; and wherein the analysis apparatus includes a correction unit, for correcting, based on a period that the state recognition unit requires to acquire state information, the operator moving time information and the restoration time information.

11. A data collection system according to claim 6, wherein the analysis unit further includes an operating data statistical processor, for calculating the total of durations of the individual states indicated by the state information for the equipment; and wherein the analysis results output unit outputs a graph showing occurrence rates for the states based on the total, obtained by the operating data statistical processor, of durations for the states that are indicated by the state information.

12. A data collection system according to claim 6, wherein the analysis unit includes an operating data statistical processor, for calculating durations and/or frequencies of individual states indicated by state information for the equipment; and wherein the analysis results output unit outputs histograms for frequencies of the states based on the duration and/or frequencies obtained by the operating data statistical processor.

13. A data collection system according to claim 6, wherein the analysis unit includes an operating data statistical processor, for calculating ON durations and frequencies for the individual states indicated by state information for the equipment, and for also calculating OFF durations and frequencies for the states; and wherein the analysis output unit outputs ON histograms and OFF histograms that represent ON and OFF frequencies for the states based on the ON durations and frequencies and the OFF durations, and frequencies for the individual states that have been obtained by the operating data statistical processor.

14. A data collection system according to claim 13, wherein the operating data statistical processor employs the ON duration and the frequency of a state and/or the OFF duration and the frequency of a state to determine an occurrence type, and the analysis results output unit outputs the occurrence type; and wherein the occurrence type is either a "long and frequent occurrence type", a "short and frequent occurrence type", a "long and sporadic occurrence type" or a "short and sporadic occurrence type".

15. A data collection system according to claim 13, wherein the analysis unit includes a state identification information storage unit, for storing state identification information that is used to identify a state and one or more occurrence types correlated with each other;

wherein the operating data statistical processor employs the ON duration and a frequency of a state and/or the OFF duration and a frequency of a state to determine an occurrence type, and employs the occurrence type to search the state identification information storage unit and find state identification information;

wherein the analysis results output unit outputs the state identification information; and wherein the occurrence type is either a "long and frequent occurrence type", a "short and frequent occurrence type", a "long and sporadic occurrence type" or a "short and sporadic occurrence type".

16. A data collection system according to claim 6, wherein the analysis unit includes an operating data statistical processor, for calculating OFF durations and frequencies of individual states indicated by state information for the equipment; and wherein the analysis results output unit employs the OFF durations and frequencies of the states, obtained by the operating data statistical processor, to output OFF histograms that represent OFF frequencies of the states.

\* \* \* \* \*